United States Patent
Ogata et al.

(10) Patent No.: US 9,248,629 B2
(45) Date of Patent: Feb. 2, 2016

(54) LAMINATED POLYESTER FILM, FORMING MEMBER, FORMED BODY AND MANUFACTURING METHOD THEREOF

(75) Inventors: Masami Ogata, Otsu (JP); Yu Abe, Otsu (JP); Yasushi Takada, Otsu (JP)

(73) Assignee: Toray Industries, Inc. (JP)

( * ) Notice: Subject to any disclaimer, the term of this patent is extended or adjusted under 35 U.S.C. 154(b) by 64 days.

(21) Appl. No.: 14/003,632

(22) PCT Filed: Mar. 2, 2012

(86) PCT No.: PCT/JP2012/055400
§ 371 (c)(1),
(2), (4) Date: Sep. 6, 2013

(87) PCT Pub. No.: WO2012/121149
PCT Pub. Date: Sep. 13, 2012

(65) Prior Publication Data
US 2013/0344320 A1    Dec. 26, 2013

(30) Foreign Application Priority Data

Mar. 8, 2011 (JP) ................................. 2011-050017
Sep. 22, 2011 (JP) ................................. 2011-207555

(51) Int. Cl.
*B32B 27/08* (2006.01)
*B32B 27/36* (2006.01)
(Continued)

(52) U.S. Cl.
CPC ................. *B32B 27/08* (2013.01); *B32B 27/36* (2013.01); *B32B 27/38* (2013.01); *B32B 27/40* (2013.01); *C08J 7/047* (2013.01); *B32B 2270/00* (2013.01); *C08J 2367/02* (2013.01); *C08J 2475/04* (2013.01); *Y10T 428/264* (2015.01);
(Continued)

(58) Field of Classification Search
CPC ........ B32B 27/08; B32B 27/36; B32B 27/38; B32B 27/40; C08J 5/18; C08J 7/04; C08J 7/042; C08J 7/047; C08J 2367/02; C08J 2433/02; C08J 2475/04; C08J 2475/14; C08J 2475/16; C08J 2483/04; Y10T 428/264; Y10T 428/31511; Y10T 428/31515
USPC .............................. 428/423.3, 423.7; 427/171
See application file for complete search history.

(56) References Cited

U.S. PATENT DOCUMENTS 5,391,472 A    2/1995   Muys et al.
2003/0013050 A1*  1/2003   Schwark et al. .............. 430/527
(Continued)

FOREIGN PATENT DOCUMENTS

EP    0 602 713 B1    10/1998
JP    1-313521        12/1989
(Continued)

OTHER PUBLICATIONS

"Polymer Alloy Basic & Application 2nd Edition," Edited by Society of Polymer Science, Japan, *Tokyo Kagaku Dojin*, 1993, pp. 104-105 and 324-325 (in the Japanese language) and 2 sheets of English translation.

*Primary Examiner* — Thao T Tran
(74) *Attorney, Agent, or Firm* — DLA Piper LLP (US)

(57) ABSTRACT

A laminated polyester film provided on at least one side with layer (X) made from acrylic urethane copolymer resin (A), isocyanate compound (B), epoxy compound (C), compound (d-1) having a polythiophene structure and compound (d-2) having an anion structure, wherein the layer (X) has a continuous phase structure.

13 Claims, 2 Drawing Sheets

(51) Int. Cl.
*B32B 27/40* (2006.01)
*B32B 27/38* (2006.01)
*C08J 7/04* (2006.01)

(52) U.S. Cl.
CPC .. *Y10T428/31511* (2015.04); *Y10T 428/31515* (2015.04)

(56) References Cited

U.S. PATENT DOCUMENTS

2010/0239868 A1* 9/2010 Takada et al. ............... 428/423.1
2012/0315465 A1* 12/2012 Kawasaki et al. ............ 428/323

FOREIGN PATENT DOCUMENTS

| | | |
|---|---|---|
| JP | 6-295016 | 10/1994 |
| JP | 7-292081 | 11/1995 |
| JP | 2000-6324 | 1/2000 |
| JP | 2001-316595 | 11/2001 |
| JP | 2006-206802 | 8/2006 |
| JP | 4077675 | 2/2008 |
| JP | 2009-083456 | 4/2009 |
| WO | 2006/035684 A1 | 4/2006 |
| WO | 2007/032295 A1 | 3/2007 |
| WO | 2008/149997 A1 | 12/2008 |

* cited by examiner

LAMINATED POLYESTER FILM, FORMING MEMBER, FORMED BODY AND MANUFACTURING METHOD THEREOF

TECHNICAL FIELD

This disclosure relates to a laminated polyester film, forming member, formed body and manufacturing method thereof, and specifically relates to laminated polyester film, forming member, formed body and manufacturing method thereof wherein the laminated polyester film is excellent in transparency, adhesiveness to a print layer made of print ink or hard coating layer made of UV (ultraviolet) curable resin and antistatic property, and the excellent adhesiveness and antistatic property can be maintained even after forming shapes.

BACKGROUND

There are some conventional methods known for decorating a resin product as well as giving it a hard coating property such as abrasion resistance and high surface hardness. One of the methods is such that a decorated sheet for an injection molding, which is laminated with a print layer, decoration layer made of a vapor-deposited layer or the like, and hard coating layer made of UV curable resin in sequence, is attached to a base film at the time of forming shapes of the resin product. Another method is such that a base film, which is provided with a decorated layer on one side and a hard coating layer on the other side and is further provided with an adhesive layer on the decorated layer, is attached to the product at the time of forming shapes of the product. The base film may be a film made of resin. From the viewpoint of characteristics and prices, a biaxially-oriented polyester film is typically employed. To improve the adhesiveness between the base film and the print layer or the hard coating layer, the base film is provided with an adhesive layer generally.

However, conventional laminated polyester films provided with the adhesive layer might exhibit an insufficient adhesiveness between the laminated polyester film and the print layer or hard coating layer. Further, if exposed to a high temperature and high humidity for a long time, the adhesiveness between the adhesive layer and print layer or the adhesiveness between the adhesive layer and hard coating layer might decrease. Because laminated polyester films are used for housings of cell-phones and electric appliances, a hygrothermal adhesiveness, which means an adhesiveness determined after exposed to a high temperature and high humidity, as well as adhesiveness under a normal condition is required to be excellent.

Furthermore, in the case of generating defects with attached dust and deteriorating a handling performance, caused by static electricity generated in the manufacturing process of laminated polyester films, the adhesive layer is required to be given an antistatic property.

Furthermore, even the transparency of the laminated polyester film as well as the base film and adhesive layer constituting the laminated polyester film is important to reflect a color and texture of the decorated layer to the resin product.

To solve such problems, WO 2007/032295 discloses a method where the adhesive layer is constituted by acrylic urethane copolymer resin, polyester resin, and cross-linking agent. JP 2006-206802 A discloses a method where the adhesive layer is constituted by a water-soluble resin containing acrylic urethane copolymer resin, and cross-linking agent. However, the technologies disclosed in WO '295 and JP '802 cannot satisfy both of the antistatic property and adhesiveness sufficiently. JP 2009-083456 A discloses a method where the adhesive layer is constituted by conductive polymer resin, acrylic resin, cross-linking agent and fluorine resin. However, the technology disclosed in JP '456 relates to adhesiveness to adhesive tapes, and the technology might exhibit insufficient adhesiveness with respect to the hard coating layer or print layer made of a print ink.

Accordingly, it could be helpful to provide laminated polyester film, forming member, formed body and manufacturing method thereof wherein the laminated polyester film is excellent in transparency, adhesiveness to a print layer or a hard coating layer and antistatic property, and the excellent adhesiveness and antistatic property can be maintained even after forming shapes.

SUMMARY

We thus provide:

(1) A laminated polyester film, that is provided on at least one side with layer (X) made from acrylic urethane copolymer resin (A), isocyanate compound (B), epoxy compound (C), compound (d-1) having a polythiophene structure and compound (d-2) having an anion structure, characterized in that the layer (X) has a continuous phase structure.

(2) The laminated polyester film (1), wherein the layer (X) has the continuous phase structure between a first mixture and a second mixture, the first mixture comprising the acrylic urethane copolymer resin (A) and the isocyanate compound (B), the second mixture comprising the epoxy compound (C), the compound (d-1) having the polythiophene structure and the compound (d-2) having the anion structure.

(3) A laminated polyester film, that is provided on at least one side with layer (X) made from acrylic urethane copolymer resin (A), isocyanate compound (B), epoxy compound (C), compound (d-1) having a polythiophene structure and compound (d-2) having an anion structure, characterized in that the layer (X) contains 100 parts by weight of the resin (A), 80 to 110 parts by weight of the compound (B), 60 to 90 parts by weight of the compound (C), and 10 to 30 parts by weight of a total of the compound (d-1) and the compound (d-2).

(4) The laminated polyester film (3), wherein the layer (X) has a continuous phase structure.

(5) The laminated polyester film (4), wherein the layer (X) has the continuous phase structure between a first mixture and a second mixture, the first mixture comprising the acrylic urethane copolymer resin (A) and the isocyanate compound (B), the second mixture comprising the epoxy compound (C), the compound (d-1) having the polythiophene structure and the compound (d-2) having the anion structure.

(6) The laminated polyester film according to any of (1) to (5), wherein the layer (X) contains 100 parts by weight of the resin (A), 50 to 80 parts by weight of oxazoline compound (E) and 50 to 80 parts by weight of carbodiimide compound (F).

(7) The laminated polyester film according to any of (1) to (6), wherein the film is used to form a shape.

(8) A forming member made of the laminated polyester film according to any of (1) to (7).

(9) The forming member (8), wherein the laminated polyester film is provided with a scratch-resistant resin layer on at least one side, and the scratch-resistant resin layer is one of outermost layers while the polyester film, the layer (X) and the scratch-resistant resin layer are disposed in series on the one side, a thickness of the scratch-resistant resin layer being 10 to 30 μm, a surface specific resistance of the scratch-resistant resin layer being less than $1\times10^{13}\Omega/\square$.

(10) The forming member (8) or (9), wherein the laminated polyester film is provided with a scratch-resistant resin layer on at least one side, and the scratch-resistant resin layer is one of outermost layers while the polyester film, the layer (X) and the scratch-resistant resin layer are disposed in series on the one side, the scratch-resistant resin layer containing polycaprolactone constituent (K) and urethane constituent (N) together with polysiloxane constituent (L) and/or polydimethyl siloxane constituent (M).

(11) A formed body, made from a forming resin and the forming member according to any of (8) to (10).

(12) A manufacturing method of a laminated polyester film, wherein the polyester film before the crystalline orientation is coated on at least one side with coating agent (x) to form layer (X) and then stretched along at least one direction and heated, characterized in that the coating agent contains acrylic urethane copolymer resin (a), isocyanate compound (b), epoxy compound (c), compound (d-1) having a polythiophene structure and compound (d-2) having an anion structure, the coating agent (x) containing 100 parts by weight of resin (a), 80 to 110 parts by weight of compound (b), 60 to 90 parts by weight of compound (c), and 10 to 30 parts by weight of a total of compound (d-1) and compound (d-2).

(13) The manufacturing method of a laminated polyester film (12), wherein the layer (X) has a continuous phase structure between a first mixture and a second mixture, the first mixture comprising acrylic urethane copolymer resin (A) and isocyanate compound (B), the second mixture comprising epoxy compound (C), the compound (d-1) having the polythiophene structure and the compound (d-2) having the anion structure, the acrylic urethane copolymer resin (A) comprising the acrylic urethane copolymer resin (a) or a resin having a structure derived from the acrylic urethane copolymer resin (a), the isocyanate compound (B) comprising the isocyanate compound (b) or a resin having a structure derived from the isocyanate compound (b), the epoxy compound (C) comprising the epoxy compound (c) or a resin having a structure derived from the epoxy compound (c).

(14) The manufacturing method of a laminated polyester film (12) or (13), wherein the coating agent (x) contains 100 parts by weight of the resin (a), 50 to 80 parts by weight of oxazoline compound (e) and 50 to 80 parts by weight of carbodiimide compound.

(15) The manufacturing method of a laminated polyester film according to any of (12) to (14), wherein the laminated polyester film is used to form a shape.

(16) A manufacturing method of a forming member, wherein the forming member is made from the laminated polyester film manufactured by the method according to any of (12) to (15).

(17) The manufacturing method of a forming member (16), wherein the forming member is made from the laminated polyester film provided with a scratch-resistant resin layer on at least one side, and the scratch-resistant resin layer is one of outermost layers while the polyester film, the layer (X) and the scratch-resistant resin layer are disposed in series on the one side, a thickness of the scratch-resistant resin layer being 10 to 30 μm, a surface specific resistance of the scratch-resistant resin layer being less than $1\times10^{13}\Omega/\square$.

(18) The manufacturing method of a forming member (16) or (17), wherein the forming member is made from the laminated polyester film provided with a scratch-resistant resin layer on at least one side while the polyester film, the layer (X) and the scratch-resistant resin layer are disposed in series on the one side, the scratch-resistant resin layer being formed by coating on a side of the layer (X) of the laminated polyester film with a scratch-resistant resin layer-constituting liquid that contains resin (k) having polycaprolactone skeleton and hydroxyl group and isocyanate-based compound (n), and at least one of resins selected from resin (l) having polysiloxane skeleton, resin (m) having polydimethyl siloxane skeleton and resin (l+m) having polysiloxane skeleton and polydimethyl siloxane skeleton.

(19) A manufacturing method of a formed body, wherein the formed body is made from a forming resin and the forming member manufactured by the method according to any of (16) to (18).

Our methods make it possible to provide a laminated polyester film which is excellent in transparency, adhesiveness to a print layer or a hard coating layer and antistatic property, and the excellent adhesiveness and antistatic property can be maintained even after forming shapes. Such a laminated polyester film exhibiting excellent characteristics can be used to manufacture various desirable forming members and formed bodies.

EXPLANATION OF SYMBOLS

Figure 1:
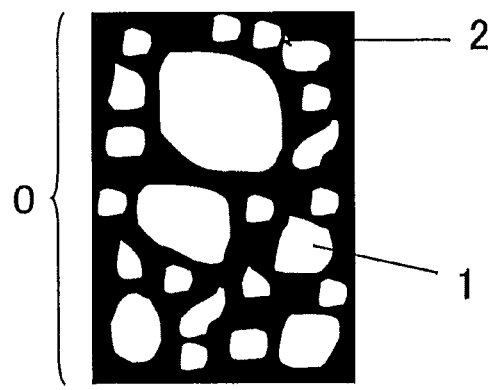
FIG. 1 is a plan view showing a sea-island structure as a general phase separation structure.

0: layer (X)
1: phase 1 (such as mixture (A+B))
2: phase 2 (such as mixture (C+D))
3: polyester film (base film)

DETAILED DESCRIPTION

Our laminated polyester film is provided with layer (X) at least on one side of a polyester film (base film) as a base material.

"Polyester" constituting a polyester film to be a base film is a generic name of a polymer including an ester bond as a major joining chain of the main chain. It is preferable that the polyester consists chiefly of at least one resin selected from ethylene terephthalate, ethylene-2,6-naphthalate, butylene terephthalate, propylene terephthalate and 1,4-cyclohexane dimethylene terephthalate and the like. These resins may be used solely or in combination.

It is preferable that the polyester film as a base material has a stress of 10 MPa or more, and 70 MPa or less, in longitudinal and width directions when stretched by 100% at 150° C. Hereinafter, "F-100 value" indicates the stress value at the time of being stretched by 100%.

It is preferable that the base film constituting the laminated polyester film has a laminated structure made from 30 or more layers consisting alternately of one layer (P layer) made of resin P and the other layer (Q layer) made of resin Q. It is more preferable that resin P is polyethylene terephthalate or polyethylene naphthalate while resin Q is polyester containing spiroglycol or cyclohexanedimethanol. Besides, a conventional film may be employed as far as the film satisfies the above-described condition.

The laminated polyester film is excellent in a formability if F-100 value is within the above-described range in the longitudinal and width directions of the film at 150° C. Therefore, it can easily be formed in any shape, through various forming processes such as vacuum forming, vacuum/compressed-air forming, in-mold forming, insert forming, press forming and drawing forming. It is suitably used to make housings of cell-phones or personal computers which are required to be aesthetic after the forming process, because it is excellent in transparency, adhesiveness to print layer and antistatic property and because it is excellent in adhesiveness and antistatic property even after forming shapes.

If F-100 values of the laminated polyester film in the longitudinal and width directions of the film at 150° C. are less than 10 MPa, the film might not be suitable for the decorative forming because of the following problem caused. For example, the film might deform and fracture, or might be slack to cause a bad forming at a preheating process in forming shapes. On the other hand, if the value is more than 70 MPa, the film might not be formed well enough to be used as a film for a decorative forming.

Therefore, to make the laminated polyester film excellent in formability, it is preferable that F-100 values of the base film in a longitudinal and width directions are 10 MPa or more, and 70 MPa or less.

Besides, the polyester may contain various additives such as antioxidant, heat stabilizer, weathering stabilizer, ultraviolet absorbent, organic anti-blocking agent, pigment, dye, organic or inorganic fine particles, filler, antistatic agent, nucleating agent and cross-linker, to the extent that the characteristics are not deteriorated.

It is preferable that the polyester film is a biaxially-oriented polyester film. The "biaxially-oriented" is to exhibit a pattern oriented by two axes in a wide-angle X-ray diffraction. A biaxially-oriented polyester film can generally be obtained by stretching unstretched polyester sheet by 2.5 to 5 times each in longitudinal and width directions of the sheet and then heating it to complete the crystal orientation.

The polyester film may be made from a laminated structure consisting of two or more layers. For example, the laminated structure may be a complex film structure having inner layer part and outer layer part, wherein the inner layer part contains substantively no particle and only the outer layer part has a layer containing particles. The inner layer part may be made of a kind of polymer which is chemically different from, and alternatively the same as, a polymer constituting the outer layer part.

It is preferable that a layer thickness of the polyester film as a base material is 10 to 500 μm, and it is more preferably 20 to 300 μm, although depending on the use.

Our laminated polyester film is a laminated polyester film provided on at least one side with layer (X) made from acrylic urethane copolymer resin (A), isocyanate compound (B), epoxy compound (C), compound (d-1) having polythiophene structure and compound (d-2) having anion structure, the layer (X) having a continuous phase structure between phase 1 and phase 2. The laminated polyester film having such a structure is excellent in transparency, adhesiveness to print layer or hard coating layer and antistatic property, and the excellent adhesiveness and antistatic property can be maintained even after forming shapes. It is preferable that layer (X) has the continuous phase structure between phase 1 (first mixture) and phase 2 (second mixture). It is preferable that the first mixture is a mixture (which may hereinafter be called "mixture (A+B)") of acrylic urethane copolymer resin (A) and isocyanate compound (B) and the second mixture is another mixture (which may hereinafter be called "mixture (C+D)") of epoxy compound (C), compound (d-1) having polythiophene structure and compound (d-2) having anion structure. Such a mixture may be called a resin group. The first mixture is not limited to the mixture of acrylic urethane copolymer resin (A) and isocyanate compound (B). Even a cross-linked body of acrylic urethane copolymer resin (A) and isocyanate compound (B) can be the first mixture. Each of the first mixture and second mixture may contain oxazoline compound (E) and carbodiimide compound (F) to be described, respectively.

Figure 2:
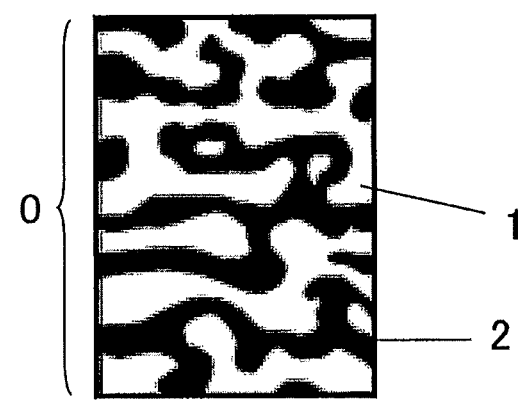
FIG. 2 is a plan view showing a continuous phase structure as a general phase separation structure.
Figure 3:
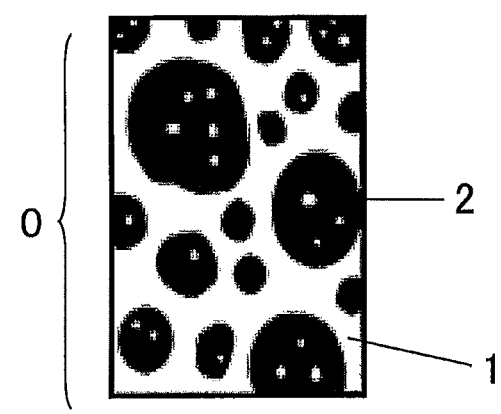
FIG. 3 is a plan view showing a complex phase dispersion structure as a general phase separation structure.

The "continuous phase structure" means a three-dimensional continuous or connective structure (web structure) generally. FIGS. 1 to 3 exemplify general phase separation structures of a blended polymer of immiscible two kinds of resin disclosed in "Polymer alloy—Basic and Application: Second edition" edited by The Society of Polymer Science, Japan, published by Tokyo Kagaku Dojin Co., Ltd. in 1993. FIG. 1 shows a sea-island structure, FIG. 2 shows a continuous phase structure and FIG. 3 shows a complex phase dispersion structure. The continuous phase structure corresponds to the structure shown in FIG. 2 where symbol 0 indicates layer (X), symbol 1 indicates phase 1 (such as mixture (A+B)) and symbol 2 indicates phase 2 (such as mixture (C+D)). The shape of the continuous phase structure is not limited and may be network-like or randomly network-like in particular.

"Polymer alloy—Basic and Application: Second edition" discloses boundary tension of each resin and mixture fraction of each resin, as main factors affecting on the forming of the continuous phase structure. However, appropriate levels of the boundary tension and mixture fraction of each resin for forming the continuous phase structure are not disclosed in "Polymer alloy—Basic and Application: Second edition." Further, it is very difficult for the boundary tension of each resin to be determined experimentally with high accuracy. On the other hand, it is known that even the polarity of each constituting resin is important to make layer (X) formed into the continuous phase structure. A solubility parameter is one of parameters affected by such a resin polarity or boundary tension.

Therefore, the solubility parameter of each resin is focused on in selecting resins to form layer (X) into the continuous phase structure. As a result, we found that the forming of the continuous phase structure can easily be controlled and efficiently be performed if layer (X) is made from acrylic urethane copolymer resin (A), isocyanate compound (B), epoxy compound (C), compound (d-1) having polythiophene structure and compound (d-2) having anion structure. Details of these resin and compounds will be explained later.

Whether layer (X) has a continuous phase structure or not can be determined by observing a cross section of layer (X) with a transmission electronic microscope (TEM) and a three-dimensional reconstitution process image of a cross-sectional continuous inclined image of layer (X) with a field emission transmission electron microscope (FETEM). The "determination of the cross-sectional continuous inclined image of layer (X) with the three-dimensional reconstitution process image" specifically means a determination of layer (X) according to the standard deviation of area ratio of phase 2 (such as mixture (C+D)) in the three-dimensional reconstitution process image.

First, the section observation of layer (X) will be explained.

Figure 4:
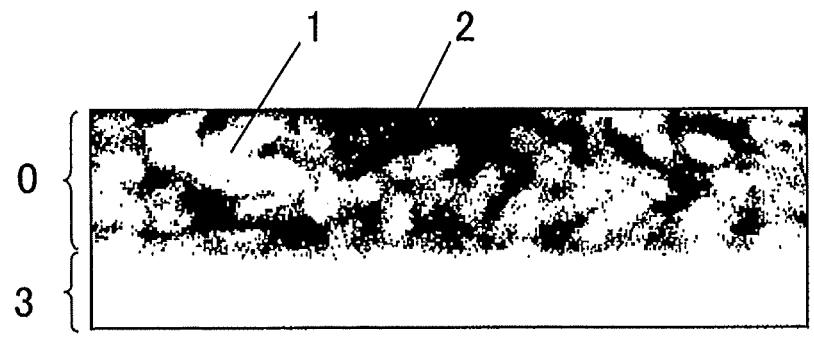
FIG. 4 is a partial TEM image view made from layer (X) part in TEM image showing a cross section of a laminated polyester film according to one example.
Figure 6:
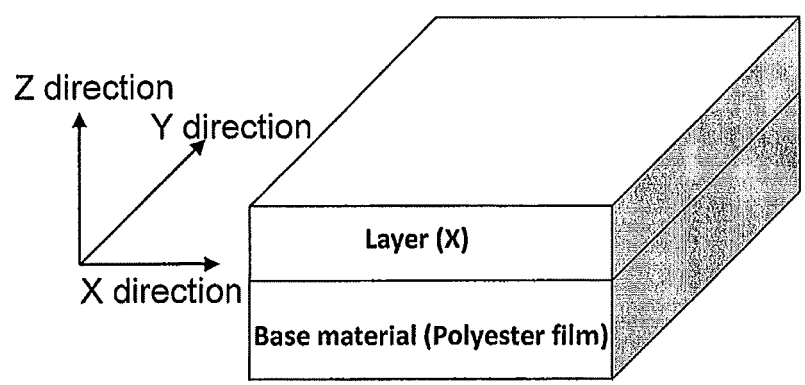
FIG. 6 is an explanatory diagram showing a direction in which the cross section of a laminated polyester film is observed.

With the laminated polyester film, a sample of layer (X) surface is prepared by $OsO_4$-stained ultrathin membrane section method. When the cross section of the prepared sample is observed at 100 kV of acceleration voltage and 20,000 of magnifying power, the continuous phase structure (web structure) as shown in FIG. 4 (where symbol 3 indicates polyester film part (base film part)) can be found. The "section observation of layer (X)" means the section observation of X-Z plain shown in FIG. 6.

When the sample of a laminated polyester film in which layer (X) consists of acrylic urethane copolymer resin (A) and isocyanate compound (B) is prepared in the same way and observed in the cross section, any black parts are not found. From this result, the black parts are determined to be mixture (C+D). In addition, when the sample of a laminated polyester film made from epoxy compound (C), compound (d-1) having polythiophene structure and compound (d-2) having anion structure is prepared in the same way and observed in the cross section, a whole layer (X) looks black. Even from this result, the black parts are determined to be mixture (C+D).

Next, the three-dimensional reconstitution process image of the cross-sectional continuous inclined image of layer (X) will be explained.

With the laminated polyester film, a sample of layer (X) surface is prepared by $OsO_4$-stained ultrathin membrane section method. While the cross section of the prepared measurement sample is getting inclined by every 1°, TEM image of the section of the measurement sample is observed at 200 kV of acceleration voltage and 20,000 of magnifying power, so that sectional continuous inclined images are obtained. Besides, the "section observation of layer (X)" means the section observation of X-Z plain shown in FIG. 6. After the CT (Computerized Tomography) reconstitution processing is performed based on the obtained images to obtain a three-dimensional reconstitution process image, the area of a section parallel to the base material and therefore roughly parallel to layer (X), and the black part area in the section are measured by every 1 nm along layer (X) thickness direction to calculate the area ratio of the black parts in each section. Afterwards, the standard deviation is calculated about the measured values of area ratio of the black parts obtained by every 1 nm in the thickness direction. The "section parallel to the base material (or, roughly parallel to layer (X))" means a section which is parallel to X-Y plane shown in FIG. 6. The "thickness direction" means a direction which is parallel to Z-axis.

With the three-dimensional reconstitution process image of the cross-sectional continuous inclined image of layer (X), the connection condition of phase 1 (such as mixture (A+B)) and phase 2 (such as mixture (C+D)) in X-Z plane of layer (X) as well as the connection condition in X-Y plane can be observed.

Even in the three-dimensional reconstitution process image, black parts can be regarded as mixture (C+D) because the staining method is similar to the one for the section observation of layer (X) with the transmission electronic microscope (TEM).

If layer (X) has the continuous phase structure as shown in FIG. 2, the standard deviation is smaller than that of the sea-island structure in FIG. 1 and the complex dispersion structure in FIG. 3 because the area ratio deviation of phase 2 (such as mixture (C+D)) is smaller in layer (X) thickness direction. On the other hand, the standard deviation of the structure, such as sea-island structure in FIG. 1 and complex dispersion structure in FIG. 3, is greater because the area ratio of phase 2 (such as mixture (C+D)) is biased therein.

The area ratio of black parts in the section which is roughly parallel to layer (X) is measured by every 1 nm along layer (X) thickness direction. If the standard deviation of area ratio (%) of phase 2 (such as mixture (C+D)) is 15(%) or less, such a small standard deviation can be regarded as representing a continuous phase structure in which phase 2 (such as mixture (C+D)) exists continuously. From a viewpoint of adhesiveness and antistatic property, it is preferable that the standard deviation of the area ratio of phase 2 (such as mixture (C+D)) is 10 or less so that phase 2 (such as mixture (C+D)) uniformly forms a continuous phase structure. In a case that layer (X) substantively consists of phase 1 (such as mixture (A+B)) and phase 2 (such as mixture (C+D)) and that the sum of the area ratio (%) of phase 2 (such as mixture (C+D)) and the area ratio (%) of phase 1 (such as mixture (A+B)) is almost constant (constantly 100%, for example) all over layer (X), if the standard deviation of the area ratio of phase 2 (such as mixture (C+D)) decreases the standard deviation of the area ratio of phase 1 (such as mixture (A+B)) decreases similarly. Therefore, if the standard deviation of the area ratio of phase 2 (such as mixture (C+D)) calculated by the above-described method is small, phase 2 (such as mixture (C+D)) is regarded as having a continuous phase while a whole of layer (X) has a continuous phase structure between phase 1 (such as mixture (A+B)) and phase 2 (such as mixture (C+D)) as shown in FIG. 2.

If layer (X) is made from acrylic urethane copolymer resin (A), isocyanate compound (B), epoxy compound (C), compound (d-1) having polythiophene structure and compound (d-2) having anion structure while phase 1 (such as mixture (A+B)) and phase 2 (such as mixture (C+D)) form a continuous phase structure, layer (X) can develop high transparency, adhesiveness to a print layer or hard coating layer and antistatic property. Surprisingly, the adhesiveness and antistatic property can be developed at excellent levels even after a forming process such as an insert forming.

For example, if mixture (A+B) and mixture (C+D) form a continuous phase structure, mixture (A+B) which is excellent in the adhesiveness to print layer or hard coating layer is continuously found on the adhesive layer surface. As a result, a force to exfoliate the print layer or hard coating layer is applied to be dispersed without making the stress concentrate locally, so that the excellent adhesiveness is developed. Also, because mixture (C+D) containing conductive resin exists continuously over the surface of layer (X), layer (X) can develop a good antistatic property. Further, it is preferable that as far as mixture (A+B) and mixture (C+D) form a continuous phase structure, mixture (A+B) and mixture (C+D) contain oxazoline compound (E) and carbodiimide compound (F) so that a further excellent adhesiveness can be developed without deteriorating an antistatic property.

The method to make a continuous phase structure from phase 1 (such as mixture (A+B)) and phase 2 (such as mixture (C+D)) is not limited in this disclosure. For example, a continuous phase structure between phase 1 (such as mixture (A+B)) and phase 2 (such as mixture (C+D)) may be formed in layer (X) by setting each resin proportion in a predetermined range.

Another laminated polyester film is a laminated polyester film provided on at least one side with layer (X) made from acrylic urethane copolymer resin (A), isocyanate compound (B), epoxy compound (C), compound (d-1) having polythiophene structure and compound (d-2) having anion structure, wherein layer (X) contains 100 parts by weight of resin (A), 80 to 110 parts by weight of compound (B), 60 to 90 parts by weight of compound (C), and 10 to 30 parts by weight of a total of compound (d-1) and compound (d-2).

Layer (X) can be formed to have a continuous phase structure described later by setting in the above-described ranges the contents of the resin, compounds (A) to (C), and the total of compound (d-1) and compound (d-2). As a result, layer (X) can develop high transparency, adhesiveness to a print layer or hard coating layer and antistatic property. Surprisingly, the adhesiveness and antistatic property can be developed at excellent levels even after a forming process such as an insert forming.

Hereinafter, resin (A) and compounds (B), (C), (d-1) and (d-2) which constitute the laminated polyester film will be explained.

"Acrylic urethane copolymer resin (A)" means the following acrylic urethane copolymer resin (a), and alternatively means a resin having a structure derived from acrylic urethane copolymer resin (a) if acrylic urethane copolymer resin (a) is linked with isocyanate compound (b), oxazoline compound (e) or carbodiimide compound (f).

The acrylic urethane copolymer resin (a) is not limited as far as it is made by copolymerizing acrylic resin and urethane resin. It is preferable that the acrylic urethane copolymer resin is made from acrylic resin as a skin layer and acrylic urethane copolymer resin as a core layer, so as to be excellent in the adhesiveness to the print layer or hard coating layer.

"Acrylic resin" means a resin obtained by copolymerizing acrylic monomers to be described and monomers of another kind as needed through a conventional acrylic-resin polymerization method such as emulsification polymerization and suspension polymerization.

An acrylic monomer to constitute acrylic urethane copolymer resin (a) may be alkyl acrylate (with alkyl group of methyl, ethyl, n-propyl, n-butyl, isobutyl, t-butyl, 2-ethyl hexyl, cyclohexyl or the like), alkyl methacrylate (with alkyl group of methyl, ethyl, n-propyl, n-butyl, isobutyl, t-butyl, 2-ethyl hexyl, cyclohexyl or the like), hydroxy group-containing monomer such as 2-hydroxyethyl acrylate, 2-hydroxyethyl methacrylate, 2-hydroxypropyl acrylate and 2-hydroxypropyl methacrylate, amide group-containing monomer such as acrylic amide, methacrylamide, N-methyl methacrylamide, N-methyl acrylamide, N-methylol acrylamide, N-methylol methacrylamide, N,N-dimethylol acrylamide, N-methoxymethyl acrylamide, N-methoxymethyl methacrylamide, N-butoxymethyl acrylamide and N-phenyl acrylic amide, amino group-containing monomer such as N,N-diethylaminoethyl acrylate and N,N-diethylaminoethyl methacrylate, glycidyl group-containing monomer such as glycidyl acrylate and glycidyl methacrylate, carboxyl group-containing monomer such as acrylic acid and methacrylic acid, or salt thereof (sodium salt, potassium salt, ammonium salt or the like).

These acrylic monomers can be used in combination with another kind of monomer. Another kind of monomer may be glycidyl group-containing monomer such as allyl glycidyl ether, monomer containing acid-anhydride group such as maleic anhydride and itaconic anhydride, vinyl isocyanate, allyl isocyanate, styrene, vinyl methyl ether, vinyl ethyl ether, vinyltris alkoxy silane, alkyl maleic acid monoester, alkyl fumaric acid monoester, acrylonitrile, methacrylonitrile, alkyl itaconic acid monoester, vinylidene chloride, vinyl acetate, vinyl chloride, vinyl pyrrolidone.

Acrylic monomers of one or more kinds are polymerized. In a case of using another kind of monomers in combination, it is preferable that a content proportion of the acrylic monomers is 50 wt % (% by weight) or more and it is more preferable that it is 70 wt % or more.

"Urethane resin" means a resin obtained from polyhydroxy compound and polyisocyanate compound by a conventional urethane-resin polymerization method such as emulsification polymerization and suspension polymerization.

The polyhydroxy compound may be polyethylene glycol, polypropylene glycol, polyethylene propylene glycol, polytetramethylene glycol, hexamethylene glycol, tetramethylene glycol, 1,5-pentanediol, diethylene glycol, triethylene glycol, polycaprolactone, polyhexamethylene adipate, polyhexamethylene sebacate, polytetramethylene adipate, polytetramethylene sebacate, trimethylol propane, trimethylolethane, pentaerythritol, polycarbonate diol, glycerin or the like.

In a case of applying to the in-line coating method to be described, it is preferable that acrylic urethane copolymer resin (a) is dissolved or dispersed in water. To enhance a hydrophilicity of acrylic urethane copolymer resin, it is possible that a polyhydroxy compound such as carboxylic acid group-containing polyhydroxy compound or hydroxyl group-containing carboxylic acid is employed. The carboxylic acid group-containing polyhydroxy compound may be dimethylol propionic acid, dimethylol butyric acid, dimethylol valeric acid, trimellitic acid bis(ethylene glycol) ester or the like. The hydroxyl group-containing carboxylic acid may be 3-hydroxy propionic acid, γ-hydroxybutyric acid, p-(2-hydroxyethyl)benzoic acid, malic acid or the like.

For another method, it is possible that the urethane resin is introduced with sulfonic acid base. For example, a prepolymer may be made from polyhydroxy compound, polyisocyanate compound and chain extender, and then a compound, which contains hydroxyl group or amino group capable of reacting to terminal isocyanate group together with sulfonic acid base or sulfuric acid half ester base in the molecule, may be added to react to produce urethane resin containing sulfonic acid base or sulfuric acid half ester base in the molecule. The compound which contains hydroxyl group or amino group capable of reacting to terminal isocyanate group may be aminomethane sulfonic acid, 2-amino ethanesulfonic acid, 2-amino-5-methylbenzene-2-sulfonic acid, β-hydroxy ethanesulfonic acid sodium, aliphatic primary amine compound, such as propane sultone addition product and butane sultone addition product, or the like. It is preferable that the compound is propane sultone adduct as an aliphatic primary amine compound.

The polyisocyanate compound may be hexamethylene diisocyanate, diphenyl methane diisocyanate, tolylene diisocyanate, isophorone diisocyanate, adduct of tolylene diisocyanate and trimethylol propane, adduct of hexamethylene diisocyanate and trimethylolethane or the like.

It is preferable that acrylic urethane copolymer resin (a) has a configuration in which a core layer is exposed, and it is not preferable that the core layer made of urethane resin is completely surrounded by a skin layer made of acrylic resin. If the core layer is completely surrounded by the skin layer, layer (X) surface has characteristics of acrylic resin only, so that another surface condition having characteristics of urethane resin derived from the core layer becomes hardly found and therefore it is not preferable for the adhesiveness to the print layer or hard coating layer. On the other hand, the condition, where the core layer is not surrounded by the skin layer and namely both layers are separated from each other, is a condition merely mixing acrylic acid resin and urethane resin. Accordingly, acrylic resin which has a small surface energy of resin generally coordinates on the surface side selectively. As a result, that is not preferable for the adhesiveness to the print layer or hard coating layer because layer (X) has characteristics of acrylic resin only.

An example of preparing acrylic urethane copolymer resin (a) having a core and skin structure will be shown. To begin with, the first emulsification polymerization step is performed in a system made from emulsifier, polymerization initiator, water and urethane resin monomer which constitute the polymer resin core part. Next, after the first emulsification polymerization step is completed substantively, the second emulsification polymerization step is performed by adding polymerization initiator and acrylic monomer which constitute the skin part. The acrylic urethane copolymer resin having the core and skin structure can be obtained through such two steps of reaction. To make the prepared copolymer resin into two-layer structure of the core layer and skin layer, it is preferable that an additional core is prevented from generating by adding only small amount of the emulsifier at the second emulsification polymerization step so that the polymerization is progressed on the core surface made of urethane resin formed at the first emulsification polymerization step.

To produce acrylic urethane copolymer resin (a), the following method or other methods may be employed. For example, small amount of dispersant and polymerization initiator are added in the aqueous dispersion of urethane resin and then acrylic monomers are added gradually while stirred at a constant temperature. Afterwards the temperature is increased as needed to continue the reaction for a certain period of time, so that the polymerization of acrylic monomers is completed to make an aqueous dispersion of acrylic urethane copolymer resin.

It is preferable that acrylic urethane copolymer resin (A) is contained by 15 wt % or more to a total weight of (X), and more preferably by 20 wt % or more. The "content of acrylic urethane copolymer resin (A) in layer (X)" means a total weight of parts of layer (X) derived from acrylic urethane copolymer resin (a). If a part of acrylic urethane copolymer resin (a) forms a cross-linked structure together with another compound such as isocyanate compound (b), oxazoline compound (e) and carbodiimide compound (f), the content of acrylic urethane copolymer resin (A) is a value of total of the weight of acrylic urethane copolymer resin (a) without cross linkages and the weight of a part of the cross-linked structure derived from acrylic urethane copolymer resin (a). The weight of the part of the cross-linked structure derived from another compound, such as isocyanate compound (b), oxazoline compound (e) and carbodiimide compound (f), does not belong to the content of acrylic urethane copolymer resin (A).

It is preferable that a glass transition temperature (Tg) of acrylic resin in acrylic urethane copolymer resin (a) is 20° C. or higher, and more preferably 40° C. or higher. If the glass transition temperature is 20° C. or higher, the blocking performance is improved when stored at room temperature.

It is preferable that a weight proportion (acrylic acid resin/urethane resin) of acrylic resin to urethane resin in acrylic urethane copolymer resin (a) is 10/90 or more and 70/30 or less, and the proportion is more preferably 20/80 or more and 50/50 or less. If the proportion is not within the range, the adhesiveness between the laminated polyester film and print layer may deteriorate. The weight proportion of acrylic resin to urethane resin can be set to a desired value by adjusting the composition of raw material in producing acrylic urethane copolymer resin (a).

"Isocyanate compound (B)" means the following isocyanate compound (b), and alternatively means a resin having a structure derived from isocyanate compound (b) if the isocyanate compound (b) is linked with acrylic urethane copolymer resin (a), oxazoline compound (e), carbodiimide compound (f) or the like.

Isocyanate compound (b) may be tolylene diisocyanate, diphenyl methane-4,4'-diisocyanate, meta xylylene diisocyanate, hexamethylene-1,6-diisocyanate, 1,6-diisocyanate hexane, adduct of tolylene diisocyanate and hexanetriol, adduct of tolylene diisocyanate and trimethylol propane, polyol-modified diphenyl methane-4,4'-diisocyanate, carbodiimide-modified diphenyl methane-4,4'-diisocyanate, isophorone diisocyanate, 1,5-naphthalene diisocyanate, 3,3'-bistolylene-4,4'diisocyanate, 3,3'dimethyl diphenyl methane-4,4'-diisocyanate, methaphenilene diisocyanate or the like. Particularly, layer (X) can be improved in toughness by employing a high-molecular formed isocyanate compound having a plurality of isocyanate groups at the terminal or in the side chain of a polymer such as polyester resin and acrylic resin.

In the in-line coating method to be described, it is preferable that isocyanate compound (b) is an aqueous dispersion. From a viewpoint of pot life, it is preferable that a block isocyanate series compound made by masking the isocyanate group with a blocking agent is employed. There is a known system of cross-linking reaction where the blocking agent is volatilized by the heat in a dry process after an applying process so that the isocyanate group is exposed to develop the cross-linking reaction. The isocyanate group may be either a monofunctional type or multifunctional type. It is preferable that the isocyanate group is a multifunctional block polyisocyanate series compound, so that the cross-linkage density of layer (X) and hygrothermal adhesiveness to the print layer or hard coating layer are improved.

The low-molecular or high-molecular compound, having 2 or more block isocyanate groups, may be tolylene diisocyanate, hexamethylene diisocyanate, 3 mol-tolylene diisocyanate adduct of trimethylol propane, polyvinyl isocyanate, vinyl isocyanate copolymer, polyurethane-terminated diisocyanate, methyl ethyl ketone oxime-blocked tolylene isocyanate, sodium hyposulfite-blocked hexamethylene diisocyanate, methyl ethyl ketone oxime-blocked polyurethane-terminated diisocyanate, phenol-blocked 3 mol-tolylene diisocyanate adduct of trimethylol propane or the like.

Provided that the content of acrylic urethane copolymer resin (A) in layer (X) is 100 parts by weight, it is necessary for the content of isocyanate compound (B) to be 80 or more parts by weight and 110 or less parts by weight. The content of isocyanate compound (B) is set within the above-described range, and the content of epoxy compound (C) and the total content of compound (d-1) having a polythiophene structure and compound (d-2) having an anion structure are set within a predetermined range, so that layer (X) can highly develop transparency, adhesiveness and antistatic property. Reasons for this will be explained later. If the content of isocyanate compound (B) is less than 80 parts by weight, the adhesiveness to the print layer or hard coating layer may be poor. If it is more than 110 parts by weight, the transparency of the laminated polyester film may deteriorate and layer (X) may not exhibit a sufficient antistatic property. It is preferable that layer (X) contains isocyanate compound (B) by 90 or more parts by weight and 105 or less parts by weight if acrylic urethane copolymer resin (A) content is assumed to be 100 parts by weight. If the content of isocyanate compound (B) is less than 90 parts by weight, the adhesiveness to the print layer or hard coating layer may be poor. If it is more than 105 parts by weight, the transparency of the laminated polyester film may deteriorate. The "content of isocyanate compound (B) in layer (X)" means a total weight of parts of layer (X) derived from isocyanate compound (b). If a part of isocyanate compound (b) forms a cross-linked structure together with another compound such as acrylic urethane copolymer resin (a), oxazoline compound (e) and carbodiimide compound (f), the content of isocyanate compound (B) is a value of total of the weight of isocyanate compound (b) without cross linkages and the weight of a part of the cross-linked structure derived from isocyanate compound (b). The weight of the part of the cross-linked structure derived from another compound, such as acrylic urethane copolymer resin (a), oxazoline compound (e) and carbodiimide compound (f), does not belong to the content of isocyanate compound (B).

"Epoxy compound (C)" means the following epoxy compound (c), and alternatively means a resin having a structure derived from epoxy compound (c) if the epoxy compound (c) is linked with oxazoline compound (e), carbodiimide compound (f) or the like.

The epoxy compound (c) may be of sorbitol polyglycidyl ether series, polyglycerol polyglycidyl ether series, polyethylene glycol diglycidyl ether series, polyhydroxy alkane poly glycidyl ether series or the like. For example, it may be epoxy compound "Denacol" (EX-611, EX-614, EX-614B, EX-512, EX-521, EX-421, EX-313, EX-810, EX-830, EX-850) made by Nagase ChemteX Corporation, diepoxy/polyepoxy-based compound (SR-EG, SR-8EG, SR-GLG) made in Sakamoto Yakuhin Kogyo Co., Ltd., epoxy cross-linker "EPICLON" (EM-85-75W, CR-5L) made by DIC Co., Ltd., or the like. Preferably, it is water-soluble.

Provided that the content of acrylic urethane copolymer resin (A) in layer (X) is 100 parts by weight, it is necessary for the content of epoxy compound (c) to 60 or more parts by weight and 90 or less parts by weight. The content of epoxy compound (C) is set within the above-described range, and the content of isocyanate compound (B) and the total content of compound (d-1) having a polythiophene structure and compound (d-2) having an anion structure are set within a predetermined range, so that layer (X) can highly develop transparency, adhesiveness and antistatic property. Reasons for this will be explained later. If the content of epoxy compound (C) is less than 60 parts by weight, layer (X) may not exhibit a sufficient antistatic property. If it is more than 90 parts by weight, layer (X) may be poor in the adhesiveness to the print layer or hard coating layer. It is preferable that layer (X) contains epoxy compound (C) by 70 or more parts by weight and 85 or less parts by weight if acrylic urethane copolymer resin (A) content is assumed to be 100 parts by weight. If the content of epoxy compound (C) is less than 70 parts by weight, the antistatic property of layer (X) may deteriorate. If it is more than 85 parts by weight, the adhesiveness to the print layer or hard coating layer may be poor. Besides, the "content of epoxy compound (C) in layer (X)" means a total weight of parts of layer (X) derived from epoxy compound (c). If a part of epoxy compound (c) forms a cross-linked structure together with another compound such as oxazoline compound (e) and carbodiimide compound (f), the content of epoxy compound (C) is a value of total of the weight of epoxy compound (c) without cross linkages and the weight of a part of the cross-linked structure derived from epoxy compound (c). The weight of the part of the cross-linked structure derived from another compound, such as oxazoline compound (e) and carbodiimide compound (f), does not belong to the content of epoxy compound (C).

Compound (d-1) having a polythiophene structure may be a compound having a structure of thiophene ring substituted by positions 3 and 4. It is preferably a compound made by binding oxygen atoms to carbon atoms at positions 3 and 4 of thiophene ring. The compound made by binding hydrogen atoms or carbon atoms directly to the carbon atoms may not be easy to make an aqueous coating fluid.

Next, compound (d-2) having an anion structure will be explained.

"Compound (d-2) having an anion structure" means an acidic polymer as a free acid and may be polymeric carboxylic acid, polymeric sulfonic acid, polyvinyl sulfonic acid or the like. The polymeric carboxylic acid may be polyacrylic acid, polymethacrylic acid, polymaleic acid or the like. The polymeric sulfonic acid may be polystyrene sulfonate or the like. From a viewpoint of the antistatic property, polystyrene sulfonate is the most preferable. Further, the free acid may be formed in a partially neutralized salt. Compound (d-2) having an anion structure may be formed in a copolymer form made from another copolymerizable monomer such as acrylic ester, methacrylate ester, styrene and the like. In such a case, from a viewpoint of the antistatic property it is preferable that the proportion of another copolymerizable monomer in compound (d-2) having an anion structure is 20 wt % or less.

The molecular weight of the polymeric carboxylic acid or polymeric sulfonic acid as compound (d-2) having an anion structure is not limited in particular. From viewpoints of the stability and antistatic property of coating agent, it is preferable that the weight-average molecular weight is 1,000 or more and 1,000,000 or less, and more preferably it is 5,000 or more and 150,000 or less. Alkali salt, such as lithium salt and sodium salt, or ammonium salt may be contained partly as far as inventive features are not inhibited. Even the salt with neutralized polyanion may function as a dopant. That is because polystyrene sulfonate and an ammonium salt that function as very strong acids, and therefore the equilibrium shifts to the acid side through progressing the equilibrium reaction after the neutralization.

Such compounds (d-2) having anion structure are added when compound (d-1) having polythiophene structure is polymerized, so that water-insoluble compound (d-1) having thiophene structure is made water-dispersible or water-soluble easily. Even the antistatic property is improved by the anion that functions as a polythiophene doping agent as well as an acid. Therefore, from a viewpoint of the antistatic property it is preferable that composition (d) consisting of compound (d-1) having anion structure and compound (d-2) having polythiophene structure is employed.

From a viewpoint of antistatic property, it is preferable that compound having anion structure is contained more than compound (d-1) having polythiophene structure by solid weight proportion. It is preferable that compound (d-2) having anion structure is contained by 1 or more parts by weight and 5 or less parts by weight together with 1 part by weight of compound (d-1) having polythiophene structure, and is contained more preferably 1 or more parts by weight and 3 or less parts by weight.

Composition (d), which contains compound (d-1) having polythiophene structure and compound (d-2) having anion structure, may be produced by the methods disclosed in JP6-295016-A, JP7-292081-A, JP1-313521-A, JP2000-6324-A, JP4077675-B, EP602713-B, U.S. Pat. No. 5,391,472 or the like.

Provided that the content of acrylic urethane copolymer resin (A) in layer (X) is 100 parts by weight, it is necessary for the total content of compound (d-1) having polythiophene structure and compound (d-2) having anion structure to be 10 or more parts by weight and 30 or less parts by weight. The total content of compound (d-1) having polythiophene structure and compound (d-2) having anion structure is set within the above-described range, and the content of isocyanate compound (B) and the content of epoxy compound (C) are set within a predetermined range, so that layer (X) can highly develop transparency, adhesiveness and antistatic property. Reasons for this will be explained later. If the total content of compound (d-1) having polythiophene structure and compound (d-2) having anion structure is less than 10 parts by weight, the transparency of layer (X) may not exhibit a sufficient antistatic property. If it is more than 30 parts by weight, layer (X) may be poor in hygrothermal adhesiveness to the print layer and hard coating layer. It is preferable that layer (X) contains compound (d-1) having polythiophene structure and compound (d-2) having anion structure by 15 or more parts by weight and 30 or less parts by weight in total if acrylic urethane copolymer resin (A) content is assumed to be 100 parts by weight.

Layer (X) can be formed in a continuous phase structure as shown in FIG. 2 if layer (X) contains 100 parts by weight of acrylic urethane copolymer resin (A), 80 or more parts by weight and 110 or less parts by weight of isocyanate compound (B), 60 or more parts by weight and 90 or less parts by weight of epoxy compound (C), and 10 or more parts by weight and 30 or less parts by weight in total of compound (d-1) having polythiophene structure and compound (d-2) having anion structure. As a result, layer (X) can develop high adhesiveness and antistatic property. Surprisingly, the adhesiveness and antistatic property can be developed at excellent levels even after the laminated polyester film is processed by forming. We believe the reason as follows.

Hereinafter, the above-described continuous phase structure will be explained in detail.

Layer (X) comprises acrylic urethane copolymer resin (A), isocyanate compound (B), epoxy compound (C), compound (d-1) having polythiophene structure and compound (d-2) having anion structure in the present invention. We believe that resin mixture (A+B) is made from acrylic urethane copolymer resin (A) and isocyanate compound (B) because they are both hydrophobic. On the other hand, we believe that compound (d-2) having anion structure exists close to compound (d-1) having polythiophene structure with electrical attraction because compound (d-2) having anion structure functions as a dopant agent of compound (d-1) having polythiophene structure. The set of compound (d-1) having polythiophene structure and compound (d-2) having anion structure having polythiophene structure may be called set (D). We also believe that mixture (C+D) is made from set (D) and epoxy compound (C) because they are hydrophilic. We further believe that the phase separation is caused between mixture (A+B) and mixture (C+D) in layer (X) because their solubility parameters are greatly different from each other. We still further believe that the phase separation structure formed by such mixtures can be structures depicted in FIGS. 1, 2 and 3.

If layer (X) has a continuous phase structure as shown in FIG. 2, layer (X) can develop high adhesiveness and antistatic property.

Characteristics of layer (X) having a continuous phase structure shown in FIG. 2 will be explained. In FIG. 2, the white parts (parts indicated by symbol 1) mean phase 1 (such as mixture (A+B)) while the black parts (parts indicated by symbol 2) mean phase 2 (such as mixture (C+D)).

Mixture (A+B) consisting of acrylic urethane copolymer resin (A) and resin (B) derived from an isocyanate compound is a mixture which is excellent in adhesiveness to the print layer and hard coating layer. Because it exists continuously over layer (X), a force to exfoliate the print layer or hard coating layer is applied to be dispersed without making the stress concentrate locally. Therefore, the starting point of the detachment is hard to occur, and enough adhesive property develops layer (X). Therefore, layer (X) has a good adhesiveness to the print layer and hard coating layer. Also, layer (X) can develop a good antistatic property, because mixture (C+D) which consists of resin (C) derived from an epoxy compound, compound (d-1) having polythiophene structure and compound (d-2) having anion structure exists continuously over layer (X).

If layer (X) has a continuous phase structure, the laminated polyester film can maintain the continuous phase structure even after processed by forming. It is thought that this reason is as follows.

Mixture (C+D) contains compound (d-1) having polythiophene structure and compound (d-2) having anion structure. Mixture (C+D) is a rigid mixture because compound (d-1) having polythiophene structure has a chemical structure that is highly linear. However, mixture (A+B) is continuously placed between mixtures (C+D) in the continuous phase separation structure and therefore mixture (A+B) functions as a well formable resin to maintain the continuous phase structure even at the forming process. Therefore, the adhesiveness and antistatic property same as before the forming process can be developed even after the forming process.

Next, characteristics of layer (X) in a case that layer (X) is the sea-island structure shown in FIG. 1 or complex dispersion structure shown in FIG. 3 will be explained. In FIGS. 1 and 3, the white parts (parts indicated by symbol 1) mean phase 1 (such as mixture (A+B)) while the black parts (parts indicated by symbol 2) mean phase 2 (such as mixture (C+D)).

If layer (X) has a sea-island structure with clustered mixtures (A+B), mixture (C+D) which is disadvantageous to the adhesiveness to the print layer or hard coating layer exists continuously, so that the print layer or hard coating layer might be exfoliated continuously. As a result, layer (X) might not have sufficient adhesiveness. On the other hand, the antistatic property is good because mixture (C+D) has a continuous structure.

For example, the sea-island structure as shown in FIG. 1 may be found in the following Cases I to IV:
  Case I: Layer (X) does not contain isocyanate compound (B).
  Case II: The content of isocyanate compound (B) is less than the range described above.
  Case III: The content of epoxy compound (C) is more than the range described above.
  Case IV: The total content of compound (d-1) having polythiophene structure and compound (d-2) having anion structure is more than the range described above.

In Cases I to IV, the content proportion of hydrophobic mixture (A+B) is small in layer (X), and therefore the interaction of hydrophilic mixture (C+D) is stronger than the interaction of hydrophobic mixture (A+B). Accordingly, hydrophobic mixtures (A+B) are excluded from each other and then hydrophobic mixtures (A+B) gather into a small sphere to decrease the interfacial tension. As a result, a sea-island structure is formed with flocked mixtures (A+B) as shown in FIG. 1.

In a case that layer (X) has a complex dispersion structure with flocked mixtures (C+D) as shown in FIG. 3, mixtures (A+B) which is excellent in the adhesiveness to the print layer or hard coating layer exist continuously in the interface of layer (X). Accordingly, the stress is dispersed without concentrating locally when the print layer is exfoliated and therefore the starting point of the exfoliation is hardly generated so that layer (X) has a sufficient adhesiveness. On the other hand, the antistatic property is not developed because mixtures (C+D) exist discontinuously.

For example, the complex dispersion structure as shown in FIG. 3 may be found in the following Cases VI to X:

Case VI: Layer (X) does not contain epoxy compound (C).
Case VII: The content of epoxy compound (C) is less than the range described above.
Case VIII: Layer (X) contain neither compound (d-1) having polythiophene structure nor compound (d-2) having anion structure.
Case IX: The content of compound (d-1) having polythiophene structure and compound (d-2) having anion structure is less than the range described above.
Case X: The content of isocyanate compound (B) is more than the range described above.

In Cases VI to X, the content proportion of hydrophobic mixture (A+B) is excessive in layer (X), and therefore layer (X) is hydrophobic as a whole. Accordingly, because the interaction of hydrophobic mixture (A+B) is stronger than the interaction of hydrophilic mixture (C+D), hydrophobic mixtures (A+B) are excluded from each other and then hydrophilic mixtures (C+D) gather into a small sphere to decrease the interfacial tension. As a result, a phase separation structure is formed as shown in FIG. 3.

Thus, layer (X) has a continuous phase structure and develops a high adhesiveness and antistatic property if layer (X) is constituted by resins (A) to (C), (d-1) and (d-2) while each content proportion of resin and compound is set within a predetermined range. Layer (X) maintains a high adhesiveness and antistatic property even after forming the laminated polyester film.

To improve the adhesiveness under a hygrothermal environment, it is preferable that oxazoline compound (E) and carbodiimide compound (F) are employed. It is further preferable that layer (X) contains 100 parts by weight of acrylic urethane copolymer resin (A) as well as 50 or more parts by weight and 80 or less parts by weight of each oxazoline compound (E) and carbodiimide compound (F). If each condition is set within the above-described range, layer (X) can be improved in the hygrothermal adhesiveness to the print layer or hard coating layer.

"Oxazoline compound (E)" means the following oxazoline compound (e), and alternatively means a resin having a structure derived from oxazoline compound (e) if the oxazoline compound (e) is linked with acrylic urethane copolymer resin (a), isocyanate compound (b), carbodiimide compound (f) or the like. The oxazoline compound (e) is not limited in particular as far as oxazoline group is contained as a functional group in the compound. It is preferable that oxazoline compound (e) is an oxazoline group-containing copolymer containing at least one kind of monomer containing oxazoline group copolymerized with at least one kind of another monomer.

The monomer containing oxazoline group may be 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-ethyl-2-oxazoline or the like, as well as one or more kinds of mixture among them. Above all, industrially available 2-isopropenyl-2-oxazoline is suitable.

The at least one kind of another monomer employed together with the monomer containing oxazoline group in oxazoline compound (e) is not limited in particular as far as it can be copolymerized with the monomer containing oxazoline group. It may be acrylic ester or methacrylic ester such as acrylic acid methyl, methyl methacrylate, acrylic acid ethyl, methacrylic acid ethyl, acrylic acid butyl, methacrylic acid butyl, acrylic acid-2-ethyl hexyl and methacrylic acid-2-ethyl hexyl, unsaturated carboxylic acid such as acrylic acid, methacrylic acid, itaconic acid and maleic acid, unsaturated nitrile such as acrylonitrile, methacrylonitrile, unsaturated amide such as acrylic amide, methacrylamide, N-methylol acrylic amide and N-methylol methacrylamide, vinyl ester such as vinyl acetate and propionate vinyl, vinyl ether such as methyl vinyl ether and ethyl vinyl ether, olefin such as ethylene and propylene, halogen-containing-α,β-unsaturated monomer such as vinyl chloride, vinylidene chloride and fluorinated vinyl, α,β-unsaturated aromatic monomer such as styrene, α-methyl styrene or the like, as well as one or more kinds of mixture among them. The "content of oxazoline compound (E) in layer (X)" means a total weight of parts of layer (X) derived from oxazoline compound (e). If a part of oxazoline compound (e) forms a cross-linked structure together with another compound such as acrylic urethane copolymer resin (a), isocyanate compound (b), epoxy compound (c) and carbodiimide compound (f), the content of oxazoline compound (E) is a value of total of the weight of oxazoline compound (e) without cross linkages and the weight of a part of the cross-linked structure derived from oxazoline compound (e). The weight of the part of the cross-linked structure derived from another compound, such as acrylic urethane copolymer resin (a), isocyanate compound (b), epoxy compound (c) and carbodiimide compound (f), does not belong to the content of oxazoline compound (E).

"Carbodiimide compound (F)" means the following carbodiimide compound (f), and alternatively means a resin having a structure derived from carbodiimide compound (f) if the carbodiimide compound (f) is linked with acrylic urethane copolymer resin (a), isocyanate compound (b), oxazoline compound (e) or the like. The carbodiimide compound (f) is not limited in particular as far as the molecule has one or more of either carbodiimide group or its tautomeric cyanamid group as a functional group in the compound. To increase the degree of cross linkage of layer (X), it is particularly preferable that a polycarbodiimide compound having two or more of the groups is employed. Particularly, layer (X) can be improved in flexibility and toughness by employing a high-molecular formed carbodiimide compound having a plurality of carbodiimide groups at the terminal or in the side chain of a polymer such as polyester resin and acrylic resin.

Carbodiimide compound (f) can be produced by conventional technologies, and is provided by the polycondensation of a diisocyanate compound in the presence of a catalyzer. The diisocyanate compound as a starting material of the carbodiimide compound may be aromatic series, fatty series, alicyclic diisocyanate, and specifically, tolylene diisocyanate, xylene diisocyanate, diphenyl methane diisocyanate, hexamethylene diisocyanate, cyclohexane diisocyanate, isophorone diisocyanate, dicyclohexyl diisocyanate or the like. The "content of carbodiimide compound (F) in layer (X)" means a total weight of parts of layer (X) derived from carbodiimide compound (f). If a part of carbodiimide compound (f) forms a cross-linked structure together with another compound such as acrylic urethane copolymer resin (a), isocyanate compound (b), epoxy compound (c) and oxazoline compound (e), the content of carbodiimide compound (F) is a value of total of the weight of carbodiimide compound (f) without cross linkages and the weight of a part of the cross-linked structure derived from carbodiimide compound (f). The weight of the part of the cross-linked structure derived from another compound, such as acrylic urethane copolymer resin (a), isocyanate compound (b), epoxy compound (c) and oxazoline compound (e), does not belong to the content of carbodiimide compound (F).

It is necessary that the laminated polyester film is provided on at least one side of a base polyester film (base film) with layer (X), and layer (Y) may also be provided on the other side. The resin constituting layer (Y) is not limited and may be polyester resin, acrylic resin, urethane resin, epoxy resin, amide resin, or a copolymer resin of these resins. It is possible that a singular or multiple resins selected from these resins are employed. In addition, layer (Y) may be of the same layer as layer (X). The following advantage can be achieved if the polyester film is provided with layer (X) on one side as well as layer (Y) on the other side. For example, if the polyester film is provided with a hard coating layer on layer (X) (or layer (Y)) side, the film provided with the hard coating layer can be improved in the handling performance by adding anti-blocking particles in the other layer (Y) (or layer (X)).

Next, a forming member made of the laminated polyester film and a formed body made from the forming member and a forming resin will be explained.

The "formed body" means a product processed by coating the forming member made by the laminated polyester film with the forming resin, and alternatively means a product processed by forming the shape of the forming member made by coating the laminated polyester film with the forming resin. The "forming resin" means a thermoplastic resin and may be acrylic resin, polyphenylene oxide polystyrene-based resin, polycarbonate-based resin, styrene copolymer-based resin, acrylonitrile/styrene/butadiene copolymer-based resin, polypropylene-based resin, polyethylene-based resin, polyamide-based resin, polyacetal-based resin, polyester-based resin or the like. It may be either a single resin or a composition (resin alloy) with another resin.

The forming resin may contain additives such as heat stabilizer, oxidation stabilizer, weathering agent, ultraviolet absorbent, organic anti-blocking agent, pigment, dye, organic or inorganic fine particle, filler and nucleating agent, as needed.

The forming member made of the laminated polyester film may coat the forming resin on any of a part or a whole part of one side or both sides.

The "forming material made of the laminated polyester film" means a member made of the laminated polyester film provided with at least one of print layer, hard coating layer, adhesive layer and binder layer.

The forming member made of the laminated polyester film includes a laminated polyester film provided with an scratch-resistant resin layer on at least one side.

The forming member may have the following formations. The forming member may be a laminated polyester film which is provided with a hard coating layer made of UV curable resin on at least one side and is also provided with a print layer on the other side while an adhesive layer is placed over the print layer. The adhesive layer may be binder layer, anchor coating layer or sticking layer.

The print layer in the forming member may be constituted with binder resin, pigment, dye or the like. The binder resin may be polyurethane-based resin, vinyl-based resin, polyamide-based resin, polyester-based resin, acrylic resin, polyvinyl acetal-based resin, polyester urethane-based resin, cellulose ester-based resin, alkyd-based resin, thermoplastic elastomer-based resin, or the like, and is preferably a resin capable of forming a flexible film. It is preferable that a coloring ink containing pigment or dye as a coloring agent of a predetermined color is added in the binder resin. It is preferable that the application method is gravure-printing, screen-printing or offset-printing, and more preferably the screen-printing. Particularly for printing in multi colors or a gradation color, the offset-printing or gravure-printing methods are preferable. For printing in a single color, the gravure-coating method, the roll-coating method, the comma-coating method or the like may be employed. Depending on a pattern, it is possible to employ a print method where a print layer is coated all over the film or another print method where the print layer is coated partially. It is preferable that the print layers are coated by 5 μm each and that the print layer is made of a two-liquid curable ink. Such a configuration makes it possible that the ink is easily prevented from flowing at the time of the injection molding and the discoloring caused by the film thickness change is also prevented.

The hard coating layer in the forming member may be made of acrylic resin, urethane-based resin, melamine-based resin, organic silicate compound, silicone-based resin, metal oxide or the like. Particularly from viewpoints of hardness and durability, it is preferably silicone-based resin or acrylic resin. Further, the acrylic resin and specifically an active ray-curable acrylic resin are preferably employed from viewpoints of curability, flexibility and productivity.

Other various additives can be added in the hard coating layer as needed and as appropriate. For example, the additive may be antioxidant, stabilizer such as light stabilizer and ultraviolet absorbent, surfactant, leveling agent, antistatic agent or the like. Though depending on the use, it is preferable that the thickness of the hard coating layer is 0.1 to 30 μm, and more preferably 1 to 15 μm. If the hard coating layer thickness is less than 0.1 μm, the layer tends to be damaged because it is too thin to make a hard surface even after the curing is completed. On the other hand, if the thickness is more than 30 μm, the layer tends to have a crack in the cured film through the stress generated by the bending or the like.

It is preferable that the adhesive layer is of a heat-sensitive type or a pressure-sensitive type. If the forming resin is an acrylic resin, it is preferable that the adhesive layer is made of an acrylic resin. If the forming resin is polyphenylene oxide polystyrene-based resin, polycarbonate-based resin, styrene copolymer-based resin, polystyrene-based resin, or the like, it is preferable that the adhesive layer is made of a resin, such as acrylic resin, polystyrene-based resin, polyamide-based resin or the like, which has an affinity with those resins. If the forming resin is a polypropylene-based resin, it is preferable that the adhesive layer is made of chlorination polyolefin-based resin, chlorinated ethylene-vinyl acetate copolymer-based resin, cyclized rubber, coumarone indene-based resin or the like.

It is possible that the binder layer in the forming member is constituted of a thermoplastic resin such as acrylic resin, polyester resin, polycarbonate resin, vinyl chloride vinyl acetate copolymer. It is preferable that the application method for the binder layer is gravure-printing, screen-printing or offset-printing, and more preferably the screen-printing. Though depending on the use, it is preferable that the thickness of the binder layer is 0.1 μm or thicker. If the thickness of the binder layer is less than 1 μm, the forming resin might not exhibit sufficient adhesiveness.

To form the adhesive layer, it is possible to employ a conventional coating method such as roll-coating method, gravure-coating method and comma-coating method, or a conventional printing method such as gravure-printing method and screen-printing.

Because the laminated polyester film is excellent in adhesiveness and antistatic property even after the forming process, it is suitably used to form a shape by various methods.

Though method of the forming process is not limited in particular, it may be vacuum forming, vacuum/compressed air forming, in-mold forming, insert forming, cold forming, press molding or the like.

Next, the forming member made by providing an scratch-resistant resin layer on at least one side of the laminated polyester film will be explained.

The "forming member provided with the scratch-resistant resin layer" means a member for the forming, having a series of polyester film, layer (X) and scratch-resistant resin layer while the scratch-resistant resin layer is one of outermost layers.

The "scratch-resistant resin layer in the forming member" means a resin layer having a hardness of HB or harder. It is preferable that the scratch-resistant resin layer is made of heat-curable resin or active ray-curable resin.

The "heat" means thermal energy supplied by a heating method such as hot wind jet, infrared ray, microwave and induction heating. The "active ray" means ultraviolet (UV), electron beam, radiation (α ray, β ray, γ ray or the like), and practically, ultraviolet is preferable because of its easiness. The UV lamp to irradiate ultraviolet may be of discharge lamp type, flash type, laser type, electrodeless lamp type or the like. If ultraviolet is radiated to cure the resin with a high-pressure mercury-vapor lamp of the discharge lamp type, the ultraviolet is irradiated by an irradiation intensity of 50 mW/cm$^2$ or more and 3000 mW/cm$^2$ or less, and preferably 100 mW/cm$^2$ or more and 2000 mW/cm$^2$ or less, and further preferably 200 mW/cm$^2$ or more and 1500 mW/cm$^2$ or less. The "irradiation intensity of ultraviolet" means intensity irradiated per unit area, and can be adjusted by controlling lamp output, emission spectrum efficiency, diameter of emission bulb, the reflecting mirror design or distance from the light source to the irradiated body.

The resin which forms the scratch-resistant resin layer may be acrylic resin, melamine-based resin, silicone-based resin, urethane-based resin or the like.

It is possible to employ an acrylic resin which is made by copolymerizing a multifunctional acrylate or its modified monomer, which has 3 or more (preferably 4, and more preferably 5) of (meth)acryloyloxy groups per molecule. It is preferable that the multifunctional acrylate or its modified monomer has 10 or less (preferably 9 or less, and more preferably 8 or less) of (meth)acryloyloxy groups per molecule. If the multifunctional acrylate or its modified monomer has more than 10 of (meth)acryloyloxy groups per molecule, the shrinkage ratio at the time of curing is greater, so that the scratch-resistant resin layer might curl. The multifunctional acrylate or its modified monomer, which has 3 or more of (meth)acryloyloxy groups per molecule, may be pentaerythritol tri(meth)acrylate, pentaerythritol tetra(meth)acrylate, pentaerythritol tri(meth)acrylate, pentaerythritol penta(meth)acrylate, the pentaerythritol hexa(meth)acrylate, trimethylol propane tri(meth)acrylate, pentaerythritol triacrylate hexane methylene diisocyanate urethane polymer. These monomers can be employed by one kind each or mixture of two or more kinds Commercially available multifunctional acrylic monomers are "DIABEAM" made by Mitsubishi rayon Co., Ltd., "NK ester" made by Shin-Nakamura Chemical Co., Ltd., "UNIDIC" made by DIC Corporation, "ARONIX" made by Toagosei Co., Ltd., "BLEMMER" made by NOF Corporation, "KAYARAD" made by Nippon Kayaku Co., Ltd., "LIGHT ESTER" made by Kyoeisha chemical Co., Ltd., and the like.

The acrylic resin includes polyester acrylate made by copolymerizing multifunctional acrylate or its modified monomer with polyester-based polyol and urethane acrylate made by copolymerizing multifunctional acrylate or its modified monomer with urethane oligomer.

It is preferable that the acrylic monomer contains polymerization initiator, curing agent and catalyst, as well as multifunctional acrylate described above. A plurality of polymerization initiators may be used in combination or solely. It is possible to employ acid catalyst, thermal polymerization initiator or photopolymerization initiator together.

The photopolymerization initiator may be alkylphenone-based compound, sulfur-based compound, acylphosphine oxide-based compound, amine-based compound or the like. From a viewpoint of curability, it is preferable to be the alkylphenone-based compound such as 2,2-1,2-dimethoxy-diphenylethane-1-one, 2-methyl-1-(4-methylthio phenyl)-2-morpholinopropane-1-one, 2-benzyl-2-dimethylamino-1-(4-phenyl)-1-butane, 2-(dimethylamino)-2-[(4-methylphenyl)methyl]-1-(4-phenyl)-1-butane, 2-benzyl-2-dimethylamino-1-(4-morpholinophenyl)-1-butane, 2-(dimethylamino)-2-[(4-methylphenyl)methyl]-1-[4-(4-morpholinyl)phenyl]-1-butane, 1-cyclohexyl-phenylketone, 2-methyl-1-phenylpropane-1-one and 1-[4-(2-ethoxy)-phenyl]-2-hydroxy-2-methyl-1-propane-1-one.

It is preferable that the photopolymerization initiator is contained by 0.1 to 5 parts by weight together with 100 parts by weight of the multifunctional acrylate or its modified monomer which has 3 or more of (meth)acryloyloxy groups per molecule, and is contained by 0.3 to 3 parts by weight in particular. The curing might not be progressed smoothly if too little photopolymerization initiator is contained, while the yellowing might deteriorate the appearance if it is excessive.

The acid catalyst may be hydrochloric acid water solution, formic acid, acetic acid or the like. The thermal polymerization initiator may be peroxide, azo compound or the like.

The melamine-based resin may be melamine, methylolmelamine derivative formed by condensation between melamine and formaldehyde, methylolmelamine ether compound reacted with a lower alcohol to be partially or completely etherified, or mixture of them. The melamine-based resin may be either monomer or condensate made from a polymer such as dimer, and may be a mixture of them. The lower alcohol used for the etherification may be methyl alcohol, ethyl alcohol, isopropyl alcohol, n-butanol, isobutanol or the like. It is possible to employ imino group-type methylated melamine resin, methylol group-type melamine resin, methylol group-type methylated melamine resin, exhaustive alkyl-type methylated melamine resin or the like, which has a functional group in a molecule among imino group, methylol group and alkoxy methyl group such as methoxymethyl group and butoxymethyl group.

It is preferable that the scratch-resistant resin layer contains polycaprolactone component (K) and urethane component (N), that it contains polysiloxane component (L) and/or polydimethyl siloxane component (M). If such a component is contained in the scratch-resistant resin layer, good antistatic property and scratch resistance can be developed even in a case that the scratch-resistant resin layer is laminated in a thick region of 10 to 30 μm.

The following Formula (1) shows polycaprolactone component (K) which is contained in the resin constituting the scratch-resistant resin layer:

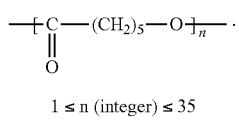

$$\mathrm{-\!\!+\!\!C\!\!-\!\!(CH_2)_5\!\!-\!\!O\!\!+\!\!_n\cdot} \qquad (1)$$

$1 \leq n \text{ (integer)} \leq 35$

From a viewpoint of the scratch resistance of the scratch-resistant resin layer, it is preferable that isocyanate-based compound (n) and resin (k) having polycaprolactone skeleton and hydroxyl group are cross-linked to introduce polycaprolactone component (K) and urethane component (N) into the scratch-resistant resin layer.

Resin (k) having polycaprolactone skeleton and hydroxyl group may be difunctional polycaprolactone diol as exemplified in Formula (2), trifunctional polycaprolactone triol as exemplified in Formula (3), tetrafunctional polycaprolactone polyol or the like:

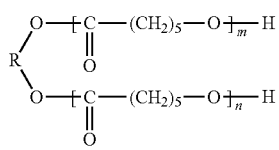

$4 \leq m + n \text{ (integer)} \leq 35$

R: —(CH$_2$)$_2$—, —(CH$_2$)$_2$—O—(CH$_2$)$_2$—, —(CH$_3$)$_2$—(CH$_2$)$_2$—

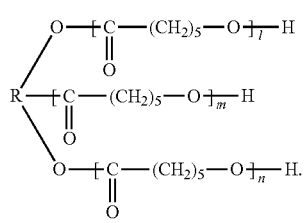

$3 \leq l + m + n \text{ (integer)} \leq 30$

R: —CH$_2$—CH—CH$_2$—, —CH$_3$—C—(CH$_2$)$_3$, CH$_3$—CH$_2$—C—(CH$_2$)$_3$

It is preferable that the scratch-resistant resin layer contains 5 to 50 parts by weight of polycaprolactone component (K) with respect to 100 parts by weight of the scratch-resistant resin layer. If the content is less than 5 parts by weight, the scratch-resistant resin layer might be poor in scratch resistance. On the other hand, if the content is more than 50 parts by weight, the transparency might deteriorate in time.

The following Formula (4) shows urethane component (N) which is contained in the resin constituting the scratch-resistant resin layer:

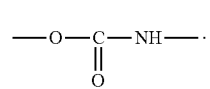

From a viewpoint of the scratch resistance of the scratch-resistant resin layer, it is preferable that isocyanate-based compound (n) and any of the following Resins I to IV are cross-linked to introduce urethane component (N):

Resin I: resin (k) having polycaprolactone skeleton and hydroxyl group
Resin II: resin (l) having polysiloxane skeleton
Resin III: resin (m) having polydimethyl siloxane skeleton
Resin IV: resin (l+m) having polysiloxane skeleton and polydimethyl siloxane skeleton.

Isocyanate-based compound (n) may be methylenebis-4-cyclohexylisocyanate, polyisocyanate such as isocyanurate compound of hexamethylene isocyanate and biuret compound of hexamethylene isocyanate, or the like. It is preferable that the scratch-resistant resin layer contains 10 to 40 parts by weight of urethane component (N) with respect to 100 parts by weight of the scratch-resistant resin layer. The scratch resistance might be poor if the content is not within the range.

The following Formula (5) shows polysiloxane component (L) which is contained in the resin constituting the scratch-resistant resin layer:

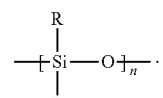

R: —OH or alkyl group of carbon number 1 to 8; $3 \leq n \text{ (integer)} \leq 100$ From a viewpoint of the scratch resistance of the scratch-resistant resin layer, it is preferable that isocyanate-based compound (n) and resin (l) having polysiloxane skeleton are cross-linked to introduce polysiloxane component (L) and urethane component (N) into the scratch-resistant resin layer.

Resin (l) having polysiloxane skeleton may be a partial hydrolysate of silane compound having hydrolyzable silyl group, such as tetramethoxysilane, tetraethoxy silane, methyltrimethoxysilane, methyltriethoxysilane, dimethyldimethoxysilane, dimethyldiethoxy slane, γ-glycidoxypropyltrimethoxysilane, γ-glycidoxypropyltriethoxysilane, γ-glycidoxypropylmethyl-dimethoxysilane, γ-glycidoxypropylmethyldiethoxysilane, γ-methacryloxypropyltrimethoxy silane, γ-methacryloxypropyltriethoxy silane, γ-methacryloxypropyl methyl dimethoxy silane, γ-methacryloxypropyl methyl diethoxy silane, γ-acryloxypropyltrimethoxy silane and γ-acryloxypropyl methyl dimethoxy silane, and alternatively may be organosilica sol made by dispersing silicic anhydride fine particles stably in organic solvent, adduct of the organosilica sol with the partial hydrolysate of silane compound having hydrolyzable silyl group which has radical-polymerizability or the like. It is preferable that the scratch-resistant resin layer contains 1 to 20 parts by weight of polysiloxane component (L) with respect to 100 parts by weight of the scratch-resistant resin layer. The scratch resistance might be poor if the content is not within the range.

The following Formula (6) shows polydimethyl siloxane component (M) which is contained in the resin constituting the scratch-resistant resin layer:

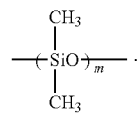

$10 \leq m \text{ (integer)} \leq 300$

From a viewpoint of the scratch resistance of the scratch-resistant resin layer, it is preferable that isocyanate-based compound (n) and resin (m) having polydimethyl siloxane skeleton are cross-linked to introduce polydimethyl siloxane component (M) and urethane component (N).

Resin (m) having polydimethyl siloxane skeleton may be obtained by copolymerizing polydimethyl siloxane methacryl ester (Formula (7)) and a vinyl monomer. The vinyl monomer may be methyl acrylate, ethyl acrylate, n-butyl acrylate, isobutyl acrylate, octyl acrylate, cyclohexyl acrylate, tetrahydrofurfuryl acrylate, methyl methacrylate, ethyl methacrylate, n-butyl methacrylate, isobutyl methacrylate, 2-ethyl hexyl methacrylate, stearyl methacrylate, lauryl methacrylate, methyl vinyl ether, ethyl vinyl ether, n-propyl vinyl ether, n-butyl vinyl ether, isobutyl vinyl ether, styrene, α-methyl styrene, acrylonitrile, methacrylonitrile, vinyl acetate, vinyl chloride, vinylidene chloride, fluorinated vinyl, vinylidene fluoride, glycidyl acrylate, glycidyl methacrylate, allyl glycidyl ether, acrylic acid, methacrylic acid, itaconic acid, crotonic acid, maleic acid, maleic anhydride, citraconic acid, acrylic amide, methacrylamide, N-methylol acrylic amide, N,N-dimethyl acrylic amide, N,N-dimethylamino ethyl methacrylate, N,N-diethylaminoethyl methacrylate, diacetone acrylic amide or the like. Also, it is possible to employ a vinyl monomer having hydroxyl groups such as 2-hydroxy ethyl acrylate, 2-hydroxyethyl methacrylate, 2-hydroxypropyl acrylate, 2-hydroxypropyl methacrylate and allyl alcohol, and alternatively a reactant of Cardura E and acrylic acid, methacrylic acid, itaconic acid, crotonic acid, maleic acid or the like.

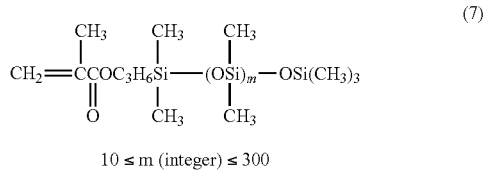

$10 \leq m \text{ (integer)} \leq 300$

Alternatively, resin (m) having polydimethyl siloxane skeleton may be obtained by copolymerizing the polymeric azo-based radical polymerization initiator as shown in the following Formula (8) with a vinyl monomer described above:

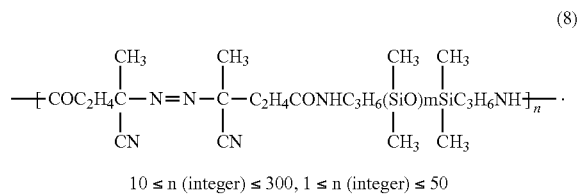

$10 \leq n \text{ (integer)} \leq 300, 1 \leq n \text{ (integer)} \leq 50$

It is preferable that resin (m) having polydimethyl siloxane skeleton is made by copolymerizing a monomer having hydroxyl groups such as 2-hydroxyethyl acrylate. That makes it possible that resin (m) having polydimethyl siloxane skeleton and isocyanate compound (n) react to form an urethane bond to improve the scratch resistance of the scratch-resistant resin layer.

It is preferable that the scratch-resistant resin layer contains 5 to 80 parts by weight of polydimethyl siloxane component (M) with respect to 100 parts by weight of the scratch-resistant resin layer. If the content is less than 5 parts by weight, the scratch-resistant resin layer might be poor in scratch resistance. On the other hand, if the content is more than 80 parts by weight, the transparency might deteriorate in time.

Further, it is possible to employ resin (l+m) having polysiloxane skeleton and polydimethyl siloxane skeleton, as a resin having both polysiloxane component (L) and polydimethyl siloxane component (M). "Resin (l+m) having polysiloxane skeleton and polydimethyl siloxane skeleton" means a resin made by copolymerizing resin (l) having polysiloxane skeleton and resin (m) having polydimethyl siloxane skeleton.

It is preferable that the thickness of the scratch-resistant resin layer provided on one side of the laminated polyester film is 10 to 30 μm, and is more preferably 15 to 25 μm. If it is 10 to 30 μm, the surface specific resistance of the scratch-resistant resin layer can be set to less than $10^{13} \Omega/\square$ while maintaining the scratch resistance, so that dusts are prevented from adhering to the forming member to improve designs of the forming member and the formed body.

Figure 5:
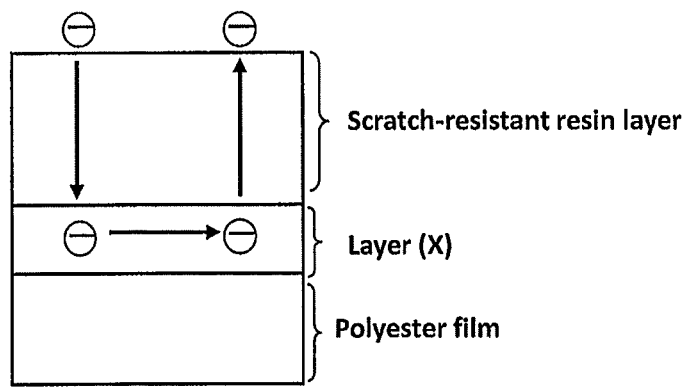
FIG. 5 is a model diagram concerning the antistatic property development in a forming member provided with a scratch-resistant resin layer.

It is thought that the model shown in FIG. 5 explains the reason why the surface specific resistance reduces to develop the antistatic property even if the scratch-resistant resin layer is laminated with 10 to 30 μm thickness.

It is thought that the scratch-resistant resin layer is not a complete insulator but a conductor with a great electric resistance. Therefore if the voltage is applied to the surface of the scratch-resistant resin layer, the electric current flows through the scratch-resistant resin layer and reaches layer (X) located under it. Because layer (X) contains conductive resin and forms a continuous phase structure, the electricity can flow efficiently. It is guessed that the surface specific resistance of the scratch-resistant resin layer decreases as a result the electricity flows through the scratch-resistant resin layer again after then.

On the other hand, it is confirmed that the antistatic property would not be developed as keeping the surface specific resistance of the scratch-resistant resin layer even if the scratch-resistant resin layer is made thick in a case that layer (X) is made of conductive resin which does not form a continuous phase structure.

To make the laminated polyester film, it is possible that forming layer (X) is layered on a polyester film with aqueous coating agent (x) which contains acrylic urethane copolymer resin (A), isocyanate compound (B), epoxy compound (C), compound (d-1) having polythiophene structure and compound (d-2) having anion structure.

From a viewpoint of improving the coating agent in stable storing and handling, it is possible that a very small amount of water-soluble organic solvent is contained in aqueous coating agent (x) which contains acrylic urethane copolymer resin (A), isocyanate compound (B), epoxy compound (C), compound (d-1) having polythiophene structure and compound (d-2) having anion structure. The water-soluble organic solvent may be water-soluble alcohol such as methyl alcohol, ethyl alcohol and isopropyl alcohol, water-soluble ketone such as acetone, water-soluble ether such as methyl cellosolve, cellosolve, butyl cellosolve, carbitol and butyl carbitol or the like. These can be employed by one kind each or mixture of two or more kinds From viewpoints of explosion protection and environmental pollution prevention, it is preferable that coating agent (x) contains the water-soluble organic solvent of 10 wt % or less, more preferably 7 wt % or less, and further preferably 5 wt % or less.

To make the laminated polyester film provided with forming layer (X) which contains acrylic urethane copolymer resin (A), isocyanate compound (B), epoxy compound (C), compound (d-1) having polythiophene structure and compound (d-2) having anion structure, it is possible that forming layer (X) is layered on a polyester film. Above all, it is preferable that coating agent (x) constituting layer (X) is coated on the polyester film. The coating method of the coating agent may be an offline coating method where the coating process is separated from the process producing the polyester film, and alternatively may be another inline coating method where the coating is performed in the same process producing the polyester film to make a laminated polyester film made by providing the polyester film with layer (X). From viewpoints of the cost saving and coating thickness uniformity, it is preferable that the inline coating method is employed. It is preferable that the coating agent contains a water-soluble solvent such as water as the most preferable example, from the viewpoint of the environmental pollution prevention and explosion protection.

For example, a melt-extruded polyester film before the crystalline orientation is stretched by around 2.5 to 5 times and then coating agent (x) for constituting layer (X) is coated on the uniaxially stretched film. The coated film is dried up as going through a stepwise heating zone, and is stretched by around 2.5 to 5 times in a width direction. Further, it is possible that the inline coating method is employed so that the film is successively led through a heating zone at 150 to 250° C. to complete the crystalline orientation. If the heat treatment is performed in the heating zone at 150 to 250° C., the crystalline orientation can be completed in the base film and the unstable continuous phase structure of layer (X) can be fixed.

The coating method with an aqueous coating agent containing water solvent may be reverse coating method, spray coating method, bar coating method, gravure coating method, rod coating method and die coating method or the like.

It is preferable that the surface of the polyester base film is treated with the corona discharge processing before aqueous coating agent (x) is applied, so that the coating property and adhesiveness between the polyester film and layer (X) are improved.

It is possible that layer (X) contains cross-linker, antioxidant, heat stabilizer, weathering agent, ultraviolet absorbent, organic anti-blocking agent, pigment, dye, organic or inorganic fine particles, filler, surfactant or the like.

Next, a producing method of the laminated polyester film will be explained although this disclosure is not limited to it particularly.

Pellets of polyethylene terephthalate (which may be called "resin P") and polyester (which may be called "resin Q") containing cyclohexanedimethanol are dried up under a condition of hot wind or vacuum, and then supplied to each separate extruders. Resins P and Q are heated to melt over the melting point in the extruders, and then supplied to a multi-layer laminating device such as multi-manifold die and field block, so as to be extruded in a sheet shape from the slit-shaped die. The sheet is closely attached on a mirror surfaced casting drum at 10 to 60° C. by the electrostatic attraction or the like and then cooled to be hardened to make an unstretched polyester film. The unstretched polyester film is stretched by 2.5 to 5 times in the longitudinal direction between rolls heated to 70 to 100° C. Thus obtained polyester film is treated by the corona discharge processing on one side or both sides of the polyester film, of which treated surface is coated with aqueous coating agent (x) constituting layer (X). Thus coated laminated polyester film is gripped with a clip and led to the drying zone to be dried at 70 to 150° C., and is successively stretched by 2.5 to 5 times in the width direction at 200 to 240° C. in a heating zone and heat-treated at 70 to 150° C. in another heating zone for 5 to 40 seconds, so that a laminated polyester film made by forming layer (X) on the polyester film in which the crystalline orientation is completed. It is possible that the film is subjected to a relaxation process by 3 to 12% during the heat treatment as needed. It is possible that particles are added to the polyester film raw material to give functions, such as slidability (antiblocking ability), weatherability and heat resistance, to the laminated polyester film. The particles to be added to the polyester film raw material may be an additive such as heat stabilizer, oxidation stabilizer, weathering agent, ultraviolet absorbent and anti-blocking agent. From the viewpoint of the environmental pollution prevention and explosion protection, it is preferable that the coating agent is an aqueous coating agent.

Next, methods of producing the forming member made from the laminated polyester film, as well as methods of producing the formed body made from the forming member and forming resin, will be explained, although this disclosure is not limited particularly to them.

For example, the laminated polyester film obtained by the producing method thereof is coated on one side with a print ink layer of 5 μm thickness to make the forming member. Further, the forming member is coated on the other side having no print ink layer with a hard coating layer made of curing resin of 2 μm thickness. The coating method may be bar coating method, gravure coating method or the like. Next, the forming member consisting of the laminated polyester film, print ink layer and hard coating layer may be preformed by the vacuum forming as needed. Thus prepared or preformed forming member is coated together with the forming resin by the in-mold or insert forming to make a formed body. It is possible that the gate structure is pin gate, side gate, film gate, tunnel gate, disk gate or the like, and is preferably side gate or film gate in particular.

Next, methods of producing the forming member made from the laminated polyester film provided with a scratch-resistant resin layer on at least one side, as well as methods of producing the formed body made from the forming member and forming resin, will be explained, although this disclosure is not limited particularly to them.

For example, the laminated polyester film obtained by the producing method thereof is coated on layer (X) side with the scratch-resistant resin layer of 25 μm thickness. The film is dried up at 60° C. for one hour and subjected to the aging treatment at 25° C. for 7 days to make the forming member. Next, the forming member is coated on the other side with no scratch-resistant resin layer with the print ink layer of 5 μm thickness. The coating method may be bar coating method, gravure coating method or the like. Next, the forming member consisting of the laminated polyester film, scratch-resistant resin layer and print ink layer may be preformed by the vacuum forming as needed. Thus prepared or preformed forming member is coated together with the forming resin by the in-mold or insert forming to make a formed body. Here, it is possible that the gate structure is pin gate, side gate, film gate, tunnel gate, disk gate or the like, and is preferably side gate or film gate in particular.

Characteristics Measurement and Effect Evaluation Methods (1) Method of Transparency Measurement The transparency is evaluated from haze (%). The haze level is measured with turbidity meter "NDH5000" made by Nippon Denshoku Industries after the laminated polyester film is left in normal condition (23° C., relative humidity 65%) for one hour. The measurement is performed three times and the average is regarded as the haze level of the laminated polyester film.

(2) Methods of Antistatic Property (Surface Specific Resistance) Measurement and Evaluation The antistatic property is evaluated from the surface specific resistance. The surface specific resistance is measured with digital ultra-high resistance/micro current meter "R8340A" made by Advantest at applied voltage 100V for 10 seconds after the laminated polyester film is left in normal condition (23° C., relative humidity 65%) for 24 hours. The measurement is performed on the laminated surface of layer (X) of the laminated polyester film. The unit is $\Omega/\square$. The surface specific resistance of $9\times10^{11}\Omega/\square$ or less is at a practical level. If it is $5\times10^{10}\Omega/\square$ or less, the surface is regarded as excellent in the antistatic property.

(3) Methods of Antistatic Property (Surface Specific Resistance) Measurement and Evaluation After Forming Process The antistatic property is evaluated from the surface specific resistance. The samples to be measured are cut into a rectangle of 200 mm length×100 mm width in the film width direction. The sample to be measured is stretched by 50% along the minor axis (width direction) with a film stretcher of pantograph type in a condition of 100° C. and 10 mm/s speed to make a post-forming laminated polyester film. The surface specific resistance is measured with digital ultra-high resistance/micro current meter "R8340A" made by Advantest at applied voltage 100V for 10 seconds after the post-forming laminated polyester film is left in normal condition (23° C., relative humidity 65%) for 24 hours. The measurement is performed on the laminated surface of layer (X) of the post-forming laminated polyester film. The unit is $\Omega/\square$. The surface specific resistance of $5\times10^{12}\Omega/\square$ or less is at a practical level. If it is $1\times10^{11}\Omega/\square$ or less, the surface is regarded as excellent in the antistatic property.

(4) Method of Evaluating Adhesiveness to Print Ink Layer (4-1) Initial Adhesiveness Evaluation Method The laminated polyester film is coated uniformly with the heat-curable ink made of ink, solvent and curing agent in the following proportions so that the cured film thickness is approximately 5 μm:

Ink: INQ screen ink (971) made by Teikoku Printing Inks Mfg. Co., Ltd: 100 parts by weight Solvent: F-003 made by Teikoku Printing Inks Mfg. Co., Ltd: 10 parts by weight Curing agent: curing agent 240 made by Teikoku Printing Inks Mfg. Co., Ltd: 3 parts by weight.

Then, the laminated polyester film coated with the heat-curable ink is dried up with a hot wind oven at 90° C. for 60 minutes to cure the heat-curable ink to make the ink-layered laminated polyester film.

100 pieces of 1 mm² rectangular cut are incised on the ink layer surface of the ink-layered laminated polyester film. Then, "CELLOTAPE (registered trademark)" CT405AP made by Nichiban Co., Ltd. is stuck to the surface and pressed by 1.5 kg/cm² load with a hand roller, and then exfoliated rapidly toward the direction perpendicular to the ink-layered laminated polyester film. The adhesiveness is evaluated into four levels by the number of rectangular cuts left on the surface. "C" means unpractical level, "B" means practical level, and "S" and "A" mean good levels.

S: 100 pieces are left.
A: 80 to 99 pieces are left.
B: 50 to 79 pieces are left.
C: 0 to 50 pieces are left.

(4-2) Hygrothermal Adhesiveness Evaluation Method

The ink-layered laminated polyester film is obtained by the same method as (4-1). Thus obtained ink-layered polyester film is left in a thermohygrostat bath at temperature 65° C. and relative humidity 95% for 168 hours to make an ink-layered sample for the heat and wetting test. With thus obtained ink-layered sample for the heat and wetting test, the adhesiveness is evaluated into four levels by the same method as (4-1). "C" means unpractical level, "B" means practical level, and "S" and "A" mean good levels.

(4-3) Post-Forming Initial Adhesiveness Evaluation Method

The ink-layered laminated polyester film is obtained by the same method as (4-1). The ink-layered laminated polyester film is cut into a rectangle of widthwise length 200 mm×width 100 mm to make a sample for measurement. Then the sample for measurement is uniaxially stretched by 50% in the minor axis direction (width direction) with a film stretcher of pantograph type in a condition of 100° C., 10 mm/s speed to make the post-forming ink-layered laminated polyester film. With thus obtained post-forming ink-layered laminated polyester film, the adhesiveness is evaluated into four levels by the same method as (4-1). "C" means unpractical level, "B" means practical level, and "S" and "A" mean good levels.

(4-4) Post-Forming Hygrothermal Adhesiveness Evaluation Method

The post-forming ink-layered laminated polyester film is produced by the same method as (4-3). With thus obtained post-forming ink-layered laminated polyester film, the adhesiveness is evaluated into four levels by the same method as (4-2). "C" means unpractical level, "B" means practical level, and "S" and "A" mean good levels.

(5) Adhesiveness to Hard Coating Layer Evaluation Method (5-1) Initial Adhesiveness Evaluation Method The laminated polyester film is coated by a bar coater uniformly with the UV-curable resin made in the following proportions so that the cured film thickness is approximately 2 μm:

Urethane acrylate (UA122P made by Shin-Nakamura Chemical Co., Ltd.): 80 parts by weight Polyester acrylate ("KAYARAD" DPHA made by Nippon Kayaku Co., Ltd.): 10 parts by weight Polyester acrylate ("KAYARAD" PETA made by Nippon Kayaku Co., Ltd.): 10 parts by weight Silicone oil (SH190 made by Dow Corning Toray Silicone Co., Ltd.): 3 parts by weight Photopolymerization initiator ("IRGACURE" 184 made by Nagase & Co., Ltd.): 3 parts by weight.

Next, the surface of layer (X) is irradiated with ultraviolet from 9 cm height of a light-condensing high-pressure mercury-vapor lamp (H03-L31 made by Eye Graphics Co., Ltd.) having irradiation intensity of 120 W/cm to achieve the integrated irradiation intensity of 300 mJ/cm². Thus layer (x) is cured to form a hard coating layer on the laminated polyester film, so that a hard-coated laminated polyester film is obtained. 100 pieces of 1 mm² rectangular cut are incised on the hard coating layer surface of the hard-coated laminated polyester film. Then, "CELLOTAPE (registered trademark)" CT405AP made by Nichiban Co., Ltd. is stuck to the surface and pressed by 1.5 kg/cm² load with a hand roller, and then exfoliated rapidly toward the direction perpendicular to the hard-coated laminated polyester film. The adhesiveness is evaluated into four levels by the number of rectangular cuts left on the surface. "C" means unpractical level, "B" means practical level, and "S" and "A" mean good levels.

S: 100 pieces are left.
A: 80 to 99 pieces are left.
B: 50 to 79 pieces are left.
C: 0 to 50 pieces are left.

(5-2) Hygrothermal Adhesiveness Evaluation Method

The hard-coated laminated polyester film is obtained by the same method as (5-1). Thus obtained hard-coated laminated polyester film is left in a thermohygrostat bath at temperature 65° C. and relative humidity 95% for 168 hours to make a hard-coated laminated sample for the heat and wetting test. With thus obtained hard-coated laminated sample for the heat and wetting test, the adhesiveness is evaluated into four levels by the same method as (5-1). "C" means unpractical level, "B" means practical level, and "S" and "A" mean good levels.

(5-3) Post-Forming Initial Adhesiveness Evaluation Method

The hard-coated laminated polyester film is obtained by the same method as (5-1). The hard-coated laminated polyester film is cut into a rectangle of widthwise length 200 mm×width 100 mm to make a sample for measurement. Then, the sample for measurement is uniaxially stretched by 50% in the minor axis direction (width direction) with a film stretcher of pantograph type in a condition of 100° C., 10 mm/s speed to make the post-forming hard-coated laminated polyester film. With thus obtained post-forming hard-coated laminated polyester film, the adhesiveness is evaluated into four levels by the same method as (5-1). "C" means unpractical level, "B" means practical level, and "S" and "A" mean good levels.

(5-4) Post-Forming Hygrothermal Adhesiveness Evaluation Method

The post-forming hard-coated laminated polyester film is produced by the same method as (5-3). With thus obtained post-forming hard-coated laminated polyester film, the adhesiveness is evaluated into four levels by the same method as (5-2). "C" means unpractical level, "B" means practical level, and "S" and "A" mean good levels.

(6) Δ Haze Measurement Method

The haze level before the heating is determined by measuring the haze level of the laminated polyester film by the same way as method (1). Then, the laminated polyester film sample fixed with four sides to a metal frame is heated for an hour as standing on a floor of hot wind oven "HIGH-TEMP-OVENPHH-200" made by ESPEC Corporation at 140° C. (air flow gauge set to "7"). After air-cooled for an hour, the surface opposite to layer (X) of the laminated polyester film is wiped off with nonwoven fabric (HAIZE gauze NT-4 made by Ozu Corporation) soaked with acetone, and is washed with acetone and then dried up for 40 hours to remove oligomers precipitated on the surface opposite to layer (X) of the laminated polyester film. Then, the haze level after the heating is determined by measuring the haze level of the sample by the same way as method (1). A haze value is calculated by subtracting the haze level before the heating from the haze level after the heating.

(7) F-100 Value Measurement Method

The laminated polyester film is cut into a rectangle of film lengthwise length 150 mm×width 10 mm to make a sample for lengthwise measurement. Similarly, the laminated polyester film is cut into another rectangle of film widthwise length 150 mm×width 10 mm to make a sample for widthwise measurement.

F-100 values are determined with a tensile tester (TENSILON UCT-100 made by Orientec Co., Ltd.) for the lengthwise measurement sample and widthwise measurement sample by the following method:

The distance between initial tensile chucks is 50 mm, and the tensile speed is 300 mm/m.

The tensile test is performed in the longitudinal direction of the sample.

The sample is preheated in a thermostat bath at 150° C. for 90 seconds and then subjected to the tensile test.

The load applied to the sample is read off when the sample is stretched by 100% or when the distance between the chucks is 100 mm, and such a read load is divided by the cross section (equal to "film thickness×10 mm") of the sample before the test. Thus calculated quotient value is F-100 value which means the stress when stretched by 100%. The measurement is performed five times each and the average is employed for the evaluation.

(8) Measurement and Evaluation Methods of Antistatic Property (Surface Specific Resistance) After Laminating Hard Coating Layer.

The surface specific resistance is employed to evaluate the antistatic property. First, the hard-coated laminated polyester film is prepared by the same method as (5-1). The hard-coated laminated polyester film is left in normal condition (23° C., relative humidity 65%) for 24 hours. Then, the surface specific resistance of the hard-coated laminated surface is measured with digital ultra-high resistance/micro current meter "R8340A" made by Advantest at applied voltage 100V for 10 seconds. The unit is $\Omega/\square$. The surface specific resistance of $9\times10^{12}\Omega/\square$ or less is at a practical level. If it is $9\times10^{11}\Omega/\square$ or less, the surface is regarded as excellent in the antistatic property.

(9) Hardness Measurement Method (Pencil Scratch Test) of Scratch-Resistant Resin Layer The surface of the scratch-resistant resin layer of the forming member made of laminated polyester film provided with the scratch-resistant resin layer is subjected to the pencil scratch test under the following conditions according to JISK5600-5-4 (1999) for "scratch hardness (pencil method)". The surface of the scratch-resistant resin layer is visually observed after 1 minute from the test, and the hardness of the scratch-resistant resin layer is determined to be no less than HB when any scratches are not observed.

Scratch device: Pencil scratch tester (made by COTEC Corporation)

Pencil: "uni" HB made by Mitsubishi Pencil Co., Ltd.

Load: 750 g

Scratch speed: 10 mm/s

(10) Thickness Measurement Method of Scratch-Resistant Resin Layer

The forming member made of laminated polyester resin provided with the scratch-resistant resin layer is cut into ultrathin membrane sections to be observed with TEM (transmission electronic microscope) under a condition capable of visually observing the cross-section structure by the stained ultrathin section method through $RuO_4$ staining, $OsO_4$ staining or double staining of both. The thickness of the scratch-resistant resin layer is determined from the section photograph. The measurement is performed three times and the average is regarded as measured value.

Measurement device: Transmission Electronic Microscope (H-7100FA type made by Hitachi Co., Ltd.)

Measurement condition: acceleration voltage 100 kV

Sample preparation: frozen ultrathin section method

(11) Methods of Antistatic Property Measurement and Evaluation for the Forming Member Made of Laminated Polyester Film Provided with Scratch-Resistant Resin Layer The antistatic property is evaluated from the surface specific resistance. The surface specific resistance is measured on the scratch-resistant resin layer of the forming member made of laminated polyester film provided with the scratch-resistant resin layer by the same method as (2). The unit is $\Omega/\square$. The surface specific resistance of $9\times10^{12}\Omega/\square$ or less is at a practical level. If it is $5\times10^{12}\Omega/\square$ or less, the surface is regarded as excellent in the antistatic property.

(12) Scratch-Resistance Evaluation Method

The surface of the scratch-resistant resin layer of the forming member made of laminated polyester film provided with the scratch-resistant resin layer is scratched with steel wool (#0000) of 2 cm×2 cm as applying 200 g load. The number of times of the steel wool reciprocation is counted until a scratch is visually observed. The number of times of the reciprocation is evaluated into three levels. "C" means unpractical level, "B" means practical level, and "A" means good level.
   A: 10 or more times of reciprocation
   B: 5 to 9 times of reciprocation
   C: less than 5 times of reciprocation
(13) Evaluation Method of Adhesiveness to the Scratch-Resistant Resin Layer
(13-1) Initial Adhesiveness Evaluation Method The laminated polyester film is coated on layer (X) side with constituent liquid of the scratch-resistant layer which is cured in the condition described in the Example. Thus the scratch-resistant resin-layered laminated polyester film is obtained.

100 pieces of 1 mm² rectangular cut are incised on the obtained scratch-resistant resin layer surface of the scratch-resistant resin-layered laminated polyester film. Then, "CELLOTAPE (registered trademark)" CT405AP made by Nichiban Co., Ltd. is stuck to the surface and pressed by 1.5 kg/cm² load with a hand roller, and then exfoliated rapidly toward the direction perpendicular to the ink-layered laminated polyester film. The adhesiveness is evaluated into four levels by the number of rectangular cuts left on the surface. "C" means unpractical level, "B" means practical level, and "S" and "A" mean good levels.
   S: 100 pieces are left.
   A: 80 to 99 pieces are left.
   B: 50 to 79 pieces are left.
   C: 0 to 50 pieces are left.
(13-2) Hygrothermal Adhesiveness Evaluation Method The scratch-resistant resin-layered laminated polyester film is obtained by the same method as (13-1). Thus obtained scratch-resistant resin-layered polyester film is left in a thermohygrostat bath at temperature 65° C. and relative humidity 95% for 72 hours to make a scratch-resistant resin-layered sample for the heat and wetting test. With thus obtained scratch-resistant resin-layered sample for the heat and wetting test, the adhesiveness is evaluated into four levels by the same method as (13-1). "C" means unpractical level, "B" means practical level, and "S" and "A" mean good levels.
(14) Evaluation Method of the Presence of Continuous Phase Structure (Determination with Section Photograph of Transmission Electronic Microscope)

With the laminated polyester film, a sample of layer (X) surface is prepared by $OsO_4$-stained ultrathin membrane section method. The cross section of thus prepared sample is observed with transmission electronic microscope (TEM) to obtain a section photograph. If a web structure is found in the section photograph, the presence is determined to be "Y".
   Y: Continuous phase structure is present in layer (X).
   N: Continuous phase structure is not present in layer (X).
   Measurement device: Transmission Electronic Microscope (H-7100FA type made by Hitachi Co., Ltd.)
   Measurement condition: acceleration voltage 100 kV
   Magnifying power: ×20,000
(15) Measurement Method of Standard Deviation of the Area Ratio of Phase 2 (Such as Mixture (C+D)) in Layer (X)

With the laminated polyester film, a sample of layer (X) surface is prepared on a collodion film by $OsO_4$-stained ultrathin membrane section method. Au colloidal particle is used as a marker for the positioning in the three dimensional reconstitution process. While the cross section of the prepared measurement sample is getting inclined by every 1°, the sectional continuous inclined images are obtained in the following condition. After the CT reconstitution processing is performed based on the obtained images in order to obtain a three-dimensional reconstitution process image, the area of a section parallel to the base material and the black part area in the section are measured by every 1 nm along layer (X) thickness direction so as to calculate the area ratio of the black parts in each section. Afterwards, the standard deviation is calculated about the measured values of area ratio of the black parts obtained by every 1 nm in the thickness direction. The "section parallel to the base material or roughly parallel to layer (X)" means a section which is parallel to X-Y plane in FIG. 6. The "thickness direction" means a direction which is parallel to Z-axis. Even with the three-dimensional reconstitution process image, the black parts can be regarded as phase 2 (such as mixture (C+D)) because the staining method is similar to the one for the section observation of layer (X) with the transmission electronic microscope (TEM).
   Measurement device: Field emission electronic microscope (JEM2100F made by JEOL)
   Software for graphic: Digital Micrograph (made by Gatan Inc.)
   Measurement condition: acceleration voltage 100 kV
   Magnifying power: ×20,000
   Measurement system: Marker method
   Inclination angle: +65° to −66°
   Reconstitution resolution: 0.54 nm/pixel

EXAMPLES

Hereinafter, our films, members, formed bodies and methods will be explained with Examples, although the disclosure is not limited thereto. The following Reference Examples will show synthesis methods of acrylic urethane copolymer resin, composition made from a compound having polythiophene structure and another compound having anion structure, and polystyrene sulfonate ammonium salt.

Reference Example 1

Preparation of Aqueous Dispersion of Acrylic Urethane Copolymer (a-2)

Under nitrogen gas atmosphere and normal temperature (25° C.) condition, 66 parts by weight of polyester-based urethane resin ("HYDRAN" AP-40 (F) made by DIC Corporation), 35 parts by weight of methyl methacrylate, 29 parts by weight of acrylic acid ethyl, and 2 parts by weight of N-methylol acrylic amide are put in container 1 to make solution 1. Then, water and 7 parts by weight of emulsifier ("REASOAP" ER-30 made by ADEKA Corporation) are added so that the solid content concentration becomes 50 wt % in the solution to make solution 2. 30 parts by weight of water is put in container 2 at normal temperature (25° C.), and the solution is heated to 60° C. Afterwards, solution 2 is dripped continuously while stirred for three hours. Additionally 5 wt % potassium persulfate (0.1% by weight of acryl) water solution is continuously dripped at the same time. After being dripped and additionally stirred for two hours, the solution is cooled to 25° C. to complete the reaction to make aqueous dispersion of acrylic urethane copolymer resin (a-2). Thus obtained aqueous dispersion of acrylic urethane copolymer resin (a-2) has a solid content concentration of 30 wt %.

Reference Example 2

Preparation of Aqueous Dispersion of Composition (d-3) Made from a Compound Having Polythiophene Structure and Another Compound Having Anion Structure 49 parts by weight of 1 wt % ferric sulfate (iron (III) sulfate) water solution, 8.8 parts by weight of 3,4-ethylenedioxy thiofen as compound having thiophene structure, and 117 parts by weight of 10.9 wt % peroxydisulfuric acid water solution are added to 1,887 parts by weight of solution containing 20.8 parts by weight of polystyrene sulfonate as compound having anion structure. The mixture is stirred at 18° C. for 23 hours. 154 parts by weight of cation exchange resin and 232 parts by weight of anion exchange resin are added to this mixture. The ion exchange resins are removed by filtering after being stirred for two hours to make aqueous dispersion of composition (d-3) made from poly(3,4-ethylenedioxy thiofen) and polystyrene sulfonate. The weight proportion (compound having polythiophene structure/compound having anion structure) is 4/6. Thus obtained aqueous dispersion of composition (d-3) made from compound having polythiophene structure and compound having anion structure has a solid content concentration of 1.3 wt %.

Reference Example 3

Preparation of Composition (d-4) Made from Compound Having Polythiophene Structure and Compound Having Anion Structure Aqueous dispersion of composition (d-4) made from poly (3,4-ethylenedioxy thiofen) and polystyrene sulfonate is prepared by the method of Reference Example 3 except that the content of polystyrene sulfonate is replaced by 9.0 parts by weight. The weight proportion (compound having polythiophene structure/compound having anion structure) is 5/5. Thus obtained aqueous dispersion of composition (d-4) made from compound having polythiophene structure and compound having anion structure has a solid content concentration of 1.3 wt %.

Reference Example 4

Preparation of Aqueous Dispersion of Polystyrene Sulfonate Ammonium Salt (J)

Under nitrogen gas atmosphere and normal temperature (25° C.) condition, 200 parts by weight of water and 1 part by weight of ammonium persulfate are put in container 1 to make solution 3 heated to 85° C. Under normal temperature (25° C.), 100 parts by weight of styrene sulfonic acid ammonium salt, 3 parts by weight of ammonium persulfate and 100 parts by weight of water are put in container 4 to make solution 2. Under nitrogen gas atmosphere, solution 3 is transferred to a reactor in which solution is maintained at 85° C., and solution 4 is dripped into solution 1 continuously for four hours. After being dripped and additionally stirred for three hours, the solution is cooled to 25° C. to make aqueous dispersion of polystyrene sulfonate ammonium salt (J). Thus obtained aqueous dispersion of polystyrene sulfonate ammonium salt (J) has a solid content concentration of 10 wt %.

Reference Example 5

Preparation of Resin (l) Solution Having Polysiloxane Skeleton

Under nitrogen gas atmosphere and normal temperature (25° C.) condition, 100 parts by weight of water, 106 parts by weight of ethanol, 270 parts by weight of γ-methacryloxy propyl methyl dimethoxy silane, 1 part by weight of 1% hydrochloric acid and 0.1 parts by weight of hydroquinone monomethyl ether are put in a reactor and heated to 85° C. to react for two hours. Then, after being heated to 180° C. gradually for two hours, water and ethanol are distilled and the mixture is cooled to 25° C. and diluted by methyl isobutyl ketone to make resin (l) solution having polysiloxane skeleton. Thus obtained resin (l) solution having polysiloxane skeleton has a solid content concentration of 50 wt %.

Reference Example 6

Preparation of Resin (l+m) Solution Having Polysiloxane Skeleton and Polydimethyl Siloxane Skeleton Under nitrogen gas atmosphere and normal temperature (25° C.) condition, 20 parts by weight of methyl methacrylate, 26 parts by weight of butyl methacrylate, 23 parts by weight of 2-hydroxyethyl methacrylate, 10 parts by weight of resin (l) having polysiloxane skeleton, 1 part by weight of methacryl acid, and 20 parts by weight of one terminal methacryl-modified polydimethyl siloxane (X-22-174DX made by Shin-Etsu Chemical Co., Ltd.) are put in container 1 to make solution 1. Further, under nitrogen gas atmosphere and normal temperature (25° C.) condition, 50 parts by weight of toluene and 50 parts by weight of methyl isobutyl ketone are put in a reactor and heated to 80° C. to make solution 2. The solution in the reactor is maintained at 80° C., and solution 1 is dripped into solution 2 continuously for three hours. After being dripped and additionally stirred for six hours, the solution is cooled to 25° C. to complete the reaction to make resin (l+m) having polysiloxane skeleton and polydimethyl siloxane skeleton. Thus obtained resin (l+m) solution having polysiloxane skeleton and polydimethyl siloxane skeleton has a solid content concentration of 50 wt %.

Example 1

Polyethylene terephthalate (which may be called "resin P1") and copolymerized polyethylene terephthalate resin (which may be called "resin Q1") made by copolymerizing 100 parts by mol of glycol resin with 30 parts by mol of cyclohexanedimethanol are dried up and then supplied to each separate extruders. Resin P1 and resin Q1 are melted at 280° C. in each extruder and delivered through each gear pump and filter to join together to be laminated by turns with a feed block of 801 layers at 1.1/1 of discharge ratio. Thus obtained laminated body is laminated with alternate 401-layered resin P1 and 400-layered resin Q1 in the thickness direction. Both outermost layers are made of resin P1. Thus laminated body consisting of 801 layers is supplied to a multi-manifold die to make a multilayered laminated sheet. The formed sheet is quenched to be solidified on a casting drum surface maintained at 25° C. with applying static electricity. Thus obtained cast film is heated with a group of rolls set at 75° C., and then stretched by 3.3 times in the longitudinal direction as 100 mm of section length of stretched film is rapidly heated with a radiation heater from both sides. And then it is cooled once. After the uniaxially-stretched film is subjected to the corona discharge processing in air, the corona discharge-processed surface is coated with aqueous coating agent (x-1) made by mixing the following constituents.

Composition of Aqueous Coating Agent (x-1)

Aqueous dispersion of acrylic urethane copolymer resin (a-1): "SANNARON" WG-658 (solid content concentration 30 wt %) made by Sannan Chemical Industry Co., Ltd.

Aqueous dispersion of isocyanate compound (b): "ELASTRON" E-37 (solid content concentration 28 wt %) made by Dai-ichi Kogyo Seiyaku Co., Ltd.
Epoxy compound (c): "CR-5L" (solid content concentration 100 wt %) made by DIC Co., Ltd.
Aqueous dispersion of composition (d-3) made from compound having polythiophene structure and compound having anion structure Aqueous solvent (G): pure water
Aqueous dispersions (a-1) . . . (d-3) are mixed by solid content weight proportion of (a-1)/(b)/(c)/(d-3)=100/80/60/10. Then aqueous solvent (G) is added to it so that the solid content weight concentration of aqueous coating agent (x-1) is adjusted to 3 wt %. Table 1 shows the weight composition of each aqueous dispersion in aqueous coating agent (x-1).

TABLE 1

| | | Weight composition of each aqueous dispersion in coating agent (x) (Each value indicates added amount (g) of each aqueous dispersion) | | | | | | | | |
|---|---|---|---|---|---|---|---|---|---|---|
| | | Aqueous dispersion of acrylic urethane copolymer (a) | | Aqueous dispersion of isocyanate compound | Aqueous dispersion of epoxy compound | Aqueous dispersion of composition (d) made from compound (d-1) having polythiophene structure and compound (d-2) having anion | | Aqueous dispersion of oxazoline compound | Aqueous dispersion of carbodiimide compound (f) | Pure water |
| | | a-1 | a-2 | (b) | (c) | d-3 | d-4 | (e) | | (G) |
| Example 1 | Coating agent x-1 | 4.00 | 0 | 3.43 | 0.72 | 9.23 | 0 | 0 | 0 | 82.62 |
| Example 2 | Coating agent x-2 | 3.92 | 0 | 3.36 | 0.71 | 13.57 | 0 | 0 | 0 | 78.44 |
| Example 3 | Coating agent x-3 | 3.70 | 0 | 3.17 | 0.67 | 25.64 | 0 | 0 | 0 | 66.81 |
| Example 4 | Coating agent x-4 | 3.57 | 0 | 3.06 | 0.96 | 8.24 | 0 | 0 | 0 | 84.16 |
| Example 5 | Coating agent x-5 | 3.51 | 0 | 3.01 | 0.95 | 12.15 | 0 | 0 | 0 | 80.39 |
| Example 6 | Coating agent x-6 | 3.33 | 0 | 2.86 | 0.90 | 23.08 | 0 | 0 | 0 | 69.83 |
| Example 7 | Coating agent x-7 | 3.85 | 0 | 3.71 | 0.69 | 8.88 | 0 | 0 | 0 | 82.88 |
| Example 8 | Coating agent x-8 | 3.77 | 0 | 3.94 | 0.68 | 13.06 | 0 | 0 | 0 | 78.85 |
| Example 9 | Coating agent x-9 | 3.57 | 0 | 3.44 | 0.64 | 24.73 | 0 | 0 | 0 | 67.62 |
| Example 10 | Coating agent x-10 | 3.45 | 0 | 3.33 | 0.93 | 7.96 | 0 | 0 | 0 | 84.34 |
| Example 11 | Coating agent x-11 | 3.39 | 0 | 3.27 | 0.92 | 11.73 | 0 | 0 | 0 | 80.69 |
| Example 12 | Coating agent x-12 | 3.23 | 0 | 3.11 | 0.87 | 22.33 | 0 | 0 | 0 | 70.46 |
| Example 13 | Coating agent x-13 | 3.70 | 0 | 3.97 | 0.67 | 8.55 | 0 | 0 | 0 | 83.11 |
| Example 14 | Coating agent x-14 | 3.64 | 0 | 3.90 | 0.65 | 12.59 | 0 | 0 | 0 | 79.23 |
| Example 15 | Coating agent x-15 | 3.45 | 0 | 3.69 | 0.62 | 23.87 | 0 | 0 | 0 | 68.36 |
| Example 16 | Coating agent x-16 | 3.33 | 0 | 3.57 | 0.75 | 19.23 | 0 | 0 | 0 | 73.11 |
| Example 17 | Coating agent x-17 | 0 | 3.3 | 3.57 | 0.75 | 19.23 | 0 | 0 | 0 | 73.11 |
| Example 18 | Coating agent x-18 | 3.33 | 0 | 3.57 | 0.75 | 0 | 19.23 | 0 | 0 | 73.11 |
| Example 19 | Coating agent x-19 | 3.33 | 0 | 3.57 | 0.90 | 7.69 | 0 | 0 | 0 | 84.50 |
| Example 20 | Coating agent x-20 | 3.28 | 0 | 3.51 | 0.89 | 11.35 | 0 | 0 | 0 | 80.97 |
| Example 21 | Coating agent x-21 | 3.13 | 0 | 3.35 | 0.84 | 21.63 | 0 | 0 | 0 | 71.05 |
| Example 22 | Coating agent x-22 | 3.64 | 0 | 4.09 | 0.65 | 8.39 | 0 | 0 | 0 | 83.23 |
| Example 23 | Coating agent x-23 | 3.57 | 0 | 4.02 | 0.64 | 12.36 | 0 | 0 | 0 | 79.41 |
| Example 24 | Coating agent x-24 | 3.39 | 0 | 3.81 | 0.61 | 23.47 | 0 | 0 | 0 | 68.72 |
| Example 25 | Coating agent x-25 | 3.28 | 0 | 3.69 | 0.89 | 7.57 | 0 | 0 | 0 | 84.58 |
| Example 26 | Coating agent x-26 | 3.23 | 0 | 3.63 | 0.87 | 11.17 | 0 | 0 | 0 | 81.11 |
| Example 27 | Coating agent x-27 | 3.08 | 0 | 3.46 | 0.83 | 21.30 | 0 | 0 | 0 | 71.33 |
| Example 28 | Coating agent x-28 | 3.57 | 0 | 4.21 | 0.64 | 8.24 | 0 | 0 | 0 | 83.33 |
| Example 29 | Coating agent x-29 | 3.51 | 0 | 4.14 | 0.63 | 12.15 | 0 | 0 | 0 | 79.58 |

TABLE 1-continued

| | | Weight composition of each aqueous dispersion in coating agent (x) (Each value indicates added amount (g) of each aqueous dispersion) | | | | | | | |
|---|---|---|---|---|---|---|---|---|---|
| | | Aqueous dispersion of acrylic urethane copolymer (a) | | Aqueous dispersion of isocyanate compound | Aqueous dispersion of epoxy compound | Aqueous dispersion of composition (d) made from compound (d-1) having polythiophene structure and compound (d-2) having anion | | Aqueous dispersion of oxazoline compound | Aqueous dispersion of carbodiimide compound (f) | Pure water (G) |
| | | a-1 | a-2 | (b) | (c) | d-3 | d-4 | (e) | | |
| Example 30 | Coating agent x-30 | 3.33 | 0 | 3.93 | 0.60 | 23.08 | 0 | 0 | 0 | 69.06 |
| Example 31 | Coating agent x-31 | 3.23 | 0 | 3.80 | 0.87 | 7.44 | 0 | 0 | 0 | 84.66 |
| Example 32 | Coating agent x-32 | 3.17 | 0 | 3.74 | 0.86 | 10.99 | 0 | 0 | 0 | 81.24 |
| Example 33 | Coating agent x-33 | 3.03 | 0 | 3.57 | 0.82 | 20.98 | 0 | 0 | 0 | 71.60 |

The unidirectionally-stretched film coated with aqueous agent (x-1) is led to a tenter, and then is stretched by 3.5 times in the width direction at 110° C. after preheated with hot wind at 100° C. The stretched film is heat-treated with hot wind at 230° C. in the tenter, and consequently is relaxed by 5% in the width direction at the same temperature to make a laminated polyester film provided with layer (X) on both sides. The thickness of the laminated polyester film is 100 μm. The weight proportion of each resin and compound in layer (X) of thus obtained polyester film is shown in Table 2. Table 2 shows characteristics of thus obtained laminated polyester film.

TABLE 2

| | Weight composition of each resin and compound in layer X | | | | | | Characteristics of laminated polyerster film | |
|---|---|---|---|---|---|---|---|---|
| | Acrylic urethane copolymer (A) | Isocyanate compound (B) | Epoxy compound (C) | Compound having polythiophene structure (d-1) | Compound having anion structure (d-2) | Sum of contents (d-1) and (d-2) | F-100 value (MPa) | |
| | | | | | | | Lengthwise direction | Widthwise direction |
| Example 1 | 100 | 80 | 60 | 4 | 6 | 10 | 42 | 53 |
| Example 2 | 100 | 80 | 60 | 6 | 9 | 15 | 42 | 53 |
| Example 3 | 100 | 80 | 60 | 12 | 18 | 30 | 42 | 53 |
| Example 4 | 100 | 80 | 90 | 4 | 6 | 10 | 42 | 53 |
| Example 5 | 100 | 80 | 90 | 6 | 9 | 15 | 42 | 53 |
| Example 6 | 100 | 80 | 90 | 12 | 18 | 30 | 42 | 53 |
| Example 7 | 100 | 90 | 60 | 4 | 6 | 10 | 42 | 53 |
| Example 8 | 100 | 90 | 60 | 6 | 9 | 15 | 42 | 53 |
| Example 9 | 100 | 90 | 60 | 12 | 18 | 30 | 42 | 53 |
| Example 10 | 100 | 90 | 90 | 4 | 6 | 10 | 42 | 53 |
| Example 11 | 100 | 90 | 90 | 6 | 9 | 15 | 42 | 53 |
| Example 12 | 100 | 90 | 90 | 12 | 18 | 30 | 42 | 53 |
| Example 13 | 100 | 100 | 60 | 4 | 6 | 10 | 42 | 53 |
| Example 14 | 100 | 100 | 60 | 6 | 9 | 15 | 42 | 53 |
| Example 15 | 100 | 100 | 60 | 12 | 18 | 30 | 42 | 53 |
| Example 16 | 100 | 100 | 75 | 10 | 15 | 25 | 42 | 53 |
| Example 17 | 100 | 100 | 75 | 10 | 15 | 25 | 42 | 53 |
| Example 18 | 100 | 100 | 75 | 12.5 | 12.5 | 25 | 42 | 53 |
| Example 19 | 100 | 100 | 90 | 4 | 6 | 10 | 42 | 53 |
| Example 20 | 100 | 100 | 90 | 6 | 9 | 15 | 42 | 53 |
| Example 21 | 100 | 100 | 90 | 12 | 18 | 30 | 42 | 53 |
| Example 22 | 100 | 105 | 60 | 4 | 6 | 10 | 42 | 53 |
| Example 23 | 100 | 105 | 60 | 6 | 9 | 15 | 42 | 53 |
| Example 24 | 100 | 105 | 60 | 12 | 18 | 30 | 42 | 53 |
| Example 25 | 100 | 105 | 90 | 4 | 6 | 10 | 42 | 53 |
| Example 26 | 100 | 105 | 90 | 6 | 9 | 15 | 42 | 53 |
| Example 27 | 100 | 105 | 90 | 12 | 18 | 30 | 42 | 53 |
| Example 28 | 100 | 110 | 60 | 4 | 6 | 10 | 42 | 53 |
| Example 29 | 100 | 110 | 60 | 6 | 9 | 15 | 42 | 53 |
| Example 30 | 100 | 110 | 60 | 12 | 18 | 30 | 42 | 53 |
| Example 31 | 100 | 110 | 90 | 4 | 6 | 10 | 42 | 53 |

TABLE 2-continued

| | | | | | | | | |
|---|---|---|---|---|---|---|---|---|
| Example 32 | 100 | 110 | 90 | 6 | 9 | 15 | 42 | 53 |
| Example 33 | 100 | 110 | 90 | 12 | 18 | 30 | 42 | 53 |

| | Characteristics of layer X | | | | | | |
|---|---|---|---|---|---|---|---|
| | With continuous phase structure? | Standard deviation of area ratio of mixture (C + D) in layer (X) | Haze (%) | adhesiveness to print ink layer | | | |
| | | | | Before forming | | After forming | |
| | | | | Initial | Hygro-thermal | Initial | Hygro-thermal |
| Example 1 | Y | 6 | 2.3 | A | B | A | B |
| Example 2 | Y | 6 | 2.3 | A | B | A | B |
| Example 3 | Y | 6 | 2.5 | A | B | A | B |
| Example 4 | Y | 6 | 2.0 | A | B | A | B |
| Example 5 | Y | 5 | 2.1 | A | B | A | B |
| Example 6 | Y | 5 | 2.3 | A | B | A | B |
| Example 7 | Y | 6 | 2.4 | S | A | S | A |
| Example 8 | Y | 6 | 2.4 | S | A | S | A |
| Example 9 | Y | 6 | 2.5 | S | A | S | A |
| Example 10 | Y | 5 | 2.1 | S | A | S | A |
| Example 11 | Y | 5 | 2.2 | S | A | S | A |
| Example 12 | Y | 5 | 2.4 | S | A | S | A |
| Example 13 | Y | 5 | 2.4 | S | A | S | A |
| Example 14 | Y | 6 | 2.4 | S | A | S | A |
| Example 15 | Y | 7 | 2.5 | S | A | S | A |
| Example 16 | Y | 5 | 2.2 | S | A | S | A |
| Example 17 | Y | 5 | 3.0 | S | A | S | A |
| Example 18 | Y | 5 | 2.3 | S | A | S | A |
| Example 19 | Y | 5 | 2.2 | S | A | S | A |
| Example 20 | Y | 5 | 2.2 | S | A | S | A |
| Example 21 | Y | 6 | 2.3 | S | A | S | A |
| Example 22 | Y | 6 | 2.5 | S | A | S | A |
| Example 23 | Y | 7 | 2.5 | S | A | S | A |
| Example 24 | Y | 7 | 2.6 | S | A | S | A |
| Example 25 | Y | 6 | 2.4 | S | A | S | A |
| Example 26 | Y | 6 | 2.4 | S | A | S | A |
| Example 27 | Y | 5 | 2.5 | S | A | S | A |
| Example 28 | Y | 6 | 2.9 | S | A | S | A |
| Example 29 | Y | 6 | 2.9 | S | A | S | A |
| Example 30 | Y | 7 | 3.0 | S | A | S | A |
| Example 31 | Y | 5 | 2.8 | S | A | S | A |
| Example 32 | Y | 5 | 2.8 | S | A | S | A |
| Example 33 | Y | 5 | 2.9 | S | A | S | A |

| | Characteristics of layer X | | | | | | |
|---|---|---|---|---|---|---|---|
| | adhesiveness to hard coating layer | | | | Antistatic property ($\Omega/\square$) | | ΔHaze (%) |
| | Before forming | | After forming | | | | |
| | Initial | Hygro-thermal | Initial | Hygro-thermal | Before forming | After forming | |
| Example 1 | A | B | A | B | $7 \times 10^{10}$ | $2 \times 10^{11}$ | 0.7 |
| Example 2 | A | B | A | B | $8 \times 10^{9}$ | $3 \times 10^{10}$ | 0.6 |
| Example 3 | A | B | A | B | $5 \times 10^{9}$ | $1 \times 10^{10}$ | 0.7 |
| Example 4 | A | B | A | B | $9 \times 10^{10}$ | $4 \times 10^{11}$ | 0.7 |
| Example 5 | A | B | A | B | $1 \times 10^{10}$ | $5 \times 10^{10}$ | 0.6 |
| Example 6 | A | B | A | B | $5 \times 10^{9}$ | $9 \times 10^{9}$ | 0.6 |
| Example 7 | A | A | A | A | $9 \times 10^{10}$ | $4 \times 10^{11}$ | 0.7 |
| Example 8 | A | A | A | A | $8 \times 10^{9}$ | $3 \times 10^{10}$ | 0.7 |
| Example 9 | A | A | A | A | $5 \times 10^{9}$ | $9 \times 10^{9}$ | 0.7 |
| Example 10 | A | A | A | A | $2 \times 10^{11}$ | $7 \times 10^{11}$ | 0.5 |
| Example 11 | A | A | A | A | $2 \times 10^{10}$ | $7 \times 10^{10}$ | 0.6 |
| Example 12 | A | A | A | A | $8 \times 10^{9}$ | $3 \times 10^{10}$ | 0.5 |
| Example 13 | S | A | S | A | $8 \times 10^{10}$ | $4 \times 10^{11}$ | 0.6 |
| Example 14 | S | A | S | A | $8 \times 10^{9}$ | $2 \times 10^{10}$ | 0.7 |
| Example 15 | S | A | S | A | $5 \times 10^{9}$ | $9 \times 10^{9}$ | 0.6 |
| Example 16 | S | A | S | A | $5 \times 10^{9}$ | $9 \times 10^{9}$ | 0.7 |
| Example 17 | S | A | S | A | $5 \times 10^{9}$ | $1 \times 10^{10}$ | 0.7 |
| Example 18 | S | A | S | A | $7 \times 10^{9}$ | $3 \times 10^{10}$ | 0.6 |
| Example 19 | S | A | S | A | $3 \times 10^{11}$ | $6 \times 10^{11}$ | 0.7 |
| Example 20 | S | A | S | A | $2 \times 10^{10}$ | $5 \times 10^{10}$ | 0.6 |

TABLE 2-continued

| | | | | | | | |
|---|---|---|---|---|---|---|---|
| Example 21 | S | A | S | A | $8 \times 10^9$ | $3 \times 10^{10}$ | 0.6 |
| Example 22 | S | A | S | A | $7 \times 10^{10}$ | $2 \times 10^{11}$ | 0.8 |
| Example 23 | S | A | S | A | $8 \times 10^9$ | $2 \times 10^{10}$ | 0.9 |
| Example 24 | S | A | S | A | $5 \times 10^9$ | $8 \times 10^9$ | 1.0 |
| Example 25 | S | A | S | A | $4 \times 10^{11}$ | $9 \times 10^{11}$ | 0.9 |
| Example 26 | S | A | S | A | $3 \times 10^{10}$ | $6 \times 10^{10}$ | 0.9 |
| Example 27 | S | A | S | A | $1 \times 10^{10}$ | $8 \times 10^{10}$ | 0.7 |
| Example 28 | S | A | S | A | $4 \times 10^{11}$ | $8 \times 10^{11}$ | 1.0 |
| Example 29 | S | A | S | A | $5 \times 10^{10}$ | $1 \times 10^{11}$ | 1.0 |
| Example 30 | S | A | S | A | $8 \times 10^9$ | $9 \times 10^{10}$ | 0.9 |
| Example 31 | S | A | S | A | $5 \times 10^{11}$ | $9 \times 10^{11}$ | 1.1 |
| Example 32 | S | A | S | A | $4 \times 10^{10}$ | $8 \times 10^{10}$ | 1.0 |
| Example 33 | S | A | S | A | $2 \times 10^{10}$ | $8 \times 10^{10}$ | 1.1 |

(A) to (F) in the Table indicate the following meanings
(A): acrylic urethane copolymer resin
(B): isocyanate compound
(C): epoxy compound
(d-1): compound having polythiophene structure
(d-2): compound having anion structure
(E): oxazoline compound
(F): carbodiimide compound.

Examples 2 to 16

Laminated polyester film are made by the method of Example 1 except that acrylic urethane copolymer resin (A), isocyanate compound (B), epoxy compound (C), compound (d-1) having polythiophene structure and compound (d-2) having anion structure are mixed by the proportion shown in Table 2. The weight compositions of each aqueous dispersion in aqueous coating agent (x) are shown in Table 1. The weight proportions of each resin and compound in thus obtained layer (X) are shown in Table 2. Table 2 shows characteristics of thus obtained laminated polyester films. (In Table 1, coating agent x-2 is employed in Example 2 and coating agent x-3 is employed in Example 3. Similar notations are used in the following Examples.)

Example 17

A laminated polyester film is made by the method of Example 16 except that aqueous dispersion of acrylic urethane copolymer resin (a-2) is employed instead of aqueous dispersion of acrylic urethane copolymer resin (a-1). The weight composition of each aqueous dispersion in aqueous coating agent (x) is shown in Table 1. The weight proportion of each resin and compound in thus obtained layer (X) is shown in Table 2. Table 2 shows characteristics of thus obtained laminated polyester film.

Example 18

A laminated polyester film is made by the method of Example 16 except that aqueous dispersion of composition (d-4) made from compound having polythiophene structure and compound having anion structure is employed instead of aqueous dispersion of composition (d-4) made from compound having polythiophene structure and compound having anion structure. The weight composition of each aqueous dispersion in aqueous coating agent (x) is shown in Table 1. The weight proportion of each resin and compound in thus obtained layer (X) is shown in Table 2. Table 2 shows characteristics of thus obtained laminated polyester film.

Examples 19 to 33

Laminated polyester films are made by the method of Example 1 except that acrylic urethane copolymer resin (A), isocyanate compound (B), epoxy compound (C), compound (d-1) having polythiophene structure and compound (d-2) having anion structure are mixed by the proportions shown in Table 2. The weight compositions of each aqueous dispersion in aqueous coating agent (x) are shown in Table 1. The weight proportions of each resin and compound in thus obtained layer (X) are shown in Table 2. Table 2 shows characteristics of thus obtained laminated polyester films.

Example 34

A laminated polyester film is made by the method of Example 33 except that aqueous coating agent (x-34) constituted by the following composition is employed. The weight proportion of each resin and compound in thus obtained layer (X) is shown in Table 3. Table 3 shows characteristics of thus obtained laminated polyester film. Table 4 shows the antistatic property after laminating the hard coating layer.

TABLE 3

| | Weight composition of each resin and compound in layer X | | | | | | |
|---|---|---|---|---|---|---|---|
| | Acrylic urethane copolymer (A) | Isocyanate compound (B) | Epoxy compound (C) | Compound having polythiophene structure (d-1) | Compound having anion structure (d-2) | Oxaoline compound (E) | Carbodimide compound (F) | Sum of contents (d-1) and (d-2) |
| Example 34 | 100 | 100 | 75 | 10 | 15 | 60 | 60 | 25 |
| Example 35 | 100 | 100 | 75 | 10 | 15 | 60 | 60 | 25 |
| Example 36 | 100 | 100 | 75 | 10 | 15 | 50 | 50 | 25 |
| Example 37 | 100 | 100 | 75 | 10 | 15 | 80 | 50 | 25 |

TABLE 3-continued

| | | | | | | | | |
|---|---|---|---|---|---|---|---|---|
| Example 38 | 100 | 100 | 75 | 10 | 15 | 50 | 80 | 25 |
| Example 39 | 100 | 100 | 75 | 10 | 15 | 80 | 80 | 25 |
| Example 40 | 100 | 100 | 75 | 10 | 15 | 49 | 50 | 25 |
| Example 41 | 100 | 100 | 75 | 10 | 15 | 50 | 49 | 25 |
| Example 42 | 100 | 100 | 75 | 10 | 15 | 49 | 49 | 25 |
| Example 43 | 100 | 100 | 75 | 10 | 15 | 60 | 60 | 25 |
| Example 44 | 100 | 100 | 75 | 10 | 15 | 60 | 60 | 25 |
| Example 45 | 100 | 100 | 75 | 10 | 15 | 0 | 0 | 25 |
| Example 46 | 100 | 100 | 75 | 10 | 15 | 60 | 60 | 25 |
| Example 60 | 100 | 100 | 75 | 10 | 15 | 60 | 60 | 25 |
| Example 61 | 100 | 100 | 75 | 10 | 15 | 60 | 60 | 25 |

| | Characteristics of laminated polyerster film F-100 value (MPa) | | Characteristics of layer X | | | | | |
|---|---|---|---|---|---|---|---|---|
| | | | With continuous phase structure? | Standard deviation of area ratio of mixture (C + D) in layer (X) | Haze (%) | adhesiveness to print ink layer | | |
| | | | | | | Before forming | | After forming | |
| | Lengthwise direction | Widthwise direction | | | | Initial | Hygrothermal | Initial | Hygrothermal |
| Example 34 | 42 | 53 | Y | 4 | 2.0 | S | S | S | S |
| Example 35 | 42 | 53 | Y | 4 | 2.9 | S | S | S | S |
| Example 36 | 42 | 53 | Y | 4 | 2.0 | S | S | S | S |
| Example 37 | 42 | 53 | Y | 4 | 2.1 | S | S | S | S |
| Example 38 | 42 | 53 | Y | 4 | 2.1 | S | S | S | S |
| Example 39 | 42 | 53 | Y | 3 | 2.3 | S | S | S | S |
| Example 40 | 42 | 53 | Y | 4 | 2.0 | S | A | S | A |
| Example 41 | 42 | 53 | Y | 4 | 2.1 | S | A | S | A |
| Example 42 | 42 | 53 | Y | 4 | 2.0 | S | A | S | A |
| Example 43 | 42 | 53 | Y | 4 | 1.0 | S | S | S | S |
| Example 44 | 42 | 53 | Y | 4 | 1.0 | S | S | S | S |
| Example 45 | 73 | 75 | Y | 5 | 0.9 | S | A | — | — |
| Example 46 | 73 | 75 | Y | 4 | 1.0 | S | S | — | — |
| Example 60 | 42 | 53 | Y | 4 | 2.2 | S | S | S | S |
| Example 61 | 42 | 53 | Y | 4 | 2.0 | S | S | S | S |

| | Characteristics of layer X | | | | | | |
|---|---|---|---|---|---|---|---|
| | adhesiveness to hard coating layer | | | | Antistatic property ($\Omega/\square$) | | ΔHaze (%) |
| | Before forming | | After forming | | | | |
| | Initial | Hygrothermal | Initial | Hygrothermal | Before forming | After forming | |
| Example 34 | S | S | S | S | $8 \times 10^9$ | $2 \times 10^{10}$ | 0.6 |
| Example 35 | S | S | S | S | $8 \times 10^9$ | $3 \times 10^{10}$ | 0.7 |
| Example 36 | S | S | S | S | $6 \times 10^9$ | $1 \times 10^{10}$ | 0.7 |
| Example 37 | S | S | S | S | $8 \times 10^9$ | $2 \times 10^{10}$ | 0.6 |
| Example 38 | S | S | S | S | $8 \times 10^9$ | $2 \times 10^{10}$ | 0.6 |
| Example 39 | S | S | S | S | $1 \times 10^{10}$ | $6 \times 10^{10}$ | 0.7 |
| Example 40 | S | A | S | A | $7 \times 10^9$ | $5 \times 10^{10}$ | 0.5 |
| Example 41 | S | A | S | A | $5 \times 10^9$ | $6 \times 10^{10}$ | 0.7 |
| Example 42 | S | A | S | A | $9 \times 10^9$ | $6 \times 10^{10}$ | 0.6 |
| Example 43 | S | S | S | S | $6 \times 10^9$ | $2 \times 10^{10}$ | 0.8 |
| Example 44 | S | S | S | S | $8 \times 10^9$ | $6 \times 10^{10}$ | 0.5 |
| Example 45 | S | A | — | — | $5 \times 10^9$ | — | 3.1 |
| Example 46 | S | S | — | — | $8 \times 10^9$ | — | 2.6 |
| Example 60 | S | S | S | S | $1 \times 10^{10}$ | $8 \times 10^{10}$ | 0.8 |
| Example 61 | S | S | S | S | $8 \times 10^9$ | $4 \times 10^{10}$ | 0.6 |

Example 1 and coating agent (x-50) is employed in Comparative Example 2. Similar notations are used in the following Examples.)

TABLE 4

|  | Antistatic property after laminating hard coating layer ($\Omega/\square$) |
|---|---|
| Example 34 | $8 \times 10^{11}$ |
| Example 35 | $7 \times 10^{11}$ |
| Example 36 | $8 \times 10^{11}$ |
| Example 37 | $3 \times 10^{12}$ |
| Example 38 | $2 \times 10^{12}$ |
| Example 39 | $4 \times 10^{12}$ |
| Example 40 | $6 \times 10^{11}$ |
| Example 41 | $9 \times 10^{11}$ |
| Example 42 | $8 \times 10^{11}$ |
| Example 43 | $8 \times 10^{11}$ |
| Example 44 | $8 \times 10^{11}$ |

Constituents of Aqueous Coating Agent (x-34)

Aqueous dispersion of acrylic urethane copolymer resin (a-1): "SANNARON" WG-658 (solid content concentration 30 wt %) made by Sannan Chemical Industry Co., Ltd.

Aqueous dispersion of isocyanate compound (b): "ELASTRON" E-37 (solid content concentration 28 wt %) made by Dai-ichi Kogyo Seiyaku Co., Ltd.

Aqueous dispersion of epoxy compound (c): "CR-5L" (solid content concentration 100 wt %) made by DIC Co., Ltd.

Aqueous dispersion of composition (d-3) made from compound having polythiophene structure and compound having anion structure (solid content concentration 1.3 wt %)

Aqueous dispersion of oxazoline compound (e): "EPOCROS" WS-500 (solid content concentration 40 wt %) made by Nippon Shokubai Co., Ltd.

Aqueous dispersion of carbodiimide compound (f): "CARBODILITE" V-04 (solid content concentration 40 wt %) made by Nisshinbo Chemical Inc.

Aqueous solvent (G): pure water

Aqueous dispersions (a-1) . . . (f) are mixed by solid content weight proportion of (a-1)/(b)/(c)/(d-3)/(e)/(f)=100/100/75/25/60/60. Then aqueous solvent (G) is added to it so that the solid content weight concentration of aqueous coating agent (x-34) is adjusted to 3 wt %. Table 5 shows the weight composition of each aqueous dispersion in aqueous coating agent (x-34). (In Table 5, coating agent x-35 is employed in Example 35 and coating agent x-36 is employed in Example 36. Similar notations are used in the following Examples.)

TABLE 5

Weight composition of each aqueous dispersion in coating agent (x)
(Each value indicates added amount (g) of each aqueous dispersion)

|  |  | Aqueous dispersion of acrylic urethane copolymer (a) | | Aqueous dispersion of isocyanate compound | Aqueous dispersion of epoxy compound | Aqueous dispersion of composition (d) made from compound (d-1) having polythiophene structure and compound (d-2) having anion | | Aqueous dispersion of oxazoline compound | Aqueous dispersion of carbodiimide compound | Aqueous dispersion of silica grain (h) | Aqueous dispersion of surfactant (i) | | Pure water |
|---|---|---|---|---|---|---|---|---|---|---|---|---|---|
|  |  | a-1 | a-2 | (b) | (c) | d-3 | d-4 | (e) | (f) |  | i-1 | i-2 | (G) |
| Example 34 | Coating agent x-34 | 2.38 | 0 | 2.55 | 0.54 | 13.74 | 0 | 1.07 | 1.07 | 0 | 0 | 0 | 78.65 |
| Example 35 | Coating agent x-35 | 0 | 2.38 | 2.55 | 0.54 | 13.74 | 0 | 1.07 | 1.07 | 0 | 0 | 0 | 78.65 |
| Example 36 | Coating agent x-36 | 2.50 | 0 | 2.68 | 0.56 | 14.42 | 0 | 0.94 | 0.94 | 0 | 0 | 0 | 77.96 |
| Example 37 | Coating agent x-37 | 2.33 | 0 | 2.49 | 0.52 | 13.42 | 0 | 1.40 | 0.87 | 0 | 0 | 0 | 78.98 |
| Example 38 | Coating agent x-38 | 2.33 | 0 | 2.49 | 0.52 | 13.42 | 0 | 0.87 | 1.40 | 0 | 0 | 0 | 78.98 |
| Example 39 | Coating agent x-39 | 2.17 | 0 | 2.33 | 0.49 | 12.54 | 0 | 1.30 | 1.30 | 0 | 0 | 0 | 79.86 |
| Example 40 | Coating agent x-40 | 2.51 | 0 | 2.69 | 0.56 | 14.46 | 0 | 0.92 | 0.94 | 0 | 0 | 0 | 77.92 |
| Example 41 | Coating agent x-41 | 2.51 | 0 | 2.69 | 0.56 | 14.46 | 0 | 0.94 | 0.92 | 0 | 0 | 0 | 77.92 |
| Example 42 | Coating agent x-42 | 2.51 | 0 | 2.69 | 0.57 | 14.50 | 0 | 0.92 | 0.92 | 0 | 0 | 0 | 77.89 |
| Example 43 | Coating agent x-43 | 2.25 | 0 | 2.41 | 0.51 | 12.96 | 0 | 1.01 | 1.01 | 0.18 | 0.21 | 0 | 79.46 |
| Example 44 | Coating agent x-44 | 2.25 | 0 | 2.41 | 0.51 | 12.96 | 0 | 1.01 | 1.01 | 0.18 | 0 | 1.07 | 78.60 |

TABLE 5-continued

Weight composition of each aqueous dispersion in coating agent (x)
(Each value indicates added amount (g) of each aqueous dispersion)

| | | Aqueous dispersion of acrylic urethane copolymer (a) | | Aqueous dispersion of isocyanate compound | Aqueous dispersion of epoxy compound | Aqueous dispersion of composition (d) made from compound (d-1) having polythiophene structure and compound (d-2) having anion | | Aqueous dispersion of oxazoline compound | Aqueous dispersion of carbodiimide compound | Aqueous dispersion of silica | Aqueous dispersion of surfactant (i) | | Pure water |
|---|---|---|---|---|---|---|---|---|---|---|---|---|---|
| | | a-1 | a-2 | (b) | (c) | d-3 | d-4 | (e) | (f) | grain (h) | i-1 | i-2 | (G) |
| Example 45 | Coating agent x-45 | 3.33 | 0 | 3.57 | 0.75 | 19.23 | 0 | 0.00 | 0.00 | 0 | 0 | 0 | 73.11 |
| Example 46 | Coating agent x-46 | 2.38 | 0 | 2.55 | 0.54 | 13.75 | 0 | 1.07 | 1.07 | 0 | 0 | 0 | 78.65 |
| Example 60 | Coating agent x-47 | 2.38 | 0 | 3.57 | 0.54 | 13.74 | 0 | 1.07 | 1.07 | 0 | 0 | 0 | 77.63 |
| Example 61 | Coating agent x-48 | 2.38 | 0 | 2.55 | 0.54 | 13.74 | 0 | 1.07 | 1.07 | 0 | 0 | 0 | 78.65 |

Example 35

A laminated polyester film is made by the method of Example 34 except that aqueous dispersion of acrylic urethane copolymer resin (a-2) is employed instead of aqueous dispersion of acrylic urethane copolymer resin (a-1). The weight composition of each aqueous dispersion in aqueous coating agent (x) is shown in Table 5. The weight proportion of each resin and compound in thus obtained layer (X) is shown in Table 3. Table 3 shows characteristics of thus obtained laminated polyester film. Table 4 shows the antistatic property after laminating the hard coating layer.

Examples 36 to 42

Laminated polyester film are made by the method of Example 34 except that acrylic urethane copolymer resin (A), isocyanate compound (B), epoxy compound (C), compound (d-1) having polythiophene structure and compound (d-2) having anion structure are mixed by the proportion shown in Table 3. The weight composition of each aqueous dispersion in aqueous coating agent (x) is shown in Table 5. The weight proportion of each resin and compound in thus obtained layer (X) is shown in Table 3. Table 3 shows characteristics of thus obtained laminated polyester film. Table 4 shows the antistatic property after laminating the hard coating layer.

Example 43

A laminated polyester film is made by the method of Example 42 except that aqueous coating agent (x-43) constituted by the following composition is employed. The weight proportion of each resin and compound in thus obtained layer (X) is shown in Table 3. Table 3 shows characteristics of thus obtained laminated polyester film. Table 4 shows the antistatic property after laminating the hard coating layer.

Constituents of Aqueous Coating Agent (x-43)

Aqueous dispersion of acrylic urethane copolymer resin (a-1): "SANNARON" WG-658 (solid content concentration 30 wt %) made by Sannan Chemical Industry Co., Ltd.

Aqueous dispersion of isocyanate compound (b): "ELASTRON" E-37 (solid content concentration 28 wt %) made by Dai-ichi Kogyo Seiyaku Co., Ltd.

Aqueous dispersion of epoxy compound (c): "CR-5L" (solid content concentration 100 wt %) made by DIC Co., Ltd.

Aqueous dispersion of composition (d-3) made from compound having polythiophene structure and compound having anion structure (solid content concentration 1.3 wt %)

Aqueous dispersion of oxazoline compound (e): "EPOCROS" WS-500 (solid content concentration 40 wt %) made by Nippon Shokubai Co., Ltd.

Aqueous dispersion of carbodiimide compound (f): "CARBODILITE" V-04 (solid content concentration 40 wt %) made by Nisshinbo Chemical Inc.

Silica particle (h): "SPHERICA SLURRY" 140 (solid content concentration 40%) made by JGC Catalysts and Chemicals Ltd.

Acetylenediol-based surfactant (i-1): "OLFINE" EXP4051 (solid content concentration 50%) made by Nissin Chemical Industry Co., Ltd.

Aqueous solvent (G): pure water

Aqueous dispersions (a-1) . . . (i-1) are mixed by solid content weight proportion of (a-1)/(b)/(c)/(d-3)/(e)/(f)/(h)/(i-1)=100/100/75/25/60/60/10/15. Then aqueous solvent (G) is added to it so that the solid content weight concentration of aqueous coating agent (x-43) is adjusted to 3 wt %. Table 5 shows the weight composition of each aqueous dispersion in aqueous coating agent (x-43).

Example 44

A laminated polyester film is made by the method of Example 43 except that fluorine-based surfactant (i-2: "PLAS COAT" RY-2 made by Goo Chemical Co., Ltd) is employed instead of acetylenediol-based surfactant (i-1). The weight composition of each aqueous dispersion in aqueous coating agent (x) is shown in Table 5. Table 3 shows characteristics of thus obtained laminated polyester film. Table 4 shows the antistatic property after laminating the hard coating layer.

Example 45

Resin P1 is employed instead of resin Q1 used in Example 16. Other conditions are the same as Example 16. The weight composition of each aqueous dispersion in aqueous coating agent (x) is shown in Table 5. The weight proportion of each resin and compound in thus obtained layer (X) of laminated polyester film is shown in Table 3. Table 3 shows characteristics of thus obtained laminated polyester film. Thus obtained polyester film has undesirable F-100 value which is too high to prevent the film from breaking in the forming process, and therefore the antistatic property and adhesiveness cannot be evaluated.

Example 46

Resin P1 is employed instead of resin Q1 used in Example 34. Other conditions are the same as Example 34. The weight composition of each aqueous dispersion in aqueous coating agent (x) is shown in Table 5. The weight proportion of each resin and compound in thus obtained layer (X) of laminated polyester film is shown in Table 3. Table 3 shows characteristics of thus obtained laminated polyester film. Thus obtained polyester film has undesirable F-100 value which is too high to prevent the film from breaking in the forming process, and therefore the antistatic property and adhesiveness cannot be evaluated.

Example 47

Polyethylene terephthalate (which may be called "resin P1") and copolymerized polyethylene terephthalate resin (which may be called "resin Q1") made by copolymerizing 100 parts by mol of glycol resin with 30 parts by mol of cyclohexanedimethanol are dried up and then supplied to each separate extruders. Resin P1 and resin Q1 are melted at 280° C. in each extruder and delivered through each gear pump and filter to join together to be laminated by turns with a feed block of 801 layers at 1.1/1 of discharge ratio. Thus obtained laminated body is laminated with alternate 401-layered resin P1 and 400-layered resin Q1 in the thickness direction. Both outermost layers are made of resin P1. Thus laminated body consisting of 801 layers is supplied to a multi-manifold die to make a multilayered laminated sheet. The formed sheet is quenched to be solidified on a casting drum surface maintained at 25° C. with applying static electricity. Thus obtained cast film is heated with a group of rolls set at 75° C., and then stretched by 3.3 times in the longitudinal direction as 100 mm of section length of stretched film is rapidly heated with a radiation heater from both sides. And then it is cooled once. After the both sides of uniaxially-stretched film are subjected to the corona discharge processing in air, the both sides are coated with aqueous coating agent (x-16) used in Example 16. The unidirectionally-stretched film coated with aqueous coating agent is led to a tenter, and then is stretched by 3.5 times in the width direction at 110° C. after preheated with hot wind at 100° C. The stretched film is heat-treated with hot wind at 230° C. in the tenter, and consequently is relaxed by 5% in the width direction at the same temperature to make a laminated polyester film provided with layer (X). The thickness of the laminated polyester film is 100 µm.

Next, one side of thus obtained laminated polyester film is coated with 2 µm thickness of hard coating liquid 1 made from the following constituents, and then irradiated with ultraviolet by 250 mJ/cm² of irradiance level to be cured to make a forming member of the laminated polyester film provided with a hard coating layer on one side:
Urethane acrylate (UA122P made by Shin-Nakamura Chemical Co., Ltd.): 80 parts by weight
Polyester acrylate ("KAYARAD" DPHA made by Nippon Kayaku Co., Ltd.): 10 parts by weight
Polyester acrylate ("KAYARAD" PETA made by Nippon Kayaku Co., Ltd.): 10 parts by weight
Silicone oil (SH190 made by Dow Corning Toray Silicone Co., Ltd.): 3 parts by weight
Photopolymerization initiator ("IRGACURE" 184 made by Nagase & Co., Ltd.): 3 parts by weight Next, the forming member is provided on the other side having no hard coating layer with a print ink layer through a screen-printing process, and then a binder layer is formed over the print ink layer. The print conditions are as follows:
Print Ink Layer
Ink: INQ screen ink (971) made by Teikoku Printing Inks Mfg. Co., Ltd: 100 parts by weight
Solvent: F-003 made by Teikoku Printing Inks Mfg. Co., Ltd: 10 parts by weight
Curing agent: curing agent 240 made by Teikoku Printing Inks Mfg. Co., Ltd: 3 parts by weight
Screen mesh: T-225
Drying: 80° C. for 10 minutes (box drying)
Binder
Binder: IMB-003 made by Teikoku Printing Inks Mfg. Co., Ltd
Screen mesh: T-225
Drying: 90° C. for 60 minutes (box drying).

Next, the forming member consisting of laminated polyester film, hard coating layer, print ink layer and binder layer is cut into a predetermined dimension, and is fixed to a mold as oriented in such a direction that the binder layer contacts the forming resin. Then, the insert forming process is performed at the following condition:
Clamping load: 60000 kgf
Mold temperature: 50° C.
Forming resin: PC/ABS alloy, SD POLYCA IM6011 made by Sumitomo Dow Limited
Forming resin temperature: 260° C.
Injection velocity: 80 mm/s
Formed product dimension (L×W×H): 60×60×3 mm
Gate: φ2 mm pin gate Table 6 shows characteristics of thus obtained formed body. The antistatic property of 60 mm×60 mm of the hard-coated layer surface of the formed body is measured by the same method as (2). The surface specific resistance is found $8\times10^{11}\Omega/\square$ to be a good result. The adhesiveness of the hard-coated layer surface to the hard coating layer is evaluated the same method as (5-1) or (5-2). As a result, the surface develops good adhesiveness for both initial adhesiveness and hygrothemal adhesiveness. The formed body has fewer defects in the print ink layer and hard coating layer, achieving a good appearance.

TABLE 6

Characteristics of formed body consisting of laminated polyester film forming member and forming resin

| | Adhesiveness to hard coating layer | | Antistatic property of formed body surface |
|---|---|---|---|
| | Initial | Hygrothermal | ($\Omega/\square$) |
| Example 47 | S | A | $8 \times 10^{11}$ |
| Example 48 | S | S | $2 \times 10^{12}$ |

Example 48

Aqueous coating agent (x-34) used in Example 34 is employed instead of the coating agent used in Example 47 while the other conditions are the same as Example 47. Table 6 shows characteristics of the obtained formed body. The antistatic property of 60 mm×60 mm of the hard-coated layer surface of the formed body is measured by the same method as (2). The surface specific resistance is found $2\times10^{12}\Omega/\square$ to be a practically good level. The adhesiveness of the hard-coated layer surface to the hard coating layer is evaluated the same method as (5-1) or (5-2). As a result, the surface develops good adhesiveness for both initial adhesiveness and hygrothemal adhesiveness. The formed body has fewer defects in the print ink layer and hard coating layer, achieving a good appearance.

Example 49

Polyethylene terephthalate (which may be called "resin P1") and copolymerized polyethylene terephthalate resin (which may be called "resin Q1") made by copolymerizing 100 parts by mol of glycol resin with 30 parts by mol of cyclohexanedimethanol are dried up and then supplied to each separate extruders. Resin P1 and resin Q1 are melted at 280° C. in each extruder and delivered through each gear pump and filter to join together to be laminated by turns with a feed block of 801 layers at 1.1/1 of discharge ratio. Thus obtained laminated body is laminated with alternate 401-layered resin P1 and 400-layered resin Q1 in the thickness direction. Both outermost layers are made of resin P1. Thus laminated body consisting of 801 layers is supplied to a multi-manifold die to make a multilayered laminated sheet. The formed sheet is quenched to be solidified on a casting drum surface maintained at 25° C. with applying static electricity.

Thus obtained cast film is heated with a group of rolls set at 75° C., and then stretched by 3.3 times in the longitudinal direction as 100 mm of section length of stretched film is rapidly heated with a radiation heater from both sides. And then it is cooled once. After the both sides of uniaxially-stretched film are subjected to the corona discharge processing in air, the both sides are coated with aqueous coating agent (x-34) used in Example 34. The unidirectionally-stretched film coated with aqueous coating agent is led to a tenter, and then is stretched by 3.5 times in the width direction at 110° C. after preheated with hot wind at 100° C. The stretched film is heat-treated with hot wind at 230° C. in the tenter, and consequently is relaxed by 5% in the width direction at the same temperature to make a laminated polyester film provided with layer (X) on both sides. The thickness of the laminated polyester film is 100 µm.

Next, the laminated polyester film is coated on the surface of layer (X) with scratch-resistant resin layer-constituting liquid 1 having the following solid content weight proportion so that 9 µm thickness of the scratch-resistant resin layer is formed after cured. A forming member made of the laminated polyester film provided with scratch-resistant resin layer 1 is prepared through an aging process at 25° C. for 7 days, after a drying process at 60° C. for 1 hour.

Scratch-Resistant Resin Layer-Constituting Liquid 1
  Resin (l+m) having polysiloxane skeleton and polydimethyl siloxane skeleton: 63 pars by weight
  Resin (k) having polycaprolactone skeleton and hydroxyl group (tetrafunctional polycaprolactone polyol (PLACCEL 410D made by Daicel Corporation)): 11 parts by weight
  Isocyanate-based compound (n) (HMDI isocyanate ("TAKENATE" D-170N made by Takeda Pharmaceutical Company Limited): 26 parts by weight Table 7 shows characteristics of thus obtained forming member. The hardness of the scratch-resistant resin layer is determined to be no less than HB. The surface specific resistance of the scratch-resistant resin layer of the forming member is found $2\times10^{11}\Omega/\square$ to be a good result. However, the scratch resistance is found an insufficient level.

TABLE 7

Characteristics of forming member of laminated polyester film provided with scratch-resistant resin layer

| | Hardness of scratch-resitant resin layer | Adhesiveness to scratch-resistant resin layer | | Scratch resistance | Antistatic property of scratch-resistant resin layer surface ($\Omega/\square$) |
|---|---|---|---|---|---|
| | | Initial | Hygro-thermal | | |
| Example 49 | HB or harder | S | S | C | $2\times10^{11}$ |
| Example 50 | HB or harder | S | S | B | $4\times10^{11}$ |
| Example 51 | HB or harder | S | S | A | $2\times10^{12}$ |
| Example 52 | HB or harder | S | S | A | $5\times10^{12}$ |
| Example 53 | HB or harder | S | S | A | $2\times10^{13}$ |
| Example 54 | HB or harder | S | S | A | $1\times10^{12}$ |
| Example 55 | HB or harder | S | S | A | $6\times10^{12}$ |
| Example 56 | HB or harder | S | S | A | $9\times10^{12}$ |
| Example 57 | HB or harder | S | S | A | $3\times10^{13}$ |

Example 50

The thickness of scratch-resistant resin layer 1 is set to 10 µm in Example 49 while the other conditions are the same as Example 49. Table 7 shows characteristics of thus obtained forming member. The hardness of the scratch-resistant resin layer is determined to be no less than HB. The surface specific resistance of the scratch-resistant resin layer of the forming member is found $4\times10^{11}\Omega/\square$ to be a good result. The scratch resistance is found a practically sufficient level.

Example 51

The thickness of scratch-resistant resin layer 1 is set to 25 µm in Example 49 while the other conditions are the same as Example 49. Table 7 shows characteristics of thus obtained forming member. The hardness of the scratch-resistant resin layer is determined to be no less than HB. The surface specific resistance of the scratch-resistant resin layer of the forming member is found $2\times10^{12}\Omega/\square$ to be a good result. The scratch resistance is found a good level.

Example 52

The thickness of scratch-resistant resin layer 1 is set to 30 µm in Example 49 while the other conditions are the same as Example 49. Table 7 shows characteristics of thus obtained forming member. The hardness of the scratch-resistant resin layer is determined to be no less than HB. The surface specific resistance of the scratch-resistant resin layer of the forming member is found $5\times10^{12}\Omega/\square$ to be a good result. The scratch resistance is found a good level.

Example 53

The thickness of scratch-resistant resin layer 1 is set to 31 μm in Example 49 while the other conditions are the same as Example 49. Table 7 shows characteristics of thus obtained forming member. The hardness of the scratch-resistant resin layer is determined to be no less than HB. The surface specific resistance of the scratch-resistant resin layer of the forming member is found $2\times10^{13}\Omega/\square$ to be an unpractical level. On the other hand, the scratch resistance is found a good level.

Example 54

One side of thus obtained laminated polyester film obtained by the same method as Example 49 is coated with 10 μm thickness of scratch-resistant resin layer-constituting liquid 2 made from the following constituents, and then irradiated with ultraviolet by 250 mJ/cm$^2$ of irradiance level to be cured to make a forming member of the laminated polyester film provided with a scratch-resistant resin layer 2 on one side:

Scratch-Resistant Resin Layer-Constituting Liquid 2
- Urethane acrylate (UA122P made by Shin-Nakamura Chemical Co., Ltd.): 30 parts by weight
- Polyester acrylate ("KAYARAD" DPHA made by Nippon Kayaku Co., Ltd.): 100 parts by weight
- Polyester acrylate ("KAYARAD" PETA made by Nippon Kayaku Co., Ltd.): 10 parts by weight
- Silicone oil (SH190 made by Dow Corning Toray Silicone Co., Ltd.): 3 parts by weight Photopolymerization initiator ("IRGACURE" 184 made by Nagase & Co., Ltd.): 3 parts by weight Table 7 shows characteristics of thus obtained forming member. The hardness of the scratch-resistant resin layer is determined to be no less than HB. The surface specific resistance of the scratch-resistant resin layer of the forming member is found $1\times10^{12}\Omega/\square$ to be a good result. The scratch resistance is found a good level.

Example 55

The thickness of scratch-resistant resin layer 2 is set to 20 μm in Example 54 while the other conditions are the same as Example 54. Table 7 shows characteristics of thus obtained forming member. The hardness of the scratch-resistant resin layer is determined to be no less than HB. The surface specific resistance of the scratch-resistant resin layer of the forming member is found $6\times10^{12}\Omega/\square$ to be a practically good level. The scratch resistance is found a good level.

Example 56

The thickness of scratch-resistant resin layer 2 is set to 30 μm in Example 54 while the other conditions are the same as Example 54. Table 7 shows characteristics of thus obtained forming member. The hardness of the scratch-resistant resin layer is determined to be no less than HB. The surface specific resistance of the scratch-resistant resin layer of the forming member is found $9\times10^{12}\Omega/\square$ to be a practically good level. The scratch resistance is found a good level.

Example 57

The thickness of scratch-resistant resin layer 2 is set to 31 μm in Example 54 while the other conditions are the same as Example 54. Table 7 shows characteristics of thus obtained forming member. The hardness of the scratch-resistant resin layer is determined to be no less than HB. The surface specific resistance of the scratch-resistant resin layer of the forming member is found $3\times10^{13}\Omega/\square$ to be an unpractical level. The scratch resistance is found a good level.

Example 58

One side of thus obtained laminated polyester film obtained by the same method as Example 51 is coated with scratch-resistant resin layer-constituting liquid 1, and then cured by the same method as Example 51 to make a forming member of the laminated polyester film provided with scratch-resistant resin layer 1 on one side.

Next, the forming member is provided on the other side having no scratch-resistant resin layer 1 with a print ink layer through a screen-printing process, and then a binder layer is formed over the print ink layer. The print conditions are as follows:

Print ink layer
- Ink: INQ screen ink (971) made by Teikoku Printing Inks Mfg. Co., Ltd: 100 parts by weight
- Solvent: F-003 made by Teikoku Printing Inks Mfg. Co., Ltd: 10 parts by weight
- Curing agent: curing agent 240 made by Teikoku Printing Inks Mfg. Co., Ltd: 10 parts by weight
- Screen mesh: T-225
- Drying: 80° C. for 10 minutes (box drying)

Binder
- Binder: IMB-003 made by Teikoku Printing Inks Mfg. Co., Ltd
- Screen mesh: T-225
- Drying: 90° C. for 60 minutes (box drying).

Next, the forming member consisting of laminated polyester film, scratch-resistant resin layer 1, print ink layer and binder layer is cut into a predetermined dimension, and is fixed to a mold as oriented in such a direction that the binder layer contacts the forming resin. Then, the insert forming process is performed at the following condition:

- Clamping load: 60,000 kgf
- Mold temperature: 50° C.
- Forming resin: PC/ABS alloy, SD POLYCA IM6011 made by Sumitomo Dow Limited
- Forming resin temperature: 260° C.
- Injection velocity: 80 mm/s
- Formed product dimension (L×W×H): 60×60×3 mm
- Gate: φ2 mm pin gate.

Table 8 shows characteristics of thus obtained formed body. The antistatic property of 60 mm×60 mm of the scratch-resistant resin layer surface of the formed body is measured by the same method as (2). The surface specific resistance is found $3\times10^{12}\Omega/\square$ to be a good result. The adhesiveness of the scratch-resistant resin-layered surface to the scratch-resistant resin layer is evaluated by the same method as (13-1) or (13-2). As a result, the surface develops good adhesiveness for both initial adhesiveness and hygrothemal adhesiveness. The formed body has fewer defects in the print ink layer and scratch-resistant resin layer, achieving a good appearance.

TABLE 8

| | Characteristics of forming member of laminated polyester film provided with scratch-resistant resin layer | | |
|---|---|---|---|
| | Adhesiveness to scratch-resistant resin layer | | Antistatic property of scratch-resistant resin layer |
| | Initial | Hygrothermal | surface ($\Omega/\square$) |
| Example 58 | S | S | $3 \times 10^{12}$ |
| Example 59 | S | S | $9 \times 10^{12}$ |

Example 59

One side of thus obtained laminated polyester film obtained by the same method as Example 55 is coated with scratch-resistant resin layer-constituting liquid 2, and then cured by the same method as Example 55 to make a forming member of the laminated polyester film provided with scratch-resistant resin layer 2 on one side. Like Example 58, thus obtained forming member is laminated with print ink layer and binder layer, and then the insert forming process is performed to make a formed body.

Table 8 shows characteristics of thus obtained formed body. The antistatic property of 60 mm×60 mm of the scratch-resistant resin layer surface of the formed body is measured by the same method as (2). The surface specific resistance is found $9 \times 10^{12} \Omega/\square$ to be a practically good result. The adhesiveness of the scratch-resistant resin-layered surface to the scratch-resistant resin layer is evaluated by the same method as (13-1) or (13-2). As a result, the surface develops good adhesiveness for both initial adhesiveness and hygrothemal adhesiveness. The formed body has fewer defects in the print ink layer and scratch-resistant resin layer, achieving a good appearance.

Example 60

A laminated polyester film is made by the method of Example 34 except that aqueous coating agent (x-47) constituted by the following composition is employed. The weight proportion of each resin and compound in thus obtained layer (X) is shown in Table 3. Table 3 shows characteristics of thus obtained laminated polyester film.

Constituents of Aqueous Coating Agent (x-47)

Aqueous dispersion of acrylic urethane copolymer resin (a-1): "SANNARON" WG-658 (solid content concentration 30 wt %) made by Sannan Chemical Industry Co., Ltd.

Aqueous dispersion of isocyanate compound (b): "ELASTRON" H-3 (solid content concentration 20 wt %) made by Dai-ichi Kogyo Seiyaku Co., Ltd.

Aqueous dispersion of epoxy compound (c): "CR-5L" (solid content concentration 100 wt %) made by DIC Co., Ltd.

Aqueous dispersion of composition (d-3) made from compound having polythiophene structure and compound having anion structure (solid content concentration 1.3 wt %)

Aqueous dispersion of oxazoline compound (e): "EPOCROS" WS-500 (solid content concentration 40 wt %) made by Nippon Shokubai Co., Ltd.

Aqueous dispersion of carbodiimide compound (f): "CARBODILITE" V-04 (solid content concentration 40 wt %) made by Nisshinbo Chemical Inc.

Aqueous solvent (G): pure water

Aqueous dispersions (a-1) . . . (f) are mixed by solid content weight proportion of (a-1)/(b)/(c)/(d-3)/(e)/(f)=100/100/75/25/60/60. Then aqueous solvent (G) is added to it so that the solid content weight concentration of aqueous coating agent (x-47) is adjusted to 3 wt %. Table 5 shows the weight composition of each aqueous dispersion in aqueous coating agent (x-47).

Example 61

A laminated polyester film is made by the method of Example 34 except that aqueous coating agent (x-46) constituted by the following composition is employed. The weight proportion of each resin and compound in thus obtained layer (X) is shown in Table 3. Table 3 shows characteristics of thus obtained laminated polyester film.

Constituents of Aqueous Coating Agent (x-48)

Aqueous dispersion of acrylic urethane copolymer resin (a-1): "SANNARON" WG-658 (solid content concentration 30 wt %) made by Sannan Chemical Industry Co., Ltd.

Aqueous dispersion of isocyanate compound (b): "ELASTRON" E-37 (solid content concentration 28 wt %) made by Dai-ichi Kogyo Seiyaku Co., Ltd.

Aqueous dispersion of epoxy compound (c): "EX-512" (solid content concentration 100 wt %) made by Nagase ChemteX Corporation, Aqueous dispersion of composition (d-3) made from compound having polythiophene structure and compound having anion structure (solid content concentration 1.3 wt %)

Aqueous dispersion of oxazoline compound (e): "EPOCROS" WS-500 (solid content concentration 40 wt %) made by Nippon Shokubai Co., Ltd.

Aqueous dispersion of carbodiimide compound (f): "CARBODILITE" V-04 (solid content concentration 40 wt %) made by Nisshinbo Chemical Inc.

Aqueous solvent (G): pure water

Aqueous dispersions (a-1) . . . (f) are mixed by solid content weight proportion of (a-1)/(b)/(c)/(d-3)/(e)/(f)=100/100/75/25/60/60. Then aqueous solvent (G) is added to it so that the solid content weight concentration of aqueous coating agent (x-48) is adjusted to 3 wt %. Table 5 shows the weight composition of each aqueous dispersion in aqueous coating agent (x-48).

Comparative Examples 1 to 27

Laminated polyester film are made by the method of Example 1 except that acrylic urethane copolymer resin (A), isocyanate compound (B), epoxy compound (C), compound (d-1) having polythiophene structure and compound (d-2) having anion structure are mixed by the proportion shown in Table 9. The weight compositions of each aqueous dispersion in aqueous coating agent (x) are shown in Table 10. The weight proportions of each resin and compound in thus obtained layer (X) are shown in Table 9. Table 9 shows characteristics of thus obtained laminated polyester films. (In Table 10, coating agent (x-49) is employed in Comparative Example 1 and coating agent (x-50) is employed in Comparative Example 2. Similar notations are used in the following Examples.)

TABLE 9

| | Weight composition of each resin and compound in layer X | | | | | Characteristics of laminated polyerster film | |
|---|---|---|---|---|---|---|---|
| | Acrylic urethane | | Epoxy | Compound having | Compound having | Sum of contents | F-100 value (MPa) | |
| | copolymer (A) | Isocyanate compound (B) | compound (C) | polythiophene structure (d-1) | anion structure (d-2) | (d-1) and (d-2) | Lengthwise direction | Widthwise direction |
| Comparative Example 1 | 100 | 50 | 85 | 8 | 12 | 20 | 42 | 53 |
| Comparative Example 2 | 100 | 130 | 68 | 2 | 3 | 5 | 42 | 53 |
| Comparative Example 3 | 100 | 80 | 40 | 6 | 9 | 15 | 42 | 53 |
| Comparative Example 4 | 100 | 110 | 40 | 6 | 9 | 15 | 42 | 53 |
| Comparative Example 5 | 100 | 110 | 120 | 12 | 18 | 30 | 42 | 53 |
| Comparative Example 6 | 100 | 80 | 100 | 12 | 18 | 30 | 42 | 53 |
| Comparative Example 7 | 100 | 80 | 90 | 2 | 3 | 5 | 42 | 53 |
| Comparative Example 8 | 100 | 80 | 90 | 14 | 21 | 35 | 42 | 53 |
| Comparative Example 9 | 100 | 110 | 60 | 2 | 3 | 5 | 42 | 53 |
| Comparative Example 10 | 100 | 90 | 90 | 16 | 24 | 40 | 42 | 53 |
| Comparative Example 11 | 100 | 75 | 40 | 4 | 6 | 10 | 42 | 53 |
| Comparative Example 12 | 100 | 75 | 100 | 8 | 12 | 20 | 42 | 53 |
| Comparative Example 13 | 100 | 111 | 55 | 4 | 6 | 10 | 42 | 53 |
| Comparative Example 14 | 100 | 111 | 120 | 12 | 18 | 30 | 42 | 53 |
| Comparative Example 15 | 100 | 111 | 60 | 2 | 3 | 5 | 42 | 53 |
| Comparative Example 16 | 100 | 78 | 90 | 14 | 21 | 35 | 42 | 53 |
| Comparative Example 17 | 100 | 111 | 60 | 3.2 | 4.8 | 8 | 42 | 53 |
| Comparative Example 18 | 100 | 111 | 90 | 22 | 33 | 55 | 42 | 53 |
| Comparative Example 19 | 100 | 80 | 102 | 3.6 | 5.4 | 9 | 42 | 53 |
| Comparative Example 20 | 100 | 80 | 95 | 14 | 21 | 35 | 42 | 53 |
| Comparative Example 21 | 100 | 110 | 59 | 3.6 | 5.4 | 9 | 42 | 53 |
| Comparative Example 22 | 100 | 110 | 35 | 12.4 | 18.6 | 31 | 42 | 53 |
| Comparative Example 23 | 100 | 78 | 91 | 12.4 | 18.6 | 31 | 42 | 53 |
| Comparative Example 24 | 100 | 111 | 59 | 3.6 | 5.4 | 9 | 42 | 53 |
| Comparative Example 25 | 100 | 0 | 75 | 6 | 9 | 15 | 42 | 53 |
| Comparative Example 26 | 100 | 100 | 0 | 6 | 9 | 15 | 42 | 53 |
| Comparative Example 27 | 100 | 100 | 75 | 0 | 0 | 0 | 42 | 53 |
| Comparative Example 28 | 100 | 100 | 75 | 0 | 0 | 0 | 42 | 53 |
| Comparative Example 29 | 100 | 100 | 0 | 6 | 9 | 15 | 42 | 53 |

TABLE 9-continued

| | | | | | | | | |
|---|---|---|---|---|---|---|---|---|
| Comparative Example 32 | 0 | 100 | 75 | 10 | 15 | 25 | 42 | 53 |

| | Characteristics of layer X | | | | | | |
|---|---|---|---|---|---|---|---|
| | With continuous phase structure? | Standard deviation of area ratio of mixture (C + D) in layer (X) | Haze (%) | Adhesiveness to print ink layer | | | |
| | | | | Before forming | | After forming | |
| | | | | Initial | Hygro-thermal | Initial | Hygro-thermal |
| Comparative Example 1 | N | 21 | 2.2 | C | C | C | C |
| Comparative Example 2 | N | 17 | 3.1 | A | B | B | C |
| Comparative Example 3 | N | 25 | 2.3 | B | B | C | C |
| Comparative Example 4 | N | 23 | 2.6 | B | B | B | C |
| Comparative Example 5 | N | 20 | 2.6 | B | C | C | C |
| Comparative Example 6 | N | 18 | 2.1 | C | C | C | C |
| Comparative Example 7 | N | 16 | 2.0 | B | B | C | C |
| Comparative Example 8 | N | 26 | 2.3 | C | C | C | C |
| Comparative Example 9 | N | 16 | 2.5 | B | B | B | C |
| Comparative Example 10 | N | 29 | 2.6 | B | C | C | C |
| Comparative Example 11 | N | 21 | 2.3 | C | C | C | C |
| Comparative Example 12 | N | 20 | 2.1 | C | C | C | C |
| Comparative Example 13 | N | 18 | 2.9 | A | B | B | C |
| Comparative Example 14 | N | 20 | 3.0 | A | B | B | C |
| Comparative Example 15 | N | 16 | 2.1 | B | C | C | C |
| Comparative Example 16 | N | 19 | 2.4 | C | C | C | C |
| Comparative Example 17 | N | 16 | 3.0 | A | B | B | C |
| Comparative Example 18 | N | 31 | 3.1 | A | B | B | C |
| Comparative Example 19 | N | 17 | 2.0 | C | C | C | C |
| Comparative Example 20 | N | 22 | 2.3 | C | C | C | C |
| Comparative Example 21 | N | 28 | 2.6 | B | B | C | C |
| Comparative Example 22 | N | 30 | 2.7 | B | B | C | C |
| Comparative Example 23 | N | 23 | 2.3 | C | C | C | C |
| Comparative Example 24 | N | 31 | 3.0 | A | B | B | C |
| Comparative Example 25 | N | 27 | 2.0 | C | C | C | C |
| Comparative Example 26 | N | 35 | 4.0 | B | B | C | C |
| Comparative Example 27 | N | 32 | 2.5 | A | B | B | B |
| Comparative Example 28 | N | 25 | 6.9 | B | C | C | C |
| Comparative Example 29 | N | 23 | 3.0 | B | B | C | C |

TABLE 9-continued

| | | | | | | | |
|---|---|---|---|---|---|---|---|
| Comparative Example 32 | N | 21 | 3.1 | C | C | C | C |

| | Characteristics of layer X | | | | | | |
|---|---|---|---|---|---|---|---|
| | Adhesiveness to hard coating layer | | | | Antistatic property ($\Omega/\square$) | | |
| | Before forming | | After forming | | | | |
| | Initial | Hygro-thermal | Initial | Hygro-thermal | Before forming | After forming | ΔHaze (%) |
| Comparative Example 1 | C | C | C | C | $1 \times 10^{10}$ | $1 \times 10^{12}$ | 0.7 |
| Comparative Example 2 | A | B | B | C | $3 \times 10^{13}$ | $4 \times 10^{15}$ | 1.2 |
| Comparative Example 3 | B | B | C | C | $2 \times 10^{13}$ | $8 \times 10^{14}$ | 0.7 |
| Comparative Example 4 | B | B | B | C | $1 \times 10^{13}$ | $2 \times 10^{15}$ | 1.0 |
| Comparative Example 5 | C | C | C | C | $4 \times 10^{10}$ | $8 \times 10^{11}$ | 1.0 |
| Comparative Example 6 | C | C | C | C | $1 \times 10^{10}$ | $7 \times 10^{11}$ | 0.6 |
| Comparative Example 7 | B | B | C | C | $2 \times 10^{13}$ | $4 \times 10^{14}$ | 0.5 |
| Comparative Example 8 | C | C | C | C | $8 \times 10^{9}$ | $9 \times 10^{10}$ | 0.6 |
| Comparative Example 9 | B | B | B | C | $7 \times 10^{13}$ | $8 \times 10^{14}$ | 0.8 |
| Comparative Example 10 | B | C | C | C | $5 \times 10^{10}$ | $7 \times 10^{11}$ | 0.9 |
| Comparative Example 11 | C | C | C | C | $7 \times 10^{10}$ | $8 \times 10^{11}$ | 0.7 |
| Comparative Example 12 | C | C | C | C | $2 \times 10^{10}$ | $7 \times 10^{11}$ | 0.7 |
| Comparative Example 13 | A | B | B | C | $7 \times 10^{14}$ | $8 \times 10^{14}$ | 1.0 |
| Comparative Example 14 | A | B | B | C | $9 \times 10^{14}$ | $9 \times 10^{14}$ | 1.0 |
| Comparative Example 15 | C | C | C | C | $5 \times 10^{11}$ | $9 \times 10^{13}$ | 0.8 |
| Comparative Example 16 | C | C | C | C | $5 \times 10^{9}$ | $1 \times 10^{12}$ | 0.7 |
| Comparative Example 17 | A | B | B | C | $8 \times 10^{14}$ | $3 \times 10^{15}$ | 1.1 |
| Comparative Example 18 | A | B | B | C | $6 \times 10^{13}$ | $8 \times 10^{14}$ | 1.0 |
| Comparative Example 19 | C | C | C | C | $9 \times 10^{13}$ | $5 \times 10^{14}$ | 0.8 |
| Comparative Example 20 | C | C | C | C | $5 \times 10^{9}$ | $9 \times 10^{9}$ | 0.7 |
| Comparative Example 21 | B | B | C | C | $2 \times 10^{13}$ | $6 \times 10^{14}$ | 1.0 |
| Comparative Example 22 | B | B | C | C | $1 \times 10^{13}$ | $7 \times 10^{14}$ | 1.1 |
| Comparative Example 23 | C | C | C | C | $8 \times 10^{9}$ | $2 \times 10^{11}$ | 0.9 |
| Comparative Example 24 | A | B | B | C | $8 \times 10^{13}$ | $8 \times 10^{14}$ | 1.1 |
| Comparative Example 25 | C | C | C | C | $5 \times 10^{9}$ | $6 \times 10^{11}$ | 0.5 |
| Comparative Example 26 | B | B | C | C | $5 \times 10^{14}$ | $7 \times 10^{14}$ | 0.9 |
| Comparative Example 27 | A | B | B | A | $9 \times 10^{14}$ | $2 \times 10^{14}$ | 0.7 |
| Comparative Example 28 | B | C | C | C | $6 \times 10^{14}$ | $4 \times 10^{14}$ | 1.2 |
| Comparative Example 29 | B | B | C | C | $8 \times 10^{14}$ | $1 \times 10^{15}$ | 1.0 |
| Comparative Example 32 | C | C | C | C | $1 \times 10^{14}$ | $3 \times 10^{14}$ | 1.3 |

TABLE 10

Weight composition of each aqueous dispersion in coating agent (x)
(Each value indicates added amount (g) of each aqueous dispersion)

| | | Aqueous dispersion of acrylic urethane copolymer (a) | | Aqueous dispersion of isocyanate compound | Aqueous dispersion of epoxy compound | Aqueous dispersion of composition (d) made from compound (d-1) having polythiophene structure and compound (d-2) having anion | | Aqueous dispersion of oxazoline compound |
|---|---|---|---|---|---|---|---|---|
| | | a-1 | a-2 | (b) | (c) | d-3 | d-4 | (e) |
| Comparative Example 1 | Coating agent x-49 | 3.92 | 0 | 2.10 | 1.00 | 18.10 | 0 | 0 |
| Comparative Example 2 | Coating agent x-50 | 3.30 | 0 | 4.60 | 0.67 | 3.81 | 0 | 0 |
| Comparative Example 3 | Coating agent x-51 | 4.26 | 0 | 3.65 | 0.51 | 14.73 | 0 | 0 |
| Comparative Example 4 | Coating agent x-52 | 3.77 | 0 | 4.45 | 0.45 | 13.06 | 0 | 0 |
| Comparative Example 5 | Coating agent x-53 | 2.78 | 0 | 3.27 | 1.00 | 19.23 | 0 | 0 |
| Comparative Example 6 | Coating agent x-54 | 3.23 | 0 | 2.76 | 0.97 | 22.33 | 0 | 0 |
| Comparative Example 7 | Coating agent x-55 | 3.64 | 0 | 3.12 | 0.98 | 4.20 | 0 | 0 |
| Comparative Example 8 | Coating agent x-56 | 3.28 | 0 | 2.81 | 0.89 | 26.48 | 0 | 0 |
| Comparative Example 9 | Coating agent x-57 | 3.64 | 0 | 4.29 | 0.65 | 4.20 | 0 | 0 |
| Comparative Example 10 | Coating agent x-58 | 3.13 | 0 | 3.01 | 0.84 | 28.85 | 0 | 0 |
| Comparative Example 11 | Coating agent x-59 | 4.44 | 0 | 3.57 | 0.53 | 10.26 | 0 | 0 |
| Comparative Example 12 | Coating agent x-60 | 3.39 | 0 | 2.72 | 1.02 | 15.65 | 0 | 0 |
| Comparative Example 13 | Coating agent x-61 | 3.62 | 0 | 4.31 | 0.60 | 8.36 | 0 | 0 |
| Comparative Example 14 | Coating agent x-62 | 2.77 | 0 | 3.29 | 1.00 | 19.18 | 0 | 0 |
| Comparative Example 15 | Coating agent x-63 | 3.62 | 0 | 4.31 | 0.65 | 4.18 | 0 | 0 |
| Comparative Example 16 | Coating agent x-64 | 3.30 | 0 | 2.76 | 0.89 | 26.66 | 0 | 0 |
| Comparative Example 17 | Coating agent x-65 | 3.58 | 0 | 4.26 | 0.65 | 6.62 | 0 | 0 |
| Comparative Example 18 | Coating agent x-66 | 2.81 | 0 | 3.34 | 0.76 | 35.65 | 0 | 0 |
| Comparative Example 19 | Coating agent x-67 | 3.24 | 0 | 2.77 | 1.17 | 6.72 | 0 | 0 |
| Comparative Example 20 | Coating agent x-68 | 3.23 | 0 | 2.76 | 0.92 | 26.05 | 0 | 0 |
| Comparative Example 21 | Coating agent x-69 | 3.60 | 0 | 4.24 | 0.64 | 7.47 | 0 | 0 |
| Comparative Example 22 | Coating agent x-70 | 3.62 | 0 | 4.27 | 0.38 | 25.92 | 0 | 0 |

TABLE 10-continued

| | | | | | | | | |
|---|---|---|---|---|---|---|---|---|
| Comparative Example 23 | Coating agent x-71 | 3.33 | 0 | 2.79 | 0.91 | 23.85 | 0 | 0 |
| Comparative Example 24 | Coating agent x-72 | 3.58 | 0 | 4.26 | 0.63 | 7.44 | 0 | 0 |
| Comparative Example 25 | Coating agent x-73 | 5.26 | 0 | 0 | 1.18 | 18.22 | 0 | 0 |
| Comparative Example 26 | Coating agent x-74 | 4.65 | 0 | 4.98 | 0 | 16.10 | 0 | 0 |
| Comparative Example 27 | Coating agent x-75 | 3.64 | 0 | 3.90 | 0.82 | 0 | 0 | 0 |
| Comparative Example 28 | Coating agent x-76 | 3.33 | 0 | 3.57 | 0.75 | 0 | 0 | 0 |
| Comparative Example 29 | Coating agent x-77 | 4.65 | 0 | 4.98 | 0 | 16.10 | 0 | 0 |
| Comparative Example 32 | Coating agent x-78 | 0.00 | 0 | 3.57 | 0.75 | 19.23 | 0 | 0 |

| | | Aqueous dispersion of carbodiimide compound (f) | Aqueous dispersion of ammonium polystyrene sulfonate (J) | Aqueous dispersion of melamine compound (K) | Aqueous dispersion of polyester resin (O) | Pure water (G) |
|---|---|---|---|---|---|---|
| Comparative Example 1 | Coating agent x-49 | 0 | 0 | 0 | 0 | 74.88 |
| Comparative Example 2 | Coating agent x-50 | 0 | 0 | 0 | 0 | 87.62 |
| Comparative Example 3 | Coating agent x-51 | 0 | 0 | 0 | 0 | 76.86 |
| Comparative Example 4 | Coating agent x-52 | 0 | 0 | 0 | 0 | 78.26 |
| Comparative Example 5 | Coating agent x-53 | 0 | 0 | 0 | 0 | 73.72 |
| Comparative Example 6 | Coating agent x-54 | 0 | 0 | 0 | 0 | 70.71 |
| Comparative Example 7 | Coating agent x-55 | 0 | 0 | 0 | 0 | 88.07 |
| Comparative Example 8 | Coating agent x-56 | 0 | 0 | 0 | 0 | 66.54 |
| Comparative Example 9 | Coating agent x-57 | 0 | 0 | 0 | 0 | 87.23 |

TABLE 10-continued

| | | | | | | |
|---|---|---|---|---|---|---|
| Comparative Example 10 | Coating agent x-58 | 0 | 0 | 0 | 0 | 64.17 |
| Comparative Example 11 | Coating agent x-59 | 0 | 0 | 0 | 0 | 81.19 |
| Comparative Example 12 | Coating agent x-60 | 0 | 0 | 0 | 0 | 77.22 |
| Comparative Example 13 | Coating agent x-61 | 0 | 0 | 0 | 0 | 83.11 |
| Comparative Example 14 | Coating agent x-62 | 0 | 0 | 0 | 0 | 73.76 |
| Comparative Example 15 | Coating agent x-63 | 0 | 0 | 0 | 0 | 87.24 |
| Comparative Example 16 | Coating agent x-64 | 0 | 0 | 0 | 0 | 66.39 |
| Comparative Example 17 | Coating agent x-65 | 0 | 0 | 0 | 0 | 84.89 |
| Comparative Example 18 | Coating agent x-66 | 0 | 0 | 0 | 0 | 57.44 |
| Comparative Example 19 | Coating agent x-67 | 0 | 0 | 0 | 0 | 86.10 |
| Comparative Example 20 | Coating agent x-68 | 0 | 0 | 0 | 0 | 67.04 |
| Comparative Example 21 | Coating agent x-69 | 0 | 0 | 0 | 0 | 84.06 |
| Comparative Example 22 | Coating agent x-70 | 0 | 0 | 0 | 0 | 65.81 |
| Comparative Example 23 | Coating agent x-71 | 0 | 0 | 0 | 0 | 69.12 |
| Comparative Example 24 | Coating agent x-72 | 0 | 0 | 0 | 0 | 84.07 |
| Comparative Example 25 | Coating agent x-73 | 0 | 0 | 0 | 0 | 75.33 |
| Comparative Example 26 | Coating agent x-74 | 0 | 0 | 0 | 0 | 74.27 |

TABLE 10-continued

| | | | | | | |
|---|---|---|---|---|---|---|
| Comparative Example 27 | Coating agent x-75 | 0 | 0 | 0 | 0 | 91.65 |
| Comparative Example 28 | Coating agent x-76 | 0 | 2.5 | 0 | 0 | 89.85 |
| Comparative Example 29 | Coating agent x-77 | 0 | 0 | 1.06 | 0 | 72.81 |
| Comparative Example 32 | Coating agent x-78 | 0 | 0 | 0 | 3.33 | 73.12 |

Comparative Example 28

Aqueous dispersion of polystyrene sulfonate ammonium salt (J) is employed instead of aqueous dispersion (d-3) of composition made from compound having polythiophene structure and compound having anion structure used in Example 16. Other conditions are the same as Example 16. The weight composition of each aqueous dispersion in aqueous coating agent (x) is shown in Table 10. The weight proportion of each resin and compound in thus obtained layer (X) of laminated polyester film is shown in Table 9. Table 9 shows characteristics of thus obtained laminated polyester film.

Comparative Example 29

Aqueous dispersion of melamine compound (k) ("NIKALAC" MW-12LF (solid content concentration 71%) made by Sanwa Chemical Co., Ltd.) is employed instead of epoxy compound (c) used in Example 16. Other conditions are the same as Example 16. The weight composition of each aqueous dispersion in aqueous coating agent (x) is shown in Table 10. The weight proportion of each resin and compound in thus obtained layer (X) of laminated polyester film is shown in Table 9. Table 9 shows characteristics of thus obtained laminated polyester film.

Comparative Example 30

Aqueous coating agent (x-76) used in Comparative Example 28 is employed instead of aqueous coating agent (x-34) used in Example 51. Other conditions are the same as Example 51. Table 11 shows characteristics of thus obtained formed body. The surface specific resistance of the scratch-resistant resin layer of the forming member is found $5 \times 10^{15} \Omega/\square$ to be an insufficient level. The scratch resistance is found a good level.

TABLE 11

| | Characteristics of forming member of laminated polyester film provided with scratch-resistant resin layer | | | | |
|---|---|---|---|---|---|
| | Hardness of scratch-resitant resin layer | Adhesiveness to scratch-resistant resin layer | | Scratch resistance | Antistatic property of scratch-resistant resin layer surface ($\Omega/\square$) |
| | | Initial | Hygrothermal | | |
| Comparative Example 30 | HB or harder | B | C | A | $5 \times 10^{15}$ |
| Comparative Example 31 | HB or harder | B | C | A | $4 \times 10^{15}$ |

Comparative Example 31

Aqueous coating agent (x-76) used in Comparative Example 28 is employed instead of aqueous coating agent (x-34) used in Example 55. Other conditions are the same as Example 55. Table 11 shows characteristics of thus obtained formed body. The surface specific resistance of the scratch-resistant resin layer of the forming member is found $4 \times 10^{15} \Omega/\square$ to be an insufficient level. The scratch resistance is found a good level.

Comparative Example 32

Polyester resin ("PESRESIN" A-210 (solid content concentration 30%) made by Takamatsu Oil & Fat Co., Ltd) is employed instead of acrylic urethane copolymer resin (a) used in Example 16. Other conditions are the same as Example 16. The weight composition of each aqueous dispersion in aqueous coating agent (x-78) is shown in Table 10. Table 9 shows characteristics of layer (X) of thus obtained laminated polyester film. Table 9 shows characteristics of the laminated polyester film.

INDUSTRIAL APPLICATIONS

Our laminated polyester film is suitably used as a base material for decorating component parts of cell-phone or electric appliances because it is excellent in the antistatic property and adhesiveness to the print layer or hard coating layer even after the forming process. The excellent antistatic property can prevent dusts from adhering to the film and therefore the productivity is improved. Further, the quality of appearance design of the formed body made from the forming resin and forming member made of the laminated polyester film can be improved.

The invention claimed is:

1. A forming member made from a laminated polyester film provided on at least one side with layer (X) made from an acrylic urethane copolymer resin (A), an isocyanate compound (B), an epoxy compound (C), a compound (d-1) having a polythiophene structure and a compound (d-2) having an anion structure, wherein the layer (X) has a continuous phase structure, the laminated polyester film is provided with a scratch-resistant resin layer on at least one side, and the scratch-resistant resin layer is one of outermost layers while the polyester film, the layer (X) and the scratch-resistant resin layer are disposed in series on the one side, and the scratch-resistant resin layer contains a polycaprolactone constituent (K) and a urethane constituent (N) together with a polysiloxane constituent (L) and/or a polydimethyl siloxane constituent (M).

2. The forming member according to claim 1, wherein the layer (X) has the continuous phase structure between a first mixture and a second mixture, the first mixture comprising the acrylic urethane copolymer resin (A) and the isocyanate compound (B), the second mixture comprising the epoxy compound (C), the compound (d-1) having the polythiophene structure and the compound (d-2) having the anion structure.

3. The forming member according to claim 1, wherein the laminated polyester film further comprises a scratch-resistant resin layer on at least one side, and the scratch-resistant resin layer is one of outermost layers while the polyester film, the layer (X) and the scratch-resistant resin layer are disposed in series on the one side, a thickness of the scratch-resistant resin layer is 10 to 30 μm, and a surface specific resistance of the scratch-resistant resin layer is less than $1 \times 10^{13} \Omega/\square$.

4. The forming member according to claim 3, wherein the scratch-resistant resin layer is formed by coating on a side of the layer (X) of the laminated polyester film with a scratch-resistant resin layer-constituting liquid that contains a heat-curable resin to be heated or an active ray-curable resin to be irradiated with an active ray.

5. A formed body made by coating the laminated polyester film of the forming member according to claim 1 with a thermoplastic resin.

6. The forming member according to claim 1, the scratch-resistant resin layer formed by coating on a side of the layer (X) of the laminated polyester film with a scratch-resistant resin layer-constituting liquid that contains resin (k) having a polycaprolactone skeleton and a hydroxyl group and an isocyanate-based compound (n), and at least one of resins selected from the group consisting of resin (l) having a polysiloxane skeleton, resin (m) having a polydimethyl siloxane skeleton and resin (l+m) having a polysiloxane skeleton and a polydimethyl siloxane skeleton.

7. A laminated polyester film provided on at least one side with layer (X) made from an acrylic urethane copolymer resin (A), an isocyanate compound (B), an epoxy compound (C), a compound (d-1) having a polythiophene structure and a compound (d-2) having an anion structure, wherein the layer (X) contains 100 parts by weight of the resin (A), 80 to 110 parts by weight of the compound (B), 60 to 90 parts by weight of the compound (C), and 10 to 30 parts by weight of a total of the compound (d-1) and the compound (d-2).

8. The laminated polyester film according to claim 7, wherein the layer (X) has a continuous phase structure.

9. The laminated polyester film according to claim 8, wherein the layer (X) has the continuous phase structure between a first mixture and a second mixture, the first mixture comprising the acrylic urethane copolymer resin (A) and the isocyanate compound (B), the second mixture comprising the epoxy compound (C), the compound (d-1) having the polythiophene structure and the compound (d-2) having the anion structure.

10. The laminated polyester film according to claim 7, wherein the layer (X) contains 100 parts by weight of the resin (A), 50 to 80 parts by weight of oxazoline compound (E) and 50 to 80 parts by weight of carbodiimide compound (F).

11. A method of manufacturing a laminated polyester film comprising coating on at least one side of a polyester film, before crystalline orientation, with a coating agent (x) to form layer (X), stretching the polyester film in at least one direction, and heating the polyester film, wherein the coating agent contains an acrylic urethane copolymer resin (a), an isocyanate compound (b), an epoxy compound (c), a compound (d-1) having a polythiophene structure and a compound (d-2) having an anion structure, and the coating agent (x) contains 100 parts by weight of resin (a), 80 to 110 parts by weight of compound (b), 60 to 90 parts by weight of compound (c), and 10 to 30 parts by weight of a total of compound (d-1) and compound (d-2).

12. The method according to claim 11, wherein the layer (X) has a continuous phase structure between a first mixture and a second mixture, the first mixture comprising the acrylic urethane copolymer resin (A) and the isocyanate compound (B), the second mixture comprising the epoxy compound (C), the compound (d-1) having the polythiophene structure and the compound (d-2) having the anion structure, the acrylic urethane copolymer resin (A) comprising the acrylic urethane copolymer resin (a) or a resin having a structure derived from the acrylic urethane copolymer resin (a), the isocyanate compound (B) comprising the isocyanate compound (b) or a resin having a structure derived from the isocyanate compound (b), the epoxy compound (C) comprising the epoxy compound (c) or a resin having a structure derived from the epoxy compound (c).

13. The method according to claim 11, wherein the coating agent (x) contains 100 parts by weight of the resin (a), 50 to 80 parts by weight of an oxazoline compound (e) and 50 to 80 parts by weight of a carbodiimide compound.

* * * * *